(12) United States Patent
Bastable et al.

(10) Patent No.: US 11,936,942 B2
(45) Date of Patent: *Mar. 19, 2024

(54) SYSTEMS AND METHODS FOR DATA PROCESSING, STORAGE, AND RETRIEVAL FROM A SERVER

(71) Applicant: Synamedia Limited, Staines Upon Thames (GB)

(72) Inventors: Ian Bastable, London (GB); Gareth Bowen, London (GB)

(73) Assignee: SYNAMEDIA LIMITED, Staines Upon Thames (GB)

( * ) Notice: Subject to any disclaimer, the term of this patent is extended or adjusted under 35 U.S.C. 154(b) by 148 days.

This patent is subject to a terminal disclaimer.

(21) Appl. No.: 17/399,716

(22) Filed: Aug. 11, 2021

(65) Prior Publication Data

US 2021/0377599 A1 Dec. 2, 2021

Related U.S. Application Data

(63) Continuation of application No. 17/129,891, filed on Dec. 21, 2020, now Pat. No. 11,259,082, which is a
(Continued)

(51) Int. Cl.
*H04N 21/4408* (2011.01)
*H04L 9/32* (2006.01)
(Continued)

(52) U.S. Cl.
CPC ....... *H04N 21/4408* (2013.01); *H04L 9/3218* (2013.01); *H04L 9/3271* (2013.01); *H04N 21/232* (2013.01); *H04N 21/4405* (2013.01)

(58) Field of Classification Search
CPC ............. H04N 21/4408; H04N 21/232; H04N 21/4405; H04N 21/2393; H04N 21/4334;
(Continued)

(56) References Cited

U.S. PATENT DOCUMENTS 7,234,059 B1 6/2007 Beaver et al.
8,812,874 B1 8/2014 Clifford
(Continued)

FOREIGN PATENT DOCUMENTS

EP 2273409 1/2011
WO WO 2019/091587 A1 5/2019

OTHER PUBLICATIONS

International Search Report, International Application No. PCT/IB2020/000847 for Synamedia Limited, dated Feb. 15, 2021 (17 pages).
(Continued)

*Primary Examiner* — Mohammad W Reza
(74) *Attorney, Agent, or Firm* — FINNEGAN, HENDERSON, FARABOW, GARRETT & DUNNER, LLP

(57) ABSTRACT

A method for identifying a data segment includes receiving a first data segment associated with a first recording time; receiving a second data segment associated with a second recording time, comparing: the first recording time with the second recording time, a first time reference value with a second time reference value, and a first length enumeration for first data packets with a second length enumeration for second data packets; determining, based on the comparing, a match between the first data segment and the second data segment; and identifying the first data segment as the same as the second data segment based on the determining.

15 Claims, 38 Drawing Sheets

Related U.S. Application Data continuation-in-part of application No. 16/660,761, filed on Oct. 22, 2019.

(51) Int. Cl.
*H04N 21/232* (2011.01)
*H04N 21/4405* (2011.01)

(58) Field of Classification Search
CPC ............. H04N 21/4335; H04N 21/658; H04N 21/2743; H04L 9/3218; H04L 9/3271; H04L 9/0825; H04L 9/3234; H04L 9/3239; H04L 9/3247; H04L 2209/603; H04L 2209/605
See application file for complete search history.

(56) References Cited

U.S. PATENT DOCUMENTS

| | | |
|---|---|---|
| 2001/0037464 A1 | 11/2001 | Persels et al. |
| 2002/0166048 A1 | 11/2002 | Coulier |
| 2003/0014638 A1 | 1/2003 | Lincoln et al. |
| 2004/0125237 A1* | 7/2004 | Chen ................... G06F 16/785 348/700 |
| 2005/0154889 A1 | 7/2005 | Ashley et al. |
| 2005/0267860 A1 | 12/2005 | Benguigui |
| 2009/0028147 A1 | 1/2009 | Russell |
| 2009/0122745 A1* | 5/2009 | Fahldieck ........... H04W 88/085 370/315 |
| 2009/0208016 A1 | 8/2009 | Choi et al. |
| 2009/0274446 A1 | 11/2009 | Ando et al. |
| 2010/0174740 A1 | 7/2010 | Ge |
| 2011/0026905 A1* | 2/2011 | Wang ................. H04N 21/4305 386/248 |
| 2011/0087690 A1 | 4/2011 | Cairns |
| 2011/0125771 A1 | 5/2011 | Gladwin et al. |
| 2011/0161680 A1 | 6/2011 | Grube et al. |
| 2012/0084544 A1 | 4/2012 | Farina et al. |
| 2013/0212269 A1 | 8/2013 | Kuosa et al. |
| 2013/0305039 A1 | 11/2013 | Guada |
| 2014/0059652 A1 | 2/2014 | Choi et al. |
| 2014/0105007 A1 | 4/2014 | Pathmasuntharam et al. |
| 2014/0176795 A1* | 6/2014 | Joo .................. H04N 21/43072 348/513 |
| 2014/0279958 A1 | 9/2014 | Huang |
| 2015/0085659 A1 | 3/2015 | Hong et al. |
| 2015/0121417 A1 | 4/2015 | Vince |
| 2015/0186403 A1 | 7/2015 | Srivastava et al. |
| 2015/0286805 A1 | 10/2015 | Lin |
| 2017/0006018 A1 | 1/2017 | Campagna et al. |
| 2018/0013562 A1 | 1/2018 | Haider et al. |
| 2018/0025167 A1 | 1/2018 | Bohli et al. |
| 2020/0057752 A1 | 2/2020 | Tofano |
| 2020/0259636 A1 | 8/2020 | Gottipati et al. |
| 2020/0320046 A1 | 10/2020 | Narayanamurthy et al. |
| 2021/0056223 A1 | 2/2021 | Hetzler |
| 2021/0194922 A1* | 6/2021 | Zinner ................ H04L 63/1475 |

OTHER PUBLICATIONS

Nathalie Baracaldo et al., "Reconciling End-to-End Confidentiality and Data Reduction in Cloud Storage," Cloud Computing Security, ACM, 2 Penn Plaza, Suite 701 Newyork NY 10121-0701 USA, Nov. 7, 2014 (Nov. 7, 2014), pp. 21-32 (13 pages).

Sabrina De Capitani di Vimercati et al., "Practical Techniques Building on Encryption for Protecting and Managing Data in the Cloud," Mar. 18, 2016 (Mar. 18, 2016), Big Data Analytics in the Social and Ubiquitous CONTEXT: 5th International Workshop on Modeling Social Media, MSM 2014, 5th International Workshop on Mining Ubiquitous and Social Environments, Muse 2014 and First International Workshop on Machine LE (35 pages).

Bushra AlBelooshi et al., "Securing Cryptographic Keys in the Cloud: A Survey," IEEE Cloud Computing, IEEE, USA, vol. 3, No. 4, Jul. 2016 (Jul. 1, 2016), pp. 42-56 (15 pages).

Dave, Jay et al., "Secure Random Encryption for Deduplicated Storage," Dec. 2, 2017 (13 pages).

Blasco, Jorge et al., "A tunable proof of ownership scheme for deduplication using Bloom filters," Oct. 29, 2014 (9 pages).

Communication, European Patent App. No. 21194615.7-1218 (dated May 13, 2022) (11 pages).

* cited by examiner

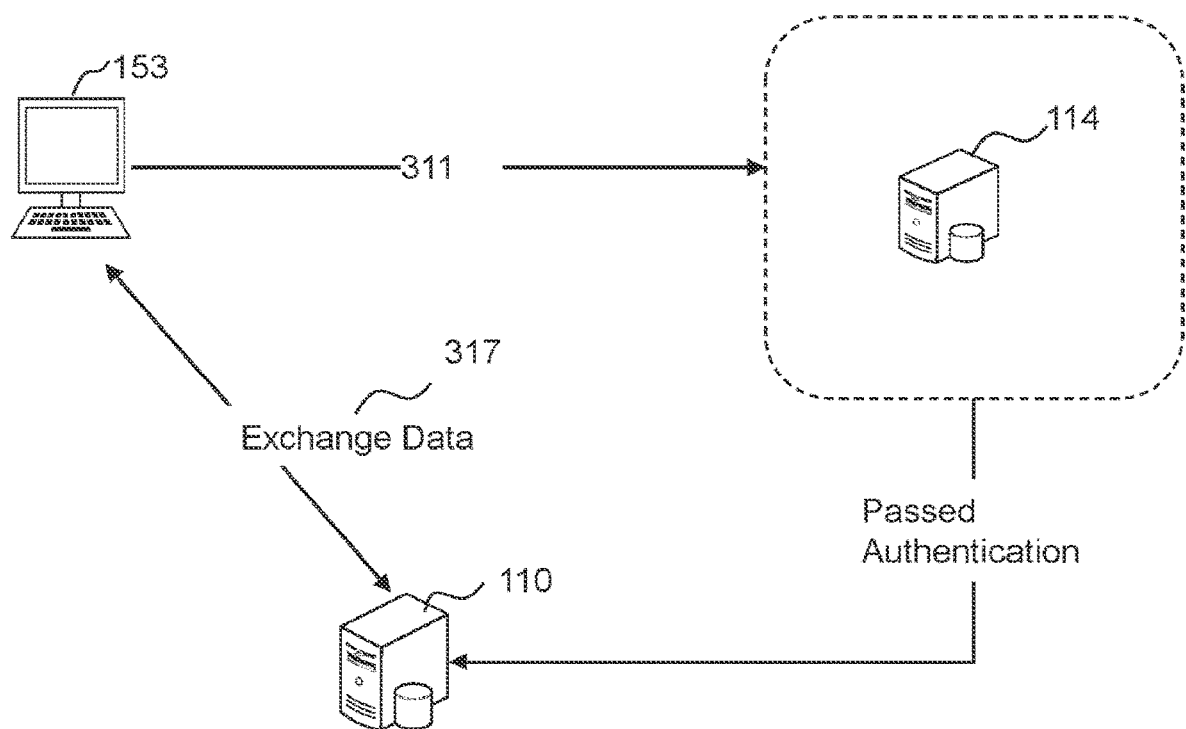

403

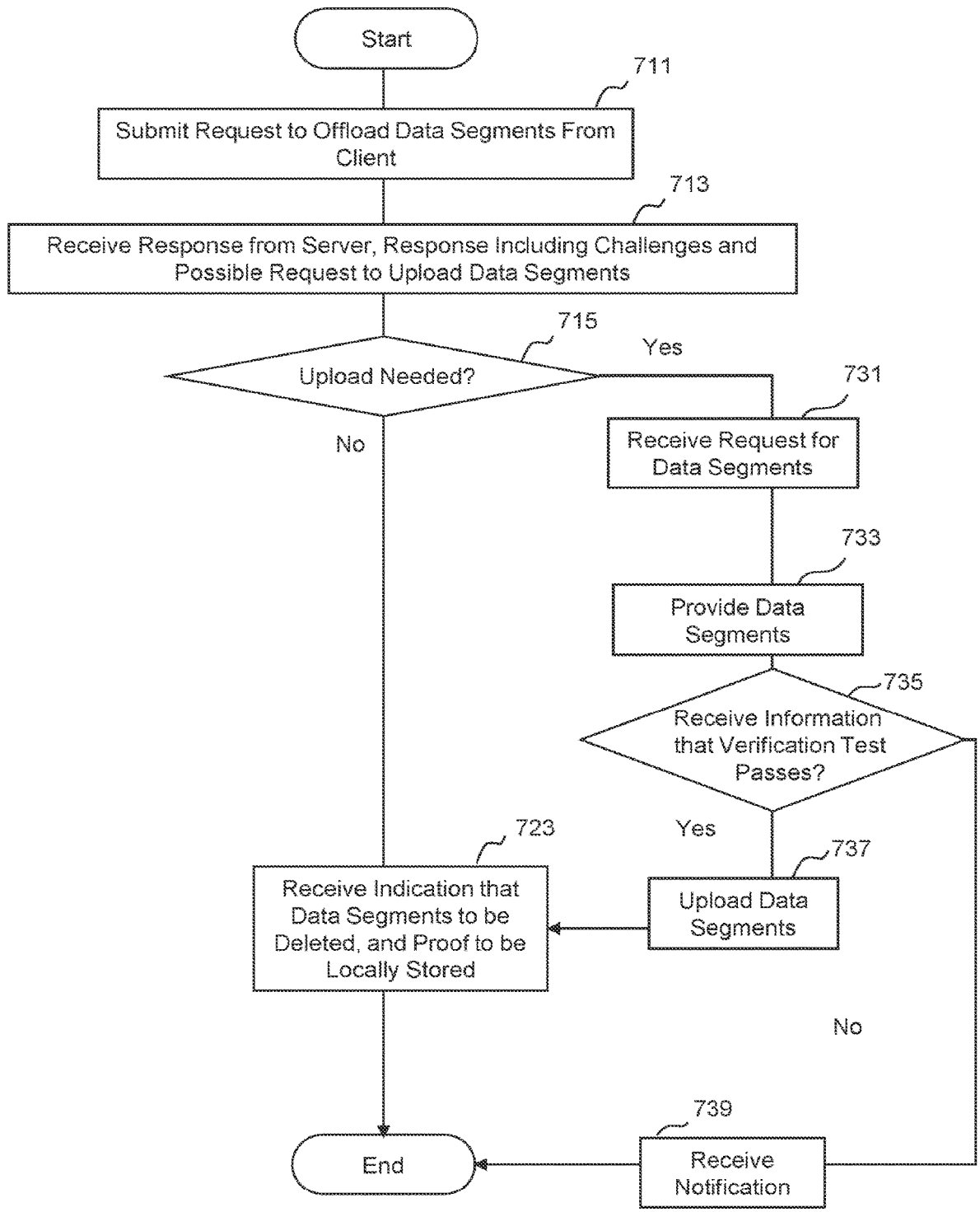

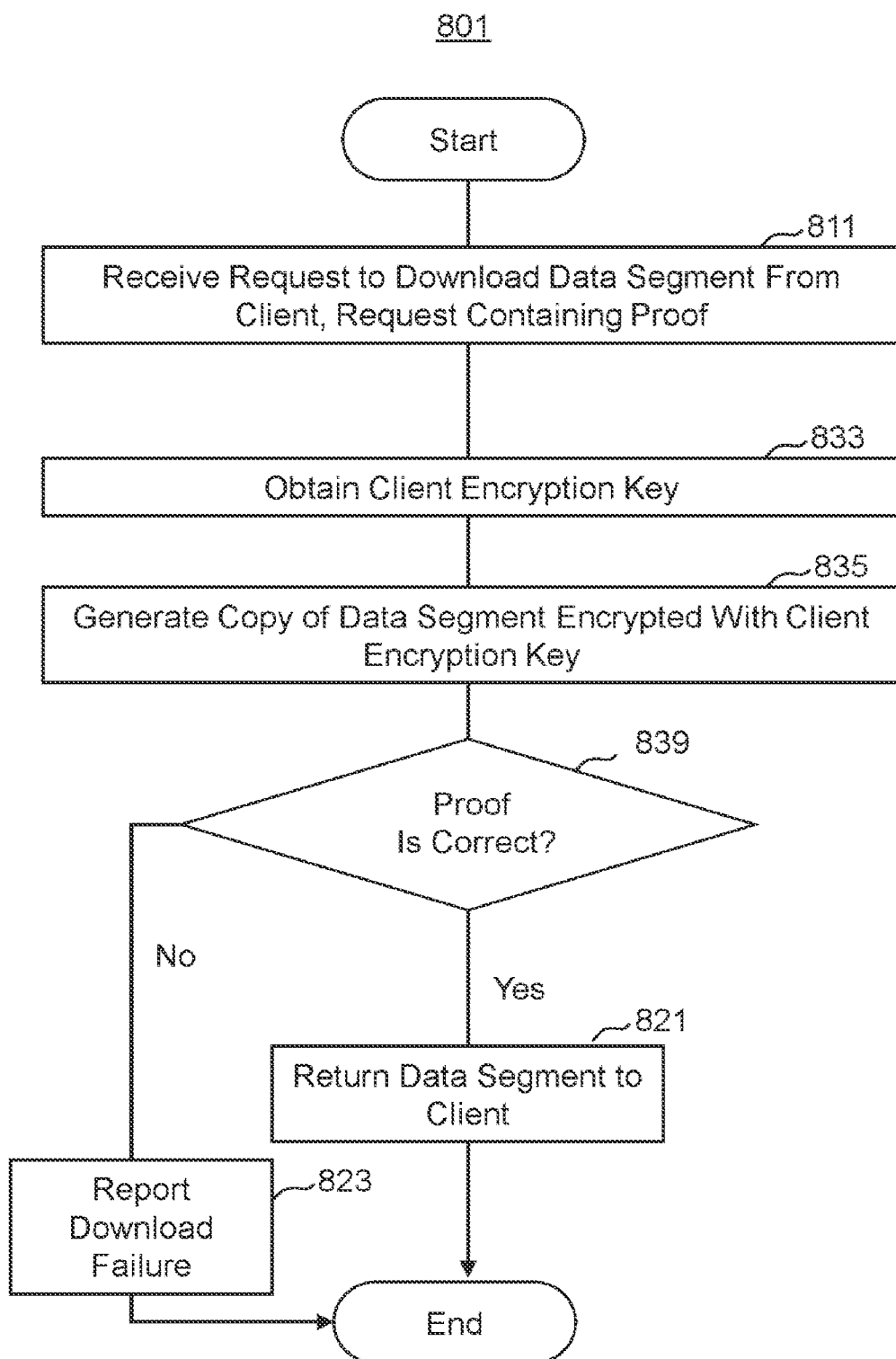

Step 1, Recording Broadcast Program

Step 2, Performing Data Segmentation

Step 3, Creating Probe Request

Step 4, Submitting Probe

Step 5, Client B Uploads

Step 6, Client A Probes

Step 7, Upload Some of Data Segments,
Do not Upload Other Data Segments

2100

SYSTEMS AND METHODS FOR DATA PROCESSING, STORAGE, AND RETRIEVAL FROM A SERVER

CROSS REFERENCE TO RELATED APPLICATIONS

This application is a continuation, and claims the benefit of priority, of U.S. patent application Ser. No. 17/129,891, filed on Dec. 21, 2020, currently pending, which is a continuation-in-part, and claims the benefit of priority, of U.S. patent application Ser. No. 16/660,761, filed on Oct. 22, 2019, currently pending. The contents of all the above-listed applications are incorporated herein by reference in their entireties.

BACKGROUND

Technical Field

The present disclosure relates to systems and methods for establishing data communication with a data storage provider and for exchanging data with the data storage provider. More particularly, various embodiments of the present disclosure relate to transmitting video data to and from the data storage provider.

Background Information

Direct to home (DTH) broadcasting occurs when content providers transmit data using satellites (such as satellite television or satellite radio), and digital terrestrial television (DTT) broadcasting occurs when content providers transmit data (e.g., digital television data) over the air with broadcast towers. Combined with cable broadcasts (e.g., using auxiliary cables to cable boxes), these technologies remain a primary source for content distribution to consumers.

In addition to DTH, DTT, and cable, over the top (OTT) services include multimedia content providers that stream content directly to viewers over the Internet, bypassing telecommunications, multichannel television, and broadcast television platforms that traditionally act as a content controller or distributor. Users have widely embraced OTT services, such as web-based and video-on-demand services, as alternatives to traditional multimedia platforms.

Developers and broadcasters have turned to digital rights management (DRM) techniques to securely distribute content using OTT services. For example, an application on a user device, such as a smartphone, laptop, or the like, may use a key, certificate, or other encryption protocol to receive copyrighted content and decode the same for playback. Some OTT services may allow for non-transitory storage of copyrighted content on a user device for offline playback.

Existing encryption techniques face important challenges that limit the flexibility of storing content transmitted using DTH, DTT, and cable technology. User devices are often not allowed to transmit or store copyrighted content without encryption. For example, users may retain the key, certificate, or other encryption protocol on the user device to prevent a third party from obtaining unauthorized access to the contents of the encrypted content. However, this leads to redundancies if the user stores the copyrighted content remotely, e.g., using a cloud service or the like. In particular, the remote storage must store each and every user's copy of the copyrighted content in full because the remote storage is unable to determine overlapping (also referred to as common or equivalent) content. Further, reducing the transmission of copyrighted content may reduce security risks, and may lead to better network utilization and storage efficiency. For example, transmitted copyrighted content may be intercepted on a network, and, in some cases, may be decrypted by a bad actor. Therefore, traditional approaches for storing data may result in vulnerabilities and redundancies for copyrighted content.

These challenges are also present for content from OTT systems or when DTH, DTT, or cable technologies cooperate with OTT systems for upload and remote storage of content. For example, the same redundancies and vulnerabilities occur if copyrighted content from an OTT system is uploaded to remote storage.

The disclosed systems and methods for recognition, storage, and transmission of encrypted data structures address one or more of the problems set forth above and/or other problems in the prior art.

SUMMARY

Embodiments consistent with the present disclosure provide systems and methods for establishing data communication with a data storage provider and for exchanging data with the data storage provider.

Disclosed embodiments may include any one of the following embodiments alone or in combination with one or more other embodiments, whether implemented as a method, by at least one processor, and/or stored as executable instructions on non transitory computer readable media.

Consistent with a disclosed embodiment, a method for identifying a data segment is provided. The method is performed by at least one processor and comprises receiving a first data segment associated with a first recording time, the first data segment comprising one or more first data packets, wherein a starting first data packet includes a first time reference value. The method further includes receiving a second data segment associated with a second recording time, the second data segment comprising one or more second data packets, wherein a starting second data packet includes a second time reference value. The method also comprises comparing the first recording time with the second recording time, the first time reference value with the second time reference value, wherein comparing the first time reference value and the second time reference value comprises determining whether the first time reference value matches identically the second time reference value. Further, the method includes comparing a first length enumeration for the first data packets with a second length enumeration for the second data packets, wherein comparing the first length enumeration and the second length enumeration comprises determining whether the first length enumeration matches identically the second length enumeration. Also, the method includes determining, based on the comparing a match between the first data segment and the second data segment; and identifying the first data segment as the same as the second data segment based on the determining.

Further, consistent with a disclosed embodiment, the method may include evaluating a time metric by computing an absolute value of a difference between the first recording time and the second recording time, wherein the determining further is based on the evaluated time metric, and wherein the identifying further is based on the time metric is within a threshold range.

In an example embodiment, the first time reference value comprises a system clock reference of the first data segment, and the second time reference value comprises a system clock reference of the second data segment.

In an example embodiment, the first time reference value comprises a program clock reference of the first data segment, and the second time reference value comprises a program clock reference of the second data segment.

In an example embodiment, the first time reference value comprises a presentation timestamp of the first data segment, and the second time reference value comprises a presentation timestamp of the second data segment.

In an example embodiment, the first length enumeration comprises a number of packets in the first data segment, and the second length enumeration comprises a number of packets in the second data segment.

In an example embodiment, the first length enumeration comprises a number of packets for the first data segment, and the second length enumeration comprises a number of packets for the second data segment.

In an example embodiment, the first length enumeration comprises a first many-to-one mapping rule between the number of packets for the rust data segment and a first unique integer number, and wherein the second length enumeration comprises a second many-to-one mapping rule between the number of packets for the second data segment and a second unique integer number, and wherein the first many-to-one mapping rule is the same as the second many-to-one mapping rule.

Consistent with a disclosed embodiment, a method for identifying a data segment, the method being performed by at least one processor comprises receiving a first and a second group of data segments each data segment in the first and the second group being defined by segment parameters, the segment parameters comprising a time at which each data segment in the first or the second group was received, a length enumeration for each data segment in the first or the second group, and a starting time reference value identified within each data segment in the first or the second group. The method includes for each first data segment from the first group determining a matching second data segment from the second group by comparing first segment parameters of the first data segment with second segment parameters of the second data segment, resulting in a matching set of pairs of data segments.

Consistent with a disclosed embodiment, the method may further comprise identifying the matching set of pairs of data segments based on canonical segment parameters.

In an example embodiment, the canonicalized segment parameters for a matching pair of the first data segment and the second data segment are determined by selecting a time at which the first data segment was received as a canonical time, selecting a length enumeration for the first data segment as a canonical data segment length, and selecting a starting time reference value identified within the first data segment as a canonical starting time reference.

In an example embodiment, the length enumeration comprises a number of packets for the first data segment.

Consistent with a disclosed embodiment, the method may further comprise determining a group of pairs from the matching set of pairs.

In an example embodiment, comparing the first segment parameters with the second segment parameters comprises comparing a first starting time reference value of the first parameters with a second starting time reference value of the second parameters and determining whether the first starting time reference value matches identically the second starting time reference value.

In an example embodiment, comparing the first segment parameters with the second segment parameters comprises comparing a first length enumeration of the first parameters and a second length enumeration of the second parameters and determining whether the first length enumeration matches identically the second length enumeration.

In an example embodiment, comparing the first segment parameters with the second segment parameters comprises determining an absolute value of a difference between a first time of the first parameters and a second time of the second parameters, and determining whether the absolute value is below a time threshold.

Consistent with a disclosed embodiment, a method of splitting a data stream into a set of data segments is provided. The method is performed by at least one processor, and includes receiving the data stream, wherein the data stream comprises data packets, with at least some of the data packets having time identifiers, selecting a segment time period and a time domain, subdividing the time domain into a set of time blocks, each one of the set of time blocks having a duration of the segment time period, identifying a set of starting data packets corresponding to the set of time blocks, wherein each one of the set of starting data packets comprises a first data packet having a time identifier in a corresponding each one of the set of time blocks, identifying a set of finishing data packets corresponding to the set of starting data packets, wherein each identified one of the set of finishing data packets immediately precedes each one, except a first one, of the set of starting data packets, identifying a last one of the set of finishing data packets being a last data packet of a last one of the set of time blocks, and identifying the set of data segments based on the corresponding set of starting data packets and the corresponding set of finishing data packets.

In an example embodiment, a data segment from the set of data segments includes a corresponding starting data packet from the set of starting data packets, a corresponding finishing data packet from a set of finishing data packets, and all data packets of the data stream located between the corresponding starting data packet and the corresponding finishing data packet.

In an example embodiment, the segment time period is in a range of one to tens of seconds.

In an example embodiment, the segment time period is determined by a number, such that the segment time period is substantially an exponentiation of two in a power of the number divided by a frequency of a clock.

In an example embodiment, the data stream comprises compressed video data, and wherein the clock is a system time clock associated with a decoder for the compressed video data.

In an example embodiment, the data stream comprises compressed video data, and wherein the clock is a program clock reference associated with a decoder for the compressed video data.

In an example embodiment, the data stream comprises compressed video data, and wherein the clock is a presentation timestamp associated with a decoder for the compressed video data.

In an example embodiment, the time identifiers identify time positions of the video data, and wherein the time positions substantially match time values obtained from the system time clock being one of a program clock reference or a presentation timestamp.

In an example embodiment, the data stream comprises an MPEG-2 transport stream of the data packets communicated via a network.

Consistent with a disclosed embodiment, the method may further comprise determining a probability of a data packet being missed from a data segment during the communication of the data stream and selecting the segment time period such that a probability of the data packet being missed from the data segment is less than a target probability value.

Consistent with a disclosed embodiment, the method may further comprise determining an overhead cost associated with the processing of the data segment and selecting the segment time period such that the overhead cost is less than a target overhead value.

Consistent with a disclosed embodiment, the method may further comprise for a time segment period determining a probability of a data packet being missed from a data segment having the segment time period, determining an overhead cost associated with the processing of the data segment, and based on a cost function associated with the probability and the overhead cost, determining a target time segment period that minimizes the cost function.

Consistent with a disclosed embodiment, a method of splitting a data stream into a set of data segments is provided. The method may be performed by at least one processor and includes receiving the data stream, wherein the data stream comprises data packets of a fixed length, with at least some of the data packets having bit number identifiers, selecting a segment length unit and a total length, subdividing the total length into a set of length blocks, each one of the set of length blocks having a length of the segment length unit, identifying a set of starting data packets corresponding to the set of length blocks, wherein each one of the set of starting data packets comprises a first data packet having a bit number identifier in a corresponding each one of the set of length blocks, identifying a set of finishing data packets corresponding to the set of starting data packets, wherein each identified one of the set of finishing data packets immediately precedes each one, except a first one, of the set of starting data packets, identifying a last one of the set of finishing data packets as being a last data packet of a last one of the set of length blocks, and identifying the set of data segments based on the corresponding set of starting data packets and the corresponding set of finishing data packets.

In an example embodiment, a data segment from the set of data segments includes a corresponding starting data packet from the set of starting data packets, a corresponding finishing data packet from a set of finishing data packets, and all the data packets of the data stream located between the corresponding starting data packet and the corresponding finishing data packet.

In an example embodiment, the segment length unit is determined by a number, such that the segment length unit is substantially an exponentiation of two in a power of the number.

In an example embodiment, the data stream comprises a transport stream of the data packets communicated via a network to a user device.

Consistent with a disclosed embodiment, the method may further comprise determining a probability of a data packet being missed from a data segment during the communication of the data stream and selecting the segment length unit such that a probability of the data packet being missed from the data segment is less than a target probability value.

Consistent with a disclosed embodiment, the method may further comprise determining an overhead cost associated with the processing of a data segment and selecting the segment length unit such that the overhead cost is less than a target overhead value.

Consistent with a disclosed embodiment, the method may further comprise for a segment length unit determining a probability of a data packet being missed from a data segment having the segment length unit, determining an overhead cost associated with the processing of the data segment, and based on a cost function associated with the probability and the overhead cost, determining a target segment length unit that minimizes the cost function.

Consistent with a disclosed embodiment, a method of selectively decrypting encrypted data is provided. The method is performed by at least one processor and includes identifying a first encrypted data bit and a last encrypted data bit associated with a portion of encrypted data, identifying a first encrypted block including the first encrypted data bit, and a first counter associated with the first encrypted block, identifying a last encrypted block including the last encrypted data bit, and a last counter associated with the last encrypted block, identifying a set of encrypted blocks, the set of encrypted blocks including the first encrypted block, the last encrypted block, and a set of all encrypted blocks located between the first and the last encrypted block, identifying a set of counters corresponding to the set of encrypted blocks, the set of counters including the first counter, the last counter, and a plurality of counters located between the first and the last counter, wherein a bitwise length of each one of the plurality of counters is the same as a bitwise length of each one of the set of encrypted blocks, selecting a plurality of encrypted data bits between and including the first encrypted data bit and the last encrypted data bit. The method further includes for each encrypted data bit from the plurality of encrypted data bits determining a corresponding encrypted block and a block number that contains the encrypted data bit, determining a corresponding counter for the determined block number, determining a bit position of the encrypted data bit within the determined encrypted block, selecting a counter bit at the bit position within the counter, encrypting the counter, and executing an XOR operation between the encrypted data bit and the corresponding encrypted counter bit.

In an example embodiment, identifying the first encrypted block comprises determining a first bit number associated with the first encrypted data bit, and determining a first block number, the determining based on the first bit number and a block length, wherein the first block number corresponds to the first encrypted block.

In an example embodiment, identifying the last encrypted block comprises determining a last bit number associated with the last encrypted data bit, and determining a last block number, the determining based on the last bit number and a block length, wherein the last block number corresponds to the last encrypted block.

In an example embodiment, the counter is encrypted using a cipher key.

In an example embodiment, the cipher key is locally available to the at least one hardware processor.

In an example embodiment, the encrypted data is encrypted using a block cipher counter mode.

In an example embodiment, the encrypted data is encrypted using a random initialization vector.

In an example embodiment, any one of the plurality of counters comprises a first part and a second part, the first part being the initialization vector, and the second part being a counter increment.

Consistent with a disclosed embodiment a method of selectively encrypting a portion of data is provided. The method is performed by at least one hardware processor and comprises identifying a first data bit and a last data bit associated with a portion of data, identifying a first block including the first data bit, and a first counter associated with the first block, identifying a last block including the last data bit, and a last counter associated with the last block, identifying a set of blocks, the set of blocks including the first block, the last block, and a set of all blocks located between the first and the last block, identifying a set of counters corresponding to the set of blocks, the set of counters including the first counter, the last counter, and a plurality of counters located between the first and the last counter, wherein a bitwise length of each one of the plurality of counters is the same as a bitwise length of each one of the set of blocks, selecting a plurality of data bits between and including the first data bit and the last data bit. The method further comprises for each data bit from the plurality of data bits determining a corresponding block and a block number that contains the data bit, determining a corresponding counter for the determined block number, determining a bit position of the data bit within the determined block, selecting a counter bit at the bit position within the counter, encrypting the counter, and executing an XOR operation between the data bit and the corresponding encrypted counter bit.

In an example embodiment, identifying the first block comprises determining a first bit number associated with the first data bit, and determining a first block number, the determining based on the first bit number and a block length, wherein the first block number corresponds to the first block, and wherein lengths for all blocks of the data are the same.

In an example embodiment, the first block number is a ceiling of a result of dividing the first bit number by the block length, wherein a starting block number of the data is assigned to one.

In an example embodiment, identifying the last block comprises determining a last bit number associated with the last data bit, and determining a last block number, the determining based on the last bit number and a block length, wherein the last block number corresponds to the last block, and wherein lengths for all blocks of the data are the same.

In an example embodiment, the last block number is a ceiling of a result of dividing the last bit number by the block length, wherein a starting block number of the data is assigned to one.

In an example embodiment, the set of counters are encrypted using a cipher key, resulting in a set of encrypted counters.

In an example embodiment, a cipher key is locally available to the at least one hardware processor.

Consistent with a disclosed embodiment, a method of selectively encrypting a portion of data is provided. The data is subdivided into a set of blocks, each block having a corresponding block number. In an example embodiment, the method is performed by at least one hardware processor and includes identifying a one-to-one mapping for mapping a block number to a unique block identifier, wherein a bitwise length of the unique block identifier is the same as a bitwise length of each one of the set of blocks, identifying a first data bit and a last data bit associated with the portion of the data, identifying a first block including the first data bit, identifying a last block including the last data bit, identifying a set of blocks including the first and the last blocks, and a set of all blocks located between the first and the last blocks. The method may further include for each data bit from a plurality of data bits located between and including the first data bit and the last data bit determining a corresponding block and a block number that contains the data bit, determining a unique block identifier for the determined block number, determining a bit position of the data bit within the determined block, selecting a unique block identifier bit at the bit position within the unique block identifier, encrypting the unique block identifier; and executing an XOR operation between the data bit and the corresponding encrypted unique block identifier bit.

In an example embodiment, the one-to-one mapping is created using a random number generator with a random seed being the cipher key.

In an example embodiment, the one-to-one mapping is created using a function that takes as an input the block number and at least one unique parameter associated with one of a user or a device of the user and returns a unique block identifier.

In an example embodiment, the unique parameter includes a unique device identification.

In an example embodiment, the unique block identifier is encrypted using a cipher key.

In an example embodiment, the unique block identifier comprises a first part and a second part, wherein the first part being an initialization vector and the second part being a result of the one-to-one mapping.

Consistent with a disclosed embodiment, a method of authenticating data received from a user device by a service provider is provided. The method is performed by at least one processor of the service provider and includes receiving user credentials from the user device via a secure communication channel, upon verifying the user credentials, providing to the user device via the secure channel a permission token, wherein the permission token includes at least a shared secret, wherein a data within the permission token is not observable to the user device and a shared secret data outside the data of the permission token, the shared secret data observable to the user device. The method further includes receiving a request from the user device via a non-secure communication channel, wherein the request comprises at least the permission token and a hash digest formed using at least a portion of the shared secret data.

In an example embodiment, the permission token is encrypted based on a cryptographic key maintained by the service provider and not made available to the user device.

In an example embodiment, the shared secret data includes a sequence number.

In an example embodiment, the shared secret data includes one of an increment algorithm or a download challenge, or both the increment algorithm and the download challenge.

In an example embodiment, the permission token includes secret data, the secret data representing at least a period of validity of the permission token.

In an example embodiment, the request includes information about video data, and wherein the permission token includes information regarding a channel identification comprising one of a broadcast channel identification or a broadcast program related to the video data.

Consistent with a disclosed embodiment, the method may further comprise upon successfully verifying the sequence number and the permission token, completing the request, communicating to the user device that the sequence number requires to be incremented, wherein the incrementation is carried out using the increment algorithm, and updating a local copy of the sequence number by incrementing the sequence number via the increment algorithm.

In an example embodiment, the increment algorithm comprises adding an integer to the sequence number.

In an example embodiment, the request comprises a request to offload a data segment.

In an example embodiment, the request comprises a proof that the user device is in possession of the data segment, and wherein the shared secret data and the proof are used to form the hash digest.

In an example embodiment, the request comprises a segment identification for the data segment.

In an example embodiment, the request comprises a broadcast channel identification.

In an example embodiment, the request comprises a hash digest computed based on at least one of a proof that the user device is or was in possession of the data segment, a segment identification for the data segment, the sequence number, or a broadcast channel identification.

In an example embodiment, the request comprises a hash digest computed based on all of a proof that the user device is in possession of the data segment, a segment identification for the data segment, the sequence number, and a channel identification.

In an example embodiment, completing the request to upload the data segment comprises providing to the user device a challenge for offloading the data segment, wherein the challenge comprises a request for one or more bits of data of the data segment, receiving a communication from the user device, wherein a proof for the received challenge is included in a hash digest, and upon verifying the hash digest based on a local copy of a proof, authorizing the user device to offload the data segment.

In an example embodiment, at least some data communicated over the non-secure communication channel between the user device and the service provider is encrypted using a user device-based encryption key.

In an example embodiment, the service provider has access to a user-device based encryption key.

In an example embodiment, the request comprises a request to download a data segment.

In an example embodiment, completing the request to download the data segment comprises providing to the user device a challenge for downloading the data segment, wherein the challenge comprises a request for one or more bits of data of the data segment, receiving a communication from the user device, wherein a proof for the received challenge is included in a hash digest, and upon verifying the hash digest based on a local copy of a proof, authorizing the user device to download the data segment.

Consistent with disclosed embodiment, a system for exchanging data securely between a user device and a server is provided. The system includes server instructions, wherein at least one processor of the server performs the server instructions resulting in server operations comprising receiving a user credential from the user device via a secure communications channel, upon verifying the user credentials, providing to the user device via the secure channel, a permission token, wherein the permission token includes at least a sequence number, wherein a data within the permission token is not observable to the user device, and the sequence number outside the data of the permission token, the sequence number observable to the user device. The server operations may further comprise receiving a request from the user device via a non-secure communication channel, wherein the request comprises at least the permission token and a hash digest formed using in part the sequence number, verifying the request by verifying the sequence number and the permission token. Further, the system includes at least one processor of the user device configured to perform operations comprising providing the user credential to the server via the secure communications channel, receiving the permission token via the secure communications channel, forming the request to the server, and providing the permission token and the hash digest to the server via the non-secure communications channel.

In an example embodiment, at least one processor of the user device is configured to perform operations further comprising forming a hash digest computed based on at least a proof that the user device is in possession of the data segment, a segment identification for the data segment, the sequence number, or a broadcast channel identification.

In an example embodiment, the request comprises a request to upload a data segment.

In an example embodiment, the server operations further comprise upon verifying the hash digest using the local copy of the proof, authorizing the user device to upload the data segment.

In an example embodiment, comprising providing to the user device via the secure channel a challenge and an increment algorithm.

In an example embodiment, the user device is further configured to perform operations comprising forming the proof based on the provided challenge and providing the permission token and the proof to the server via the non-secure communications channel.

Consistent with a disclosed embodiment, a method of authenticating data received from a user device by a service provider is provided. The method is performed by at least one processor of the service provider and includes receiving user credentials from the user device via a secure communication channel, upon verifying the user credentials, providing to the user device via the secure channel a handle to a permission token, wherein the permission token includes at least a shared secret, wherein a data within the permission token is not observable to the user device, and a shared secret data outside the data of the permission token, the shared secret data observable to the user device. The method may further include receiving a request from the user device via a non-secure communication channel, wherein the request comprises at least the handle to the permission token and a hash digest of the shared secret data. The method may further include verifying the request by comparing the hash digest received from the user device with a computed hash digest, wherein the computed hash digest is obtained using data obtained by retrieving the permission token using the handle to the permission token.

Consistent with a disclosed embodiment, a method for offloading a data segment comprises receiving a request from a user device to offload the data segment, the request including a probe request wherein the probe request includes a segment identification. The method includes sending a probe response to the user device, the probe response comprising an approval or decline of an action to be executed by the user device, the action being one of an upload, or a request to retry offloading the data segment at a later time. Further the method includes sending a challenge to the user device.

In an example embodiment, the challenge comprises a request for one or more bits of data of the data segment.

In an example embodiment, the probe request includes a segment identification formed using a recording time for the data segment, a reference time value for the data segment, and a length enumeration for the data segment.

Consistent with a disclosed embodiment, the method may further comprise requesting the user device to store the challenge, and a user device proof, wherein the challenge and the user device proof is specific to the data segment.

In an example embodiment, the upload is declined if data corresponding to the data segment is known to be recoverable from a server.

Consistent with a disclosed embodiment, the method may further comprise determining whether the segment identification matches one of the segment identifications associated with one of the local copies of data segments recoverable from a server.

Consistent with a disclosed embodiment, the method may further comprise determining that the action is an approval of the upload when the segment identification does not match any of the segment identifications associated with one of the local copies of data segments recoverable from a server.

Consistent with a disclosed embodiment, the method may further comprise determining that the action is a decline of the upload when the segment identification matches at least one of segment identifications associated with one of the local copies of data segments recoverable from a server.

In an example embodiment, the challenge is unique for the user device.

In an example embodiment, the challenge is generated for the user device based on an identification of the user device.

Consistent with a disclosed embodiment, the method may further comprise authenticating the user device before receiving the request from the user device.

Consistent with a disclosed embodiment, the method may further comprise receiving the data segment and the segment identification information when the probe response to the user device indicates that the upload is approved.

Consistent with a disclosed embodiment, the method may further comprise receiving uploaded data, the uploaded data comprising information used to obtain a user device content key, wherein the content key is configured to partially decrypt the data segment.

Consistent with a disclosed embodiment, the method may further comprise notifying the user device that the uploaded data is received after receiving the uploaded data.

In an example embodiment, the data segment is encrypted commutatively with at least the content key and a common key.

Consistent with a disclosed embodiment, the method may further comprise the uploaded data comprises a local server copy of the data segment, the local server copy of the data segment is stored at a storage device associated with the local server, the local server copy of the data segment being encrypted only by the common key.

Consistent with disclosed embodiment, a method for providing a data segment for downloading to a user device may include receiving a request from the user device to download the data segment, the request comprising a data segment identification and a user device proof, obtaining a content key, encrypting a local server copy of the data segment with the content key, generating a server proof based on the encrypted local server copy of the data segment and a challenge, comparing the user device proof with the server proof. The method may further comprise, when the user device proof matches the server proof, providing the user device with the local server copy of the data segment, and when the user device proof does not match the server proof, either requesting the user device to retry downloading the data segment at a later time, or notifying the user device that the data segment cannot be downloaded.

Consistent with a disclosed embodiment, the method may further comprise authenticating the user device before receiving the request from the user device.

In an example embodiment, the server proof is generated using the received challenge.

In an example embodiment, the challenge comprises a request for one or more bits of the data segment extracted starting at a particular bit position in the data segment.

In an example embodiment, the challenge is configured to be unique for each user device.

In an example embodiment, the challenge is received as a part of the request.

In an example embodiment, determining whether the user device proof matches the server proof comprises comparing the one or more bits of data of the data segment with the one or more bits of the local server copy of the data segment.

In an example embodiment, determining whether the user device proof matches the server proof comprises comparing a result of a hash digest of the one or more bits of data of the data segment obtained by the user device with a result of the hash digest of the one or more bits of the local server copy of the data segment obtained by a server.

Consistent with disclosed embodiment, a method for providing a data segment for downloading to a user device may include receiving a request from the user device to download the data segment, the request comprising a data segment identification and a user device proof, obtaining a content key, generating a server proof based on a local server copy of the data segment and a challenge, encrypting the server proof using the content key, comparing the user device proof with the encrypted server proof. The method may further comprise when the user device proof matches the encrypted server proof, providing the user device with the local server copy of the data segment and when the user device proof does not match the encrypted server proof, either requesting the user device to retry downloading the data segment at a later time, or notifying the user device that the data segment cannot be downloaded.

Additional objects and advantages of the disclosed embodiments will be set forth in part in the following description and will be apparent from the description or may be learned by practice of the embodiments. The objects and advantages of the disclosed embodiments may be realized and attained by the elements and combinations set forth in the claims.

It is to be understood that the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate various disclosed embodiments. In the drawings:

FIG. 3 is an exemplary diagram of a system for authentication and data communication, consistent with disclosed embodiments.

FIG. 7 depicts an example process for offloading data to a server, consistent with disclosed embodiments.

FIG. 8A depicts an example process for downloading data from a server, consistent with disclosed embodiments.

DETAILED DESCRIPTION

Figure 1:
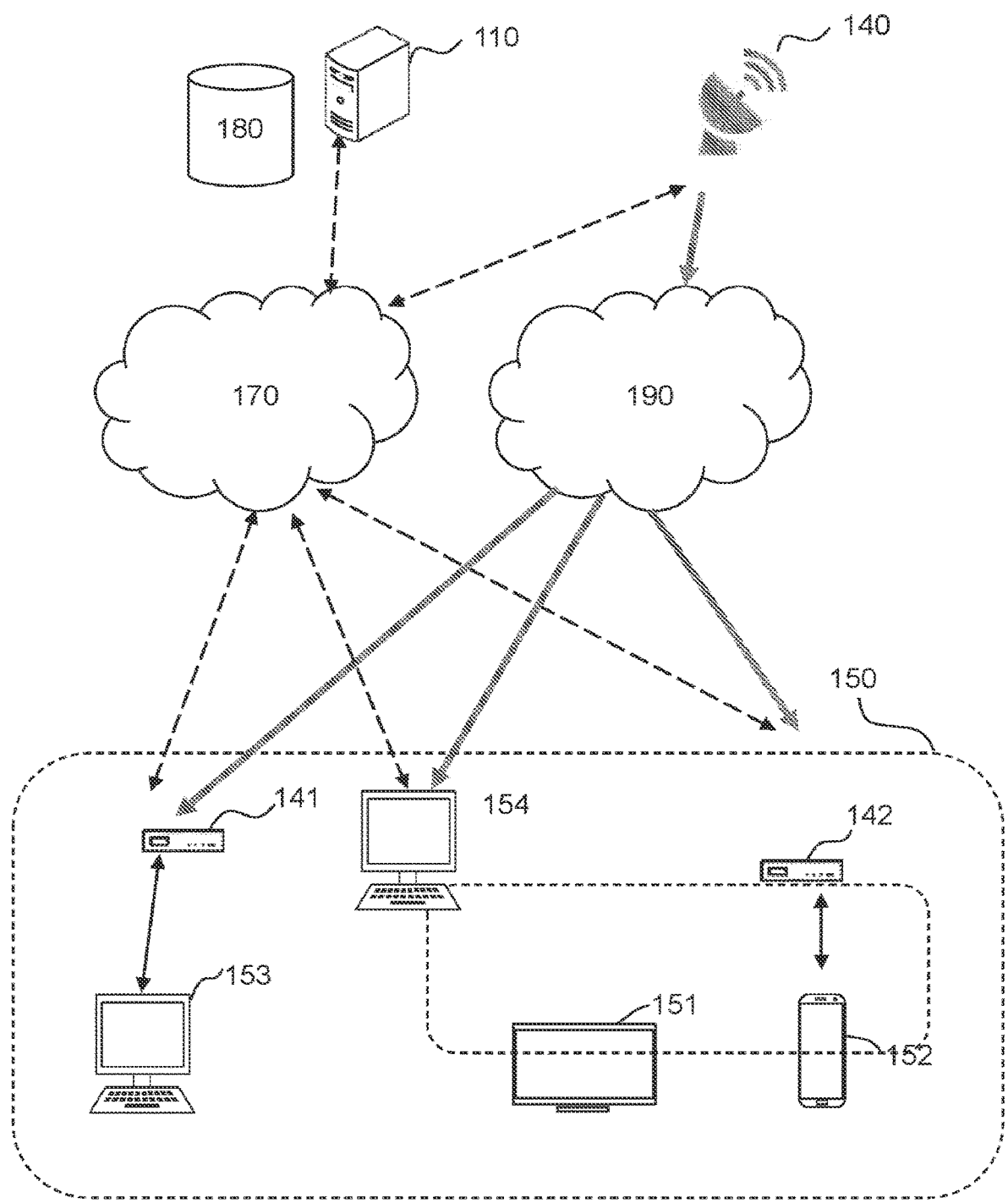
FIG. 1 is a block diagram of an exemplary system for establishing data communication with a data storage provider and for exchanging data with the data storage provider, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure is generally directed to systems and methods that enhance efficiency associated with transmitting and storing data that contains common content. In some embodiments, the disclosed systems and methods improve flexibility and security for copyrighted content by enhancing communication security when transmitting copyrighted content. For example, the disclosed systems and methods may use double encryption when copyrighted content is transmitted to allow for the transmission of one of the encryption keys with the content without risk of exposing the original unencrypted content. Moreover, the disclosed systems and methods may withhold transmission of at least one of the necessary keys to retain benefits provided by double encryption and allow for single encryption storage once the encrypted content is received. Further, the disclosed systems and methods may also increase flexibility by enabling a remote service to detect overlaps in copyrighted content without decryption, and can also be easily integrated with existing content delivery infrastructure, whether DTH, DTT, or cable transmission; OTT infrastructure; or other multimedia delivery techniques.

Although described above and below using double encryption, embodiments of the present disclosure may use any number of keys for encryption. For example, a client device may use additional keys to provide additional layers of encryption before sending a data structure (as well as the additional keys) to remote storage. Additionally, or alternatively, the remote storage may apply one or more keys locally to the remote storage when storing encrypted content.

Multimedia content can be transmitted to client devices as data structures. In this description, data structures may refer to, for example, content segments (such as HLS segments), information chunks (such as PNG, IFF, MP3, and/or AVI files). URI fragments, URI queries, HTML5 fragments, and/or CSS3 fragments, etc.

To prevent unauthorized access to these data structures, existing systems, such as OTT infrastructure or cable networks, apply encryption such that only client devices (e.g., smartphones, tablets, laptops, auxiliary cable devices, or the like) having a particular key may decrypt the data structures and view the content therein. For example, the encryption may comprise asymmetric encryption such that the private key used by the client device to decrypt is distinct from the public key used by a content distributor to encrypt the data structures. In other embodiments, the encryption may comprise symmetric encryption such that the key used by the client device to decrypt is the same key used by the content distributor to encrypt the data structures.

Remote storages, such as cloud services, may not store cleartext versions of content (i.e., an unencrypted content that is also referred to as a cleartext content or cleartext) without violating the copyright of the content. However, this may result in numerous redundancies if multiple users store overlapping (also referred to as equivalent) copyrighted content that is encrypted on the remote storage because the remote storage may then include multiple copies of the equivalent (or common) content encrypted with different keys or schemes. To solve these technical problems, the disclosed methods and systems enable storing content when content is determined to correspond to broadcast data. Thus, the remote storage may determine overlap in encrypted content without having access to the cleartext content, which may be copyrighted. For example, some embodiments of the disclosed techniques include generating a common key for use by client devices in further encrypting already encrypted content, whose cleartext version may be copyrighted. The remote storage may lack access to the common key (or to the private key of a common key pair in embodiments using asymmetric encryption). Accordingly, the key is common because multiple client devices may have access to the key, while the remote storage lacks access. In embodiments where the common key comprises the private key of a key pair, the remote storage may have access to the public key but does not have access to the private key, which is shared amongst client devices.

Because in some embodiments client devices may encrypt the already encrypted data structures with the common key, the common key may be configured for commutative application with the keys typically used by the client devices for viewing the copyrighted content. In such embodiments, the common key and/or the keys (whether one, two, or any number of keys) typically used by the client devices may comprise self-inverses. Additionally or alternatively, the common key and the keys typically used by the client devices may provide homomorphic encryption such that the remote storage may perform one or more operations (such as hash verification or calculation of a segment identifier using a hash) on the data structures without decrypting the same. Regardless of whether one or more of the keys are self-inverses, client devices may provide the individual keys typically used to the remote storages, but not the common key, ensuring that the client devices do not compromise the security of the copyrighted content. The remote storage may then recognize common content because it may remove encryption with the keys typically used by the client devices but does not have access to the common key (or to a private key of a common key pair in embodiments using asymmetric encryption).

Therefore, while allowing for storing of copyrighted content on remote storage, some embodiments of the disclosed systems and methods still allow for the security of the copyrighted content, taking advantage of commutative encryption technology. Thus, the disclosed systems and methods can provide a scalable and affordable technique that can easily be integrated into existing content delivery infrastructure while reducing redundancy on remote storage units. Further, in some embodiments, the double encryption that allows the secure, remote storage of copyrighted content may increase security during transmission of the same. In addition, some embodiments may include additional layers of encryption using keys local to client devices and/or to remote storages.

The disclosed systems and methods may be applicable to multiple content delivery schemes and may be adaptable to different delivery infrastructures. For example, the disclosed systems and methods can be used with multiple encoding, encryption, and packaging technologies. In some embodiments, the disclosed techniques may be applied to constant bitrate (CBR), adaptive bitrate (ABR), and variable bitrate (VBR) encodings. Moreover, the disclosed techniques may be employed with multiple packaging technologies such as Common Media Application Format (CMAF), MPEG-DASH, MPEG-2 transport stream (TS), HTTP Live Streaming (HLS), among others. Further, the disclosed systems and methods may be independent of the streaming mode used by the client. For example, the disclosed systems and methods may apply to any received or stored data structures subject to encryption, e.g., on account of a license required because the data structures include copyrighted content.

Further, to reduce exposure of copyrighted information in transmission or storage, the disclosed systems and methods may use hardware and/or software isolation on a client device (e.g., a trusted execution environment (TEE)) such that a portion of the client device encrypting a data structure including the copyrighted information with a common key is isolated from a portion of the client device decrypting the data structure including the copyrighted information using a first key, e.g., associated with a DRM license. Further, in such embodiments, the disclosed systems and methods may prevent all portions of the client device not using the first key (e.g., all portions not used for consumption of the copyrighted information by the user) from accessing a cleartext version of the data structure.

The disclosed systems and methods improve the technical field of storing content (e.g., multimedia content, images, text, or the like) remotely and solve technical problems associated with redundancies in storing encrypted data structures. In some embodiments, the disclosed systems and methods modify the conventional operation of client devices and remote storages with an encryption scheme that avoids revealing cleartext data structures but also permits recognition of common content from different client devices. Thus, the disclosed methods and systems may improve the efficiency of the remote storages by reducing redundant storages. The arrangement in the disclosed techniques may improve the resource utilization and minimize computer expenditures (e.g., processing, bandwidth, storage, etc.). These features not only result in more efficient systems that improve the storage of content but also enhance the user experience.

Reference will now be made in detail to the disclosed embodiments, examples of which are illustrated in the accompanying drawings.

FIG. 1 is a block diagram of an exemplary system 100, consistent with disclosed embodiments. In system 100, a content distributor 140 may comprise a DTH transmitter, DTT transmitter, cable service, or any other content delivery service using a one-way network, such as network 190, to provide content (e.g., copyrighted content) included in one or more data structures to clients (e.g., via client devices 150). Additionally or alternatively, content distributor 140 may comprise an OTT service using a two-way network, such as network 170, to provide copyrighted content included in one or more data structures to clients (e.g., via client devices 150).

Client devices 150 may include set-top boxes (STB) or set-top units (STU), customer premises equipment (CPE), and the like, such as receivers 141 and 142 configured to perform one or more operations consistent with disclosed embodiments. For example, client devices 150 may receive content from content distributors 140 over one-way network 190 or two-way network 170 using a receiver (e.g., receiver 142), and generate and display content in interfaces via display devices included in client devices 150. For example, client devices 150 may include a display (such as a television 151, a smartphone 152, or a monitor 153) to output content received from content distributors 140. Receivers 141-142 may be configured to record content and facilitate storage of content at server 110, as further discussed below. It should be appreciated that receivers 141 and 142 may be updated. For example, receiver 142 serving devices 154, 151, and 152 may be replaced by a new model. Additionally or alternatively, a hardware or firmware of receiver 142 may be updated. When receiver 142 is updated it may be authenticated with server 110 using any suitable approach (e.g., by a service provider via a phone call from a user, via an authentication software, and the like). In some cases, a household having receiver 142 may get a second receiver that may be configured to server devices 154, 151, and 152 (or other household devices). In some cases, two receivers may serve one client device. In some cases, client devices 152 may be configured to connect and disconnect from a particular receiver.

Additionally or alternatively, client devices 150 may include one or more computing devices configured to perform one or more operations consistent with disclosed embodiments. For example, in some cases, a client device (e.g., client device 154) may include a receiver software that allows client device 154 to perform functions of a receiver. Client devices 150 may include a desktop computer, a laptop, a server, a mobile device (e.g., tablet, smartphone, etc.), a gaming device, a wearable computing device, or another type of computing device. Client devices 150 may include one or more processors configured to execute software instructions stored in memory, such as memory included in client devices 150, to perform operations to implement the functions described below. Client devices 150 may be configured for wired and/or wireless communications and may include software that, when executed by a processor, performs internet-related communication (e.g., TCP/IP) and content display processes. For instance, client devices 150 may execute browser software that generates and displays interfaces including content on a display device included in, or connected to, client devices 150. Client devices 150 may execute applications that allow client devices 150 to communicate with content distributors 140 over a two-way network 170 or one-way network 190 and generate and display content in interfaces via display devices included in client devices 150. For example, client devices 150 may display a media player to output content received from content distributors 140.

Whether comprising STBs and STUs or computing devices, client devices 150 may further execute applications that allow client devices 150 to communicate with components over network 170, and upload content to and download content from remote storage server 110. For example, client devices 150 may display a cloud interface to provide for uploads to and downloads from remote storage server 110. Client devices 150 are further described in connection with FIG. 2B.

System 100 may include a remote storage server 110. Remote storage server 110 is further described in connection with FIG. 2A. In one exemplary configuration, remote storage server 110 may include one or more computing systems configured to perform operations consistent with handling content uploads from client devices 150 as well as content downloads to client devices 150. In some embodiments, remote storage server 110 may receive encrypted content from client devices 150, where the cleartext version of the encrypted content is copyrighted. For example, client devices 150 may request to upload encrypted data structures whose cleartext versions include a movie, a TV show, a song, a book, or the like, using an appropriate secure request (e.g., a secure HTTP request, an FTP request, or the like). Remote storage server 110 may provide infrastructure and components to receive the uploaded resource and securely store the same on behalf of client devices 150. In such embodiments, remote storage server 110 may verify that the user of client devices 150 has adequate authorization to remotely store encrypted versions of the content (e.g., by verifying a license associated with DRM technology, verifying proof to access the content, or the like).

In some embodiments, remote storage server 110 may prepare elements of system 100 for remote storage of encrypted content whose cleartext version is copyrighted. For example, remote storage server 110 may instruct client devices 150 to use a common key—which may allow for commutative encryption with the encryption from one or more other keys used by client devices 150 to encrypt the copyrighted content—that is used to keep uploaded content secret from remote storage server 110. For example, the common key may be accessible by client devices 150 but not remote storage server 110 through a key distribution center (KDC) or any other system distributing the common key to client devices 150 or may be derived by client devices 150 using a key determining or generating technique. Additionally or alternatively, the common key may be used in asymmetric encryption technology such that the common key comprising the private key of a key pair and is only accessible or provided to client devices 150. In such embodiments, the public key of the key pair may also be accessible to client devices 150 for encryption and optionally to remote storage server 110 because remote storage server 110 may not decrypt information using the public portion of the common key. In such embodiments, as further described below in connection with FIGS. 3, client devices 150 may provide the key used by client devices 150 to encrypt the copyrighted content to remote storage server 110. Accordingly, remote storage server 110 may partially decrypt content from client devices 150, identify corresponding content, and reduce redundant storage. For example, a "partial decryption" may comprise removing one or more layers of encryption from one or more keys while leaving one or more additional layers of encryption from one or more additional keys. Remote storage server 110 still cannot access fully decrypted content on account of its lack of access to the common key used by client devices 150 for double encryption. Some embodiments may include additional layers of encryption from client devices 150 and/or from remote storage server 110.

FIG. 1 shows client devices 150 connected to remote server 110 using two-way network 170. In such embodiments, client devices 150 may transmit keys to server 110 used by client devices 150 to encrypt copyrighted content (e.g., using separate ports on network 170, using separate upload protocols such as HTTP rather than FTP or the like, using different packet groups sent at different times, or the like). In some cases, keys may be delivered within the HTTP request to upload or download content. These keys may be, for example, sent as HTTP headers. In various cases, these keys may be securely delivered to server 110 (i.e., delivered such that a person-in-a-middle may not obtain these keys or disrupt transmission of the keys). Additionally, or alternatively, client devices 150 may connect to remote storage server 110 using one or more additional networks that are at least partially distinct from two-way network 170. For example, client devices 150 may use a cellular connection (e.g., using long term evolution (LTE), 4G, or the like) in addition to a wired connection (e.g., using ethernet or the like) and/or a different wireless connection (e.g., using a WiFi protocol, a Bluetooth® protocol, or the like). Although these networks may share components (e.g., using the same Internet backbone), they may still be at least partially distinct, as explained above. In another example, client devices 150 may upload the keys using a different route of servers on the Internet or other computer network that may be used for uploading the encrypted content whose cleartext version includes copyrighted content.

In some embodiments, as shown in FIG. 1, components of system 100 may be connected to a two-way network 170. Moreover, as shown in FIG. 1, other components of system 100 may additionally or alternatively be connected to a one-way network 190.

In an example embodiment, server 110 may have access to a database. The database may include one or more computing devices configured with appropriate software to perform operations consistent with providing remote storage server 110 data for performing transactions with client devices 150. The database may include, for example, Oracle™ databases, Sybase™ databases, or other relational databases or non-relational databases, such as Dynamo™ DB, Hadoop™ sequence files, HBase™, or Cassandra™. The database may include computing components (e.g., database management system, database server, etc.) configured to receive and process requests for data stored in memory devices of the database(s) and to provide data from the database(s). The database may be included in, or otherwise related to, remote storage server 110. For example, elements of the database may be embodied in one or more non-transitory media forming part of remote storage server 110.

The database may be configured to collect and/or maintain the data uploaded by users from client devices 150. For example, the database may store data structures uploaded by users via remote storage server 110 and (in some cases) data uploaded by content distributors 140. Thus, the database may collect the data from a variety of sources, including, for instance, content distributors 140 and/or remote storage server 110. In some cases, remote storage server 110 may be physically separate from one or more database(s).

Using a database may be one possible approach. Alternatively, data uploaded by users may be stored using any other suitable means (e.g., a file system). In an example embodiment, the data may be stored as a part of an Amazon Simple Storage Service (Amazon S3), or any other suitable storage.

FIG. 1 shows client devices 150 as singular devices. However, client devices 150 may be implemented as combinations of different devices. For example, elements in one of client devices 150 may be embodied in an STB or STU, such as a cable box, communicating with a user computing device, such as a laptop or desktop.

Two-way network 170 may be any type of network configured to provide communications between components of system 100. For example, network 170 may be any type of network (including infrastructure) that provides communications, exchanges information, and/or facilitates the exchange of information, such as the Internet, a Local Area Network, or other suitable connection(s) that enables the sending and receiving of information between the components of system 100. One-way network 190 may be any type of network configured to allow one component of system 100 to broadcast information to another component of system 100. For example, network 190 may be any type of network (including infrastructure) that provides frequency bands or other means of transmission for content to move from a broadcaster (such as content distributors 140) to receivers (such as client devices 150). In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope and spirit of the disclosed embodiments.

Figure 2A:
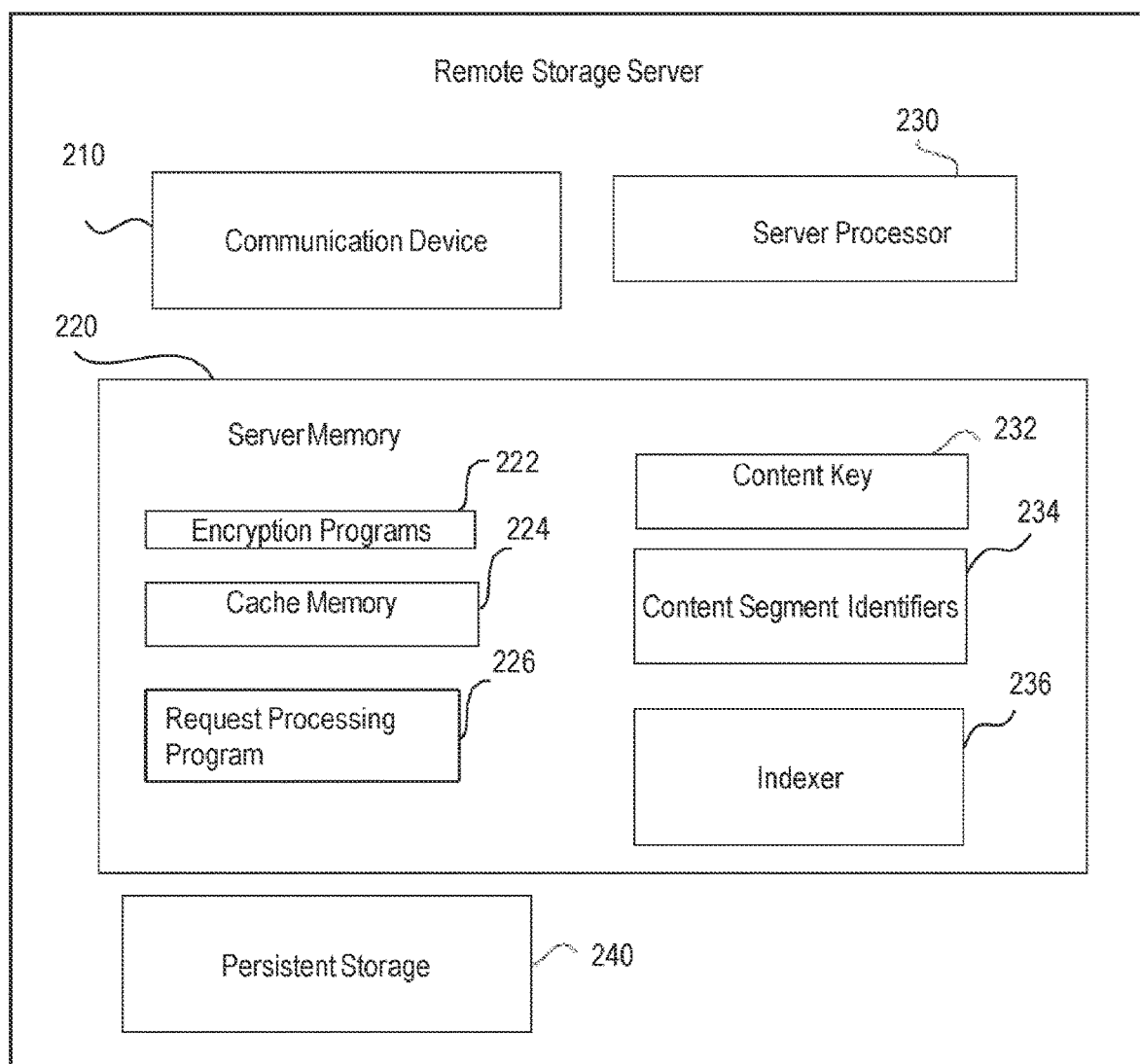
FIG. 2A is a block diagram of an exemplary remote storage server, consistent with disclosed embodiments.

FIG. 2A shows a block diagram of a remote storage server 110 (FIG. 1), consistent with disclosed embodiments. Remote storage server 110 may include a communication device 210, a server memory 220, a server processor 230, and a persistent storage 240. Server memory 220 may include encryption programs 222, cache memory 224, a client request processing program 226, a content key 232, a content segment identifier 234, and an indexer 236. Server processor 230 may use information stored in server memory 220 for various operations (e.g., processing client requests, encrypting/decrypting content, and the like).

In some embodiments, remote storage server 110 may take the form of a server, a general purpose computer, a mainframe computer, or any combination of these components. In other embodiments, remote storage server 110 may be a virtual machine, container instance, or serverless code (e.g., based on AWS™, Azure™, IBM Cloud™, etc.). Other implementations consistent with disclosed embodiments are possible as well.

Communication device 210 may be configured to communicate with one or more databases, such as databases 180 (FIG. 1) described above, and other elements of system 100 either directly or via network 170. In particular, communication device 210 may be configured to receive data structures from client devices 150 (FIG. 1). Further, communication device 210 may be configured to receive user account information from client devices 150 to verify an identity of client device 150 before storing the data structures. Additionally, or alternatively, communication device 210 or a separate communication device (not shown) may be configured to communicate with other components as well, including, for example, content distributors 140.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Server memory 220 may include one or more storage devices configured to store instructions used by server processor 230 to perform functions related to disclosed embodiments. For example, server memory 220 may store software instructions, such as encryption programs 222, that may perform operations when executed by server processor 230. The disclosed embodiments are not limited to separate programs or computers configured to perform dedicated tasks. For example, server memory 220 may include a single encryption program 222 that performs the functions of remote storage server 110, or encryption programs 222 may comprise multiple programs. Server memory 220 may also use cache memory 224 to store encrypted content and/or for encryption programs 222. For example, cache memory 224 may include copies of encrypted content that have been received from client devices 150 but not yet indexed and stored. Additionally. or alternatively, cache memory 224 may include copies of encrypted content retrieved from database(s) 180 before transmission to client devices 150. For example, with the encrypted content stored in cache memory 224, remote storage server 110 may quickly respond to user content requests. In such embodiments, locally storing encrypted content enables handling transactions without additional traffic and reduces latency.

In certain embodiments, server memory 220 may store client request processing program 226 which may include sets of instructions for carrying out processes to partially decrypt content stored in cache memory 224, perform user authentication or verification tasks, and/or interact with databases 180 to store and index uploaded content as well as retrieve content to respond to user requests. In certain embodiments, server memory 220 may store sets of instructions for requesting content from content distributors 140 in response to user requests to store such content. Other instructions are possible as well. In general, instructions may be executed by server processor 230 to perform processes consistent with disclosed embodiments.

In some embodiments, server processor 230 may include one or more processing devices such as, but not limited to, microprocessors such as ARM, Xeon™, Turion™, Intel Core family, AMD Ryzen family, or any other suitable processors, including graphical processing units (GPU) from other manufacturers. However, in other embodiments, server processor 230 may be a plurality of devices coupled and configured to perform functions consistent with the disclosure. For example, server processor 230 may include a plurality of co-processors, each configured to run specific remote storage server 110 operations such as floating-point arithmetic, graphics, signal processing, string processing, cryptography, or I/O interfacing.

In some embodiments, server processor 230 may execute software to perform functions associated with remote storage server 110. In some embodiments, server processor 230 may include multiple components configured to execute various functions of remote storage server 110. In such embodiments, each component may be a hardware device configured to specifically process data or perform operations of processing transactions. While an example embodiment, as shown in FIG. 2A, describes content key 232, indexer 236, and content segment identifiers 234 stored at server memory 220, in an alternative embodiment, some of the data (e.g., content key) may be stored on processor cache or registers. In some cases, indexer 236 may be included in a central processing unit (CPU) or a field-programmable gate array (FPGA). Other hardware combinations are also possible. In yet other embodiments, combinations of hardware and software may be used to implement server processor 230.

Content key 232 may comprise a key received from an example client device along with encrypted content. Herein, content key 232 may also be referred to as a local user key.

Content key 232 may allow encryption programs 222 to partially decrypt the received content. For example, encryption with content key 232 may commute with encryption with a common key such that the received content is double encrypted (or even further encrypted with additional content keys not shown in FIG. 2A). Accordingly, encryption programs 222 may partially decrypt the received content using content key 232 such that the partially decrypted content is still encrypted with the common key, to which remote storage server 110 lacks access.

Content segment identifiers 234 (e.g., URIs) may comprise one or more data structures received from client devices 150 identifying content whose encrypted versions are received by remote storage server 110. Accordingly, content segment identifiers 234 may be extracted using any tool for the identification of data structures from client devices 150. For example, content segment identifiers 234 may identify content using a secure token, a hash, a cookie, or an equivalent technique for identification. Additionally or alternatively, content segment identifiers 234 may comprise a universally unique identifier (UUID), a certificate, or any other data structure uniquely identifying the content whose encrypted versions are received by remote storage server 110. Additionally or alternatively, content segment identifiers 234 may be extracted using any tool for the verification of authorization by client devices 150 and/or users of those devices to upload particular content. For example, content segments identifiers 234 may be included in proof to access or a license to use particular data structures.

Indexer 236 may include one or more software implemented processes that identify portions of databases assigned to (or otherwise associated with) content segment identifier 234. For example, communication device 210 may receive encrypted content from client devices 150. Using content segment identifier 234 associated with the received content, indexer 236 may determine if the content is stored in the databases. If not available, remote storage server 110 may store a partially decrypted version of the received encrypted content in association with content segment identifier 234. If available, remote storage server 110 may decline to store a new copy of the partially decrypted content. In such embodiments, storing a single copy of the content reduces storage redundancy.

In some embodiments, encryption programs 222 may further partially decrypt the received content in order to verify the partially decrypted content. For example, indexer 236 may verify the partially decrypted content against an available copy already associated with content segment identifier 234. Alternatively, indexer 236 may verify the partially decrypted content against an expected hash signature or other identifiers of integrity within a data file if there is no available copy already associated with content segment identifier 234.

The components of remote storage server 110 may be implemented in hardware, software, or a combination of both. For example, although one or more components of remote storage server 110 may be implemented as computer processing instructions embodied in computer software, all or a portion of the functionality of remote storage server 110 may be implemented in dedicated hardware. For instance, groups of GPUs and/or FPGAs may be used to quickly process encrypted content in server processor 230.

Figure 2B:
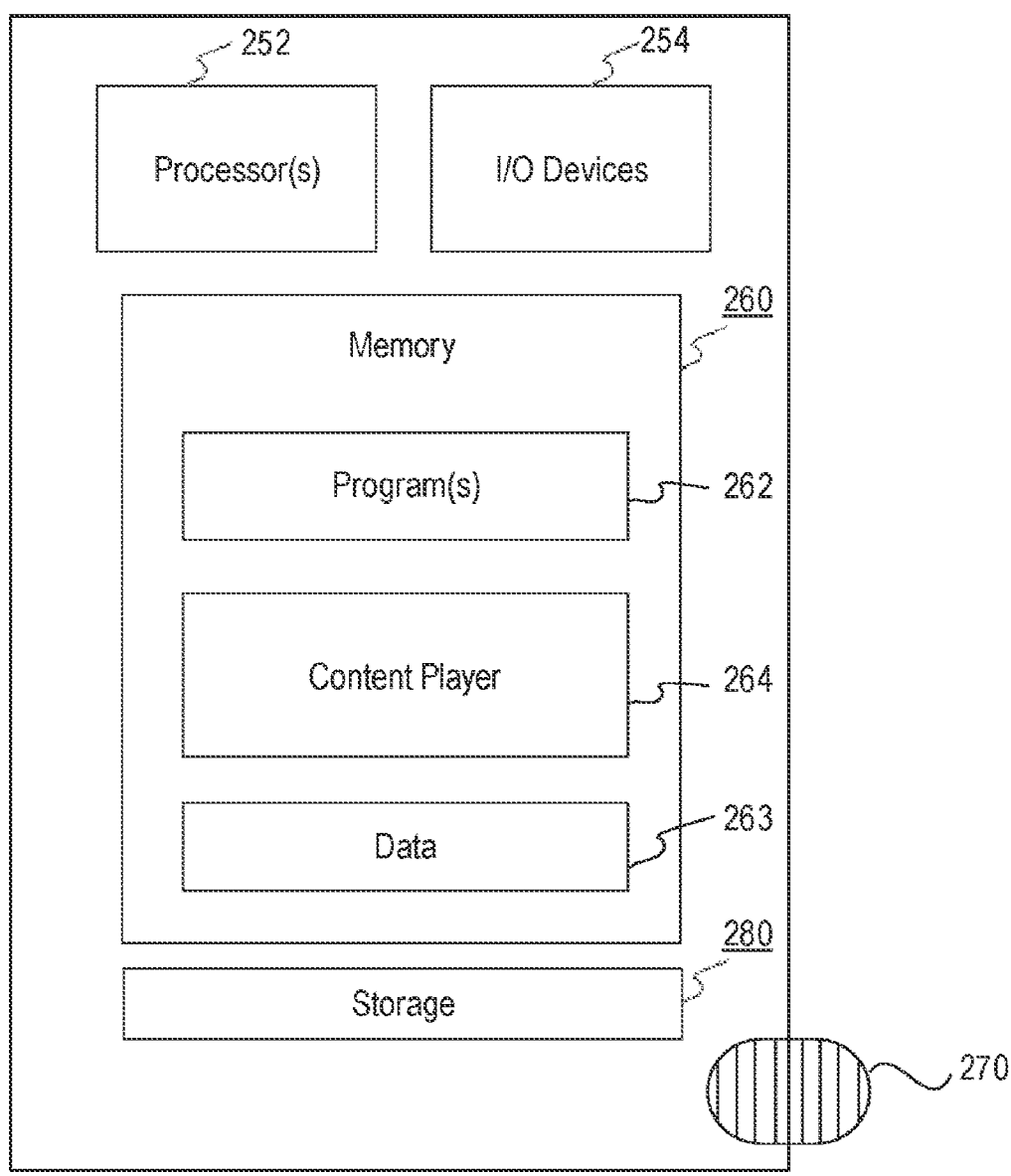
FIG. 2B is a block diagram of an exemplary client device, consistent with disclosed embodiments.

Referring now to FIG. 2B, there is shown a block diagram of an exemplary client device 150 (FIG. 1), consistent with disclosed embodiments. In one embodiment, client devices 150 may include one or more processors 252, one or more input/output (I/O) devices 254, one or more memories 260, and persistent storage 280 (e.g., a non-transitory storage medium such as flash memory, a hard disk drive, or the like). In some embodiments, client devices 150 may take the form of STBs, STUs, or any combination of these components. Accordingly, client devices 150 (or systems including client devices 150) may be configured as a particular apparatus, embedded system, dedicated circuit, and the like based on the storage, execution, and/or implementation of the software instructions that perform one or more operations consistent with disclosed embodiments. Additionally or alternatively, client devices 150 may take the form of smartphones, tablets, general purpose computers, or any combination of these components. According to some embodiments, client devices 150 may comprise web browsers or similar computing devices that access websites consistent with disclosed embodiments.

Processor 252 may include one or more known processing devices, such as mobile device microprocessors manufactured by ARM, Intel™, NVIDIA™, or various processors from other manufacturers. The disclosed embodiments are not limited to any specific type of processor configured in client devices 150.

Memory 260 may include one or more storage devices configured to store instructions used by processor 252 to perform functions related to disclosed embodiments. For example, memory 260 may be configured with one or more software instructions, such as programs 262 that may perform operations when executed by processor 252. The disclosed embodiments are not limited to separate programs or computers configured to perform dedicated tasks. For example, memory 260 may include a single program 262 that performs the functions of the client devices 150, or program 262 may comprise multiple programs. Memory 260 may also store data 263 that is used for processing and/or displaying multimedia content. That is, memory 260 may include instructions to play multimedia in the client devices 150, upload encrypted content to remote storage server 110 (FIG. 1), and/or generate requests for content from remote storage server 110 and/or content distributors 140 (FIG. 1). Additionally, or alternatively, the content may be extracted from persistent storage 280 to memory 260 for processing and/or displaying.

In certain embodiments, memory 260 may store instructions for displaying multimedia content in client devices 150. For example, memory 260 may include a content player 264. Moreover, in some embodiments, if content player 264 is not part of memory 260, client devices 150 may include programs 262 to download the applications required to view content and/or execute alternative media players to display the content. In addition, programs 262 may include client identification tools, such as secure cookies, to identify client devices 150 and/or users of client devices 150 and generate requests to remote storage server 110 and/or content distributors 140 including data structures for identifying the client and/or verifying permission to access the requested content. Further content player 264 may be configured to perform automated operations, such as transmitting a decline message when a user is not authorized or verified to view requested content or upload content from player 314.

Although depicted as separate components, memory 260 and processor 252 may comprise integrated circuits for an STB. STU, or other content receivers. For example, memory 260 and processor 252 may comprise a DVR, a PVR, or any other electronic device configured to receive content (e.g., from content distributors 140, as shown in FIG. 1).

I/O devices 254 may include one or more devices configured to allow data to be received and/or transmitted by client devices 150 and to allow client devices 150 to communicate (e.g., via two-way network 170 of FIG. 1) with other machines and devices, such as other components of system 100. For example I/O devices 254 may include a screen for displaying multimedia content or otherwise providing information to the user. I/O devices 254 may also include components for Internet communication or any other form of communication with components of system 100. I/O devices 254 may also include one or more digital and/or analog devices that allow a user to interact with client devices 150, such as a touch-sensitive area, buttons, or microphones. I/O devices 254 may also include other components known in the art for interacting with remote server 110 and content distributors 140.

In addition to or as an alternative to I/O devices 254, client devices 150 may also include a wired connection 270 (and/or corresponding wireless connection) to a one-way network (e.g., one-way network 190 of FIG. 1). For example, connection 270 may comprise an aux connection to a cable service, a wired connection to a satellite in a DTH system, a wired connection to an antenna in a DTT system, or any other connection for receiving content broadcast to client devices 150 (e.g., by content distributors 140 of FIG. 1).

The components of client devices 150 may be implemented in hardware, software, or a combination of both hardware and software, as will be apparent to those skilled in the art.

Aspects of the present disclosure include offloading data to a data storage (e.g., remote server 110, as shown in FIG. 1). Herein, the term "offloading" includes either uploading data to server 110 by one of the client devices 150 (e.g., client device 153) or establishing that server 110 has a copy of data being possessed by client device 153. In various embodiments, offloading implies that client device 153 may discard a local copy of offloaded data, and be able to download the same data from server 110 at a later time provided that it maintains a correct proof that it possessed the data prior to offloading the data. For example, if client device 153 receives a portion (or the entirety) of a broadcast (e.g., a portion of a DTH, DTT broadcast, or the like), client device 153 may be configured to either upload that portion to server 110, or to verify that server 110 has the portion of the broadcast that may be downloaded by client device 153. Once client device 153 establishes that it has access to the portion of the broadcast from server 110, client device 153 may remove a local copy of that portion from local storage (e.g., a hard drive associated with receiving box 141, as shown in FIG. 1). In order to ensure that content rights of broadcasting programs are appropriately protected, client device 153 may only have access to the portion of the broadcast that was previously received and recorded by hardware associated with client device 153 (e.g., receiving box 141, a computer system of client device 153, or the like).

An offload process may be completed via a probe and subsequent proof generation. Additionally, an optional upload may also complete the offload process. In various embodiments, a data segment recorded by client device 153 may not be removed from a local storage associated with client device 153 until a proof for that data segment is computed and stored at the local storage. In some cases, a copy of the challenge and/or a copy of the proof for the data segment may be also stored at a database associated with server 110. The copy of the challenge and/or the copy of the proof may then be used by server 110 to verify that client device 153 has (or previously recorded) the data segment. During the probe process, data segments of client device 153 (herein referred to as client's segments) may be validated by comparing at least some information about the client's segments (e.g., last few bits of the client's segments, metadata associated with client's segments, and the like) with relevant information about these segments stored in a suitable database (e.g., database 180). In such a case, when database 180 does not contain an equivalent copy of the client's segments, the probe process may compare information related to the client's segments with corresponding information for data segments received from other client devices to establish an authenticity of these segments, as further described herein. When the authenticity is established, the client's segments may need to be uploaded to database 180. In some cases, such upload may not be required, as data segments from other client devices may have been uploaded instead (or are currently being uploaded). During the offload the client's segments may be assigned segment identifications (iDs), and such IDs may be keys used for database 180. In some cases, the keys may be provided to client device 153, and such keys may be referenced by client device 153 during a download process. For example, client device 153 may identify data segments from database 180 using segment IDs for downloading the data segments.

In some embodiments, data obtained by client devices 150 may include errors in transmission or recording interruption, and server 110 may be configured to allow the client device that received the data with transmission errors (e.g., client device 153) to download a version of data that is the same as the version recorded by hardware associated with client device 153 (i.e., data that includes errors and interruptions).

In various embodiments, aspects of the present disclosure include systems, methods, and computer readable media for offloading data to a server (e.g., remote server 110, as shown in FIG. 1) from client devices (e.g., client devices 150, as shown in FIG. 1). The client devices 150 can request offloading data to server 110. The data can include data packets (e.g., MPEG-2 packets, or various other types of media or multimedia packets) and can be corresponding to, for example, a broadcast program. When server 110 receives an offloading request from one of the client devices 150 (e.g., client device 153 in FIG. 1), server 110 may verify whether the data for offloading has already been stored in a database of server 110, or is substantially identical to the data being offloaded by another client device 150 (e.g., client device 154 in FIG. 1). The server 110 itself, rather than the client devices 150, may perform the verification. Embodiments of the present disclosure permit recognition of common content from different client devices 150 without revealing the decrypted contents. Additional details regarding the data offloading are described in U.S. patent application Ser. No. 16/660,761, filed on Oct. 22, 2019, which is incorporated herein by reference in its entirety.

The data for offloading may be segmented into multiple segments. Each segment may comprise a sequence of packets. There may be, in some situations, reasons to identify a particular segment uniformly across all client devices 150. At least some packets of a segment may carry identifiers. Each identifier may uniquely identify a packet. In one example, the identifier can be a time base known as the system clock reference (STC). STC can be sampled and conveyed in Program Clock Reference (PCR) data or Presentation Timestamp (PTS) data. ISO13818-1 ITU-T H.222.0, for example, defines how transport streams are constructed with a Program Clock Reference (PCR). The STC may have discontinuities (e.g., jumps in value) caused by a clock reset. Furthermore, the PCR values may be a fixed number of bits and hence wraps every time this bitfield is overflowed. The value of the STC carried in the first PCR packet of any segment can be used. In an example embodiment, a data segment may be long enough to carry at least one PCR packet. However, this may not be long enough to uniquely identify this segment over an extended period of time, due to the possibility of discontinuities and STC wrapping around. Therefore, the STC value can be used along with other parameters to be described below to uniquely identify a segment over the long term.

Further, as previously described, client device 153 may not be required to upload data for a given broadcast program in order to be able to download a corresponding copy of the data. For example, client device 153 may only need to be able to provide a proof to server 110 that device 153 was at some point in possession of the data for the broadcast program for server 110 to authorize the download of the data. For a given broadcast program, multiple data segments may be required to be uploaded or offloaded. Data received by client device 153 may be transmitted to server 110 and protected with multiple encryption keys using a suitable form of commutative encryption, as described above.

Aspects of the present disclosure describe a system and a process for offloading a data segment. In an example embodiment, a client device (e.g., client device 153) may submit a request to offload data, such as video or audio data, to the server 110. For example, client device 153 may submit a request to offload data segments of a program broadcast to server 110. Client device 153 may first record video and/or audio data of the broadcast and then submit it to server 110. Upon completion of offloading data, client device 153 may remove at least some portion of data from a local storage system (e.g., receiving box 141). As described above, a data segment recorded by client device 153 may not be removed from a local storage associated with client device 153 until a proof for that data segment is computed and stored at the local storage.

The request from client device 153 may include authenticating the client device with server 110. For instance, client device 153 may authenticate via a secure network channel by providing to server 110 credentials of device 153, such as an identification and a password of device 153. In an example embodiment, receiving box 141 may be configured to communicate with server 110 and may include receiving box 141's identification and a password for authenticating receiving box 141 with server 110. In some cases, an additional authentication server may be used for authenticating client device 153, as further discussed below.

As previously discussed, an authentication server may be used for authenticating client device 153. An example authentication process 301, in which the authentication is facilitated by an authentication server 114, is shown in FIG. 3. At step 311, client device 153 may communicate its credentials (e.g., device identification and password) to server 114. In some cases, device 153 may be configured to communicate with server 114 via a receiver box 141. In an example embodiment, at step 311, client device 153 may establish secure network communication with server 114 using, for example, a password. Upon authenticating device 153, server 114 may be configured to communicate with server 110 to provide server 110 information for communicating with device 153.

Client device 153 may engage in various activities (herein, also referred to as actions) when communicating with server 110. For example, client device 153 may offload data to server 110 by either uploading content to server 110, or verifying that content is already uploaded to server 110. Alternatively, client device 153 may download content from server 110, provided that client device 153 can prove that the content was previously broadcast to client device 153.

Figure 4A:
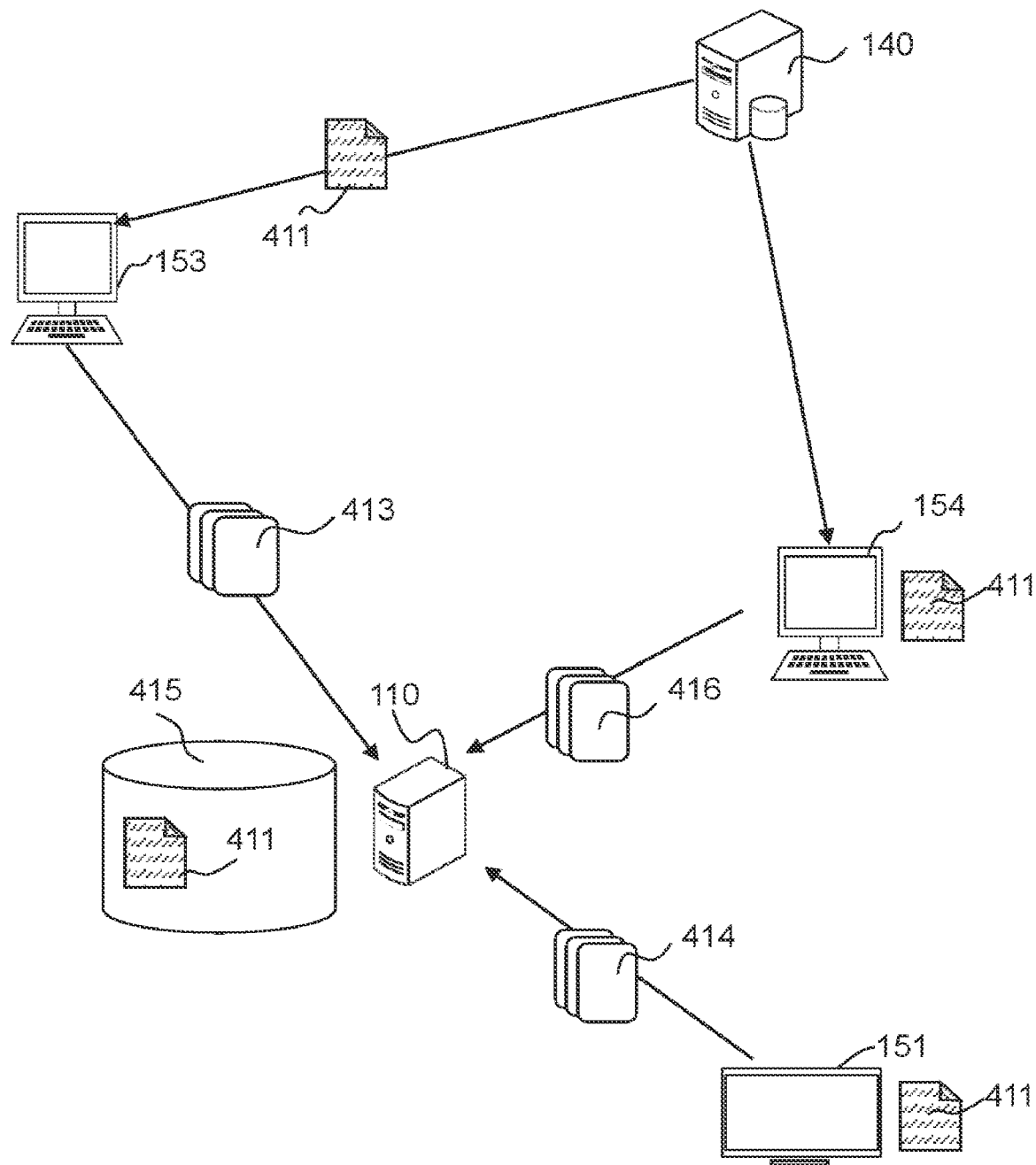
FIG. 4A is an exemplary diagram of a data communication system, consistent with disclosed embodiments.

For offloading data to server 110, client device 153 may submit an offloading (probe) request 413 to server 110, as shown in FIG. 4A. The offloading request 413 may be related, for example, to a broadcast program 411 that client device 153 received from content distributer 140 prior to submitting the offloading request. In an example embodiment, offloading request 413 includes offloading data segments without a priori knowledge of a broadcast program represented by the data segments. However, in some embodiments, offloading request 413 may include information about broadcast data that is being offloaded, such as a title of broadcast program 411, a time at which program 411 was transmitted to client device 153, a channel identification for broadcasting program 411, an identification number of program 411, or any other suitable information for identifying broadcast program 411.

Upon receiving request 413 for offloading the data from client device 153, server 110 may determine whether a copy of program 411 (or at least a portion of program 411) is already stored at a database (e.g., database 415, as shown in FIG. 4A) associated with server 110. For example, database 415 may have stored program 411 in response to requests of other client devices (e.g., devices 151 and 154) to store program 411. For instance, devices 151 and 154 may have previously received broadcast program 411 from distributer 140 and may have requested to store program 411 on server 110 prior to request 413 (as indicated by requests 414 and 416 and associated program 411). If program 411 is already stored in database 415, server 110 may proceed in verifying that data segments corresponding to program 411 being in possession of client device 153 match data segments of the copy of the program 411 that is stored in database 415.

In an example embodiment, server 110 may verify the data segments of program 411 by providing a download challenge (herein also referred to as a challenge) for client device 153. Herein, the challenge may be any suitable request to client device 153, for which a response from client device 153 indicates, with an acceptable degree of certainty, that client device 153 was in possession of the data segments corresponding to program 411 at the time of offload. For example, a challenge may include a request from server 110 to client device 153 to provide a few last bits or bytes of at least some (or each) data segment(s) corresponding to program 411. In an example embodiment, server 110 may request the last byte from data segments, a few last bytes from the data segments, or the like. In some cases, the challenge may include a request for a first few bytes and the last few bytes of a given data segment. Alternatively, or additionally, server 110 may generate an array of bit positions BP=$\{n_1, n_2, \ldots n_k\}$ and request bits from such positions of the data segment. For instance, an array of bit positions BP=$\{1, 19, 23\}$ may be used to request a first, a nineteenth, and a twenty-third bit from the data segment. In some cases, the numbers $n_1, n_2 \ldots n_k$ for the positions may be generated using a suitable random number generator with an appropriate seed. For instance, a hash function of the data segment may be used to obtain the seed for the random number generator. As used herein, a hash function (also, herein referred to as a hash) may be any function that can be used to map any binary data (e.g., data corresponding to a data segment of program 411) of arbitrary size to a fixed-size value or set of values. The values returned by a hash function are referred to as hash values, hash codes, or hash digests.

In an example embodiment, the challenge may be any suitable function or algorithm CH that, upon acting on data segments DS=$\{ds_1, ds_2, \ldots ds_n\}$, provides a set of proofs P=$\{p_1, p_2, \ldots p_n\}$, where $p_i$ is a proof for a given data segment $ds_i$. For brevity, the set of proofs P is also referred to as a proof, when there is no possibility of confusing it with proofs $p_i$. In an example embodiment, data segments DS may be encrypted with a client encryption key (e.g., content key 232, as shown in FIG. 2A) and a common encryption key, as previously discussed. Here, $ds_i$ identifies the ith encrypted data segment. Thus, CH(DS)=P, and proof P may be computed using challenge CH, and data segments DS by both server 110 and client device 153. In various embodiments, client device 153 may compute proof P and satisfy the challenge from server 110 by providing P to server 110. Proof P may include, for example, bits of data requested by the challenge CH. For example, if server 110 requested bits at positions $\{1, 19, 23\}$ of a given data segment, client device 153 may provide such bits to server 110 as proof P.

In some cases, challenge CH may be any suitable mapping of a data segment to a set of hash values via a hash function. After performing the mapping, client device 153 may provide a response to server 110 by reporting the resulting set of hash values to server 110.

As discussed above, in an example embodiment, proof P may be computed using data segments DS that are encrypted with content key 232 and a common key. Proof P may be communicated to server 110, and server 110 may verify the correctness of proof P, provided that server 110 has access to data segment DS and to content key 232 that allows for encryption of data segment DS. In an example embodiment, content key 232 may be transmitted to server 110 via a secure communication channel to ensure that it is not intercepted. Additionally, or alternatively, content key 232 may be securely transmitted from client device 153 to server 110 by device 153 encrypting key 232 using a public key of server 110. As described above, the communication from device 153 to server 110 may be digitally signed to ensure the authentication of device 153.

Alternatively, instead of transmitting content key 232, client device 153 may be configured to authorize a license server to provide content key 232 to server 110 upon authentication of server 110 with the license server.

In some cases, proof P may be obtained using data segments DS encrypted using content key 232 and the common key. In an example embodiment, upon receiving a challenge from server 110 for data segments DS of program 411 encrypted for client device 153 (e.g., data segments DS may be encrypted using content key 232 and the common key), client device 153 may determine proof P based on locally available data segments DS, and subsequently, store the proof and challenge in a local storage associated with client device 153. Additionally, in some embodiments, client device 153 may transmit the proof P to server 110 to be stored at server 110. In an example embodiment, the proof P may be stored in a profile of a client maintained by server 110. During download requests, server 110 may use the stored copy of proof P to compare with a proof provided by client device 153 to ensure that client device 153 was in a possession of data segments DS. In some cases, however, server 110 may not rely on a stored copy of proof P, but instead may compute proof P using stored data segments DS (which are only encrypted using a common key) and using content key 232. For example, server 110 may encrypt the stored data segments DS with content key 232 and use such encrypted data segments DS to calculate proof P.

In various embodiments, data corresponding to program 411 may be split into data segments by a software application of client device 153 (e.g., by a software application of receiving box 141). The software application may be configured to split data corresponding to program 411 into a set of data segments, such that each one of the data segments includes substantially the same data bits as a corresponding data segment of program 411 obtained by any other client device and server 110. Further details of how data corresponding to program 411 is split into data segments are described herein. The term "substantially the same" implies that most of data bits of a given data segment obtained by a software application of client device 153 are the same as the data bits of the same data segment obtained by a software application of any other client device or by a corresponding software application of server 110, with some difference allowed in order to account for errors associated with a transmission of data segments. For example, a few data bits of one data segment may be absent in the data segment or may be corrupted due to transmission errors. In various cases, a measure of how well one data segment matches another data segment may be determined via a suitable metric discussed herein. As described herein, during an offload process for a data segment by client device 153, probe parameters are used to derive a segment ID. During the offload process, client device 153 may not provide server 110 the data segment. The probe response by server 110 may contain a canonicalized segment ID, a challenge for the data segment, and instructions regarding whether upload for the data segment is required. The canonicalized segment ID (or canonical segment ID) is any suitable identification that is assigned as a segment identification for a pair of data segments, when it is determined that probe parameters for these data segments match. In some cases, when it is determined that probe parameters for several data segments match, the canonicalized segment ID may be assigned as the segment identification for all the matching data segments.

Segment ID may include a length enumeration defined as a many-to-one mapping of the number of packets of the data segment and an integer. The length enumeration may allow to detect a data loss in the data segment.

In various embodiments, at an upload time (e.g., at a time when a data segment is being uploaded to a database associated with server 110), server 110 may use a poison detection technique to require multiple client devices to upload the same data segment corresponding to the same segment ID and perform a bit-for-bit comparison of the segment data protected with the common key (e.g., data segments received from various client devices may be partially decrypted using corresponding content keys 232 of the different client devices prior to bit-for-bit comparison of the data segments).

Figure 4B:
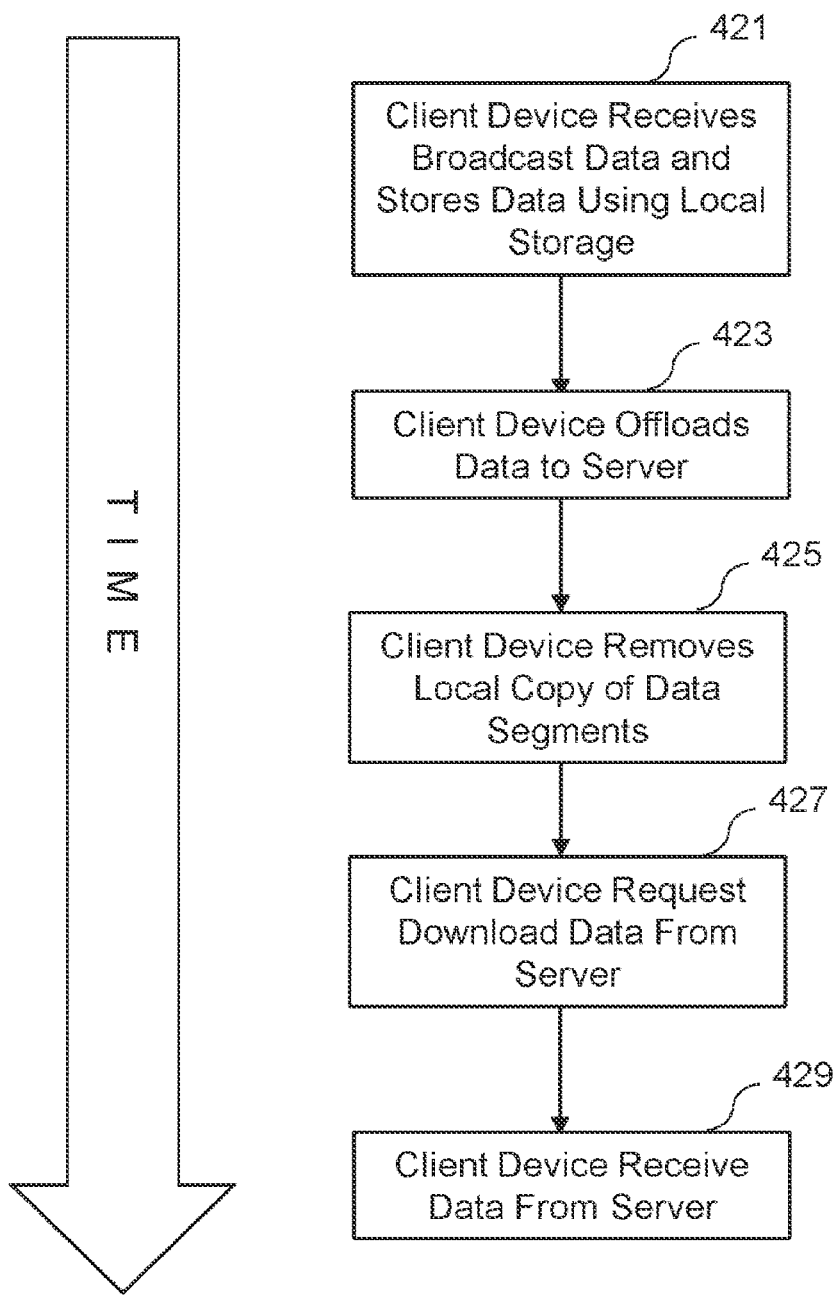
FIG. 4B is an exemplary diagram of a process of a client device downloading data from a server, consistent with disclosed embodiments.

FIG. 4B shows an example process 401 for performing operations with broadcast program data by client device 153 and hardware related to device 153 (e.g., receiver box 141, as shown in FIG. 1). At a first point in time, at step 421, client device 153 may receive a broadcast program (e.g., program 411, as shown in FIG. 4A) from broadcast content provider 140 and store program 411 at local storage associated with client device 153 (e.g., a hard drive of a receiver box 141, and the like). At a later second point in time, at step 423, client device 153 may authenticate with a data server (e.g., server 110, an authentication server, and the like), and offload program 411 to server 110. During an offloading process, program 411 is partitioned into data segments, and for the data segments, as a part of step 423, client device 153 may determine proof P (note, proof P and set of proofs P is used interchangeably as described above) in response to challenge CH provided by server 110. Proof P may be based on the challenge CH and data segments DS of program 411 (e.g., as discussed above CH(DS)=P). In various embodiments, proof P may be stored at a local storage associated with client device 153 before the data segments are removed from the local storage.

Additionally, or alternatively, and as further discussed below, client device 153 may receive an authorization from server 110 to download a copy of a data segment related to program 411 from server 110 at a later time. The authorization may be given after client device 153 uploads the data segment related to program 411 to server 110. Alternatively, the authorization may be given to device 153 when a segment ID for the data segment matches a segment ID of a corresponding data segment stored at a database associated with server 110. Client device 153 may store the authorization locally (in addition to storing proof P, or instead of storing proof P), and may present the authorization at a later time during a download request to server 110. The authorization may be digitally signed by server 110 and may be encrypted using content key 232 and a common key.

At a later third point in time, at step 425, client device 153 may remove a local copy of program data 411 to free the local storage from data after computing and storing proofs related to data segments of program data 411. Further, at a later fourth point in time, at step 427, client device 153 may request to download program data 411 from server 110, and upon verification that client device 153 is authorized to download program data 411 (e.g., via proof P or the authorization), client device 153 may receive program data 411 from server 110 at step 429.

Figure 4C:
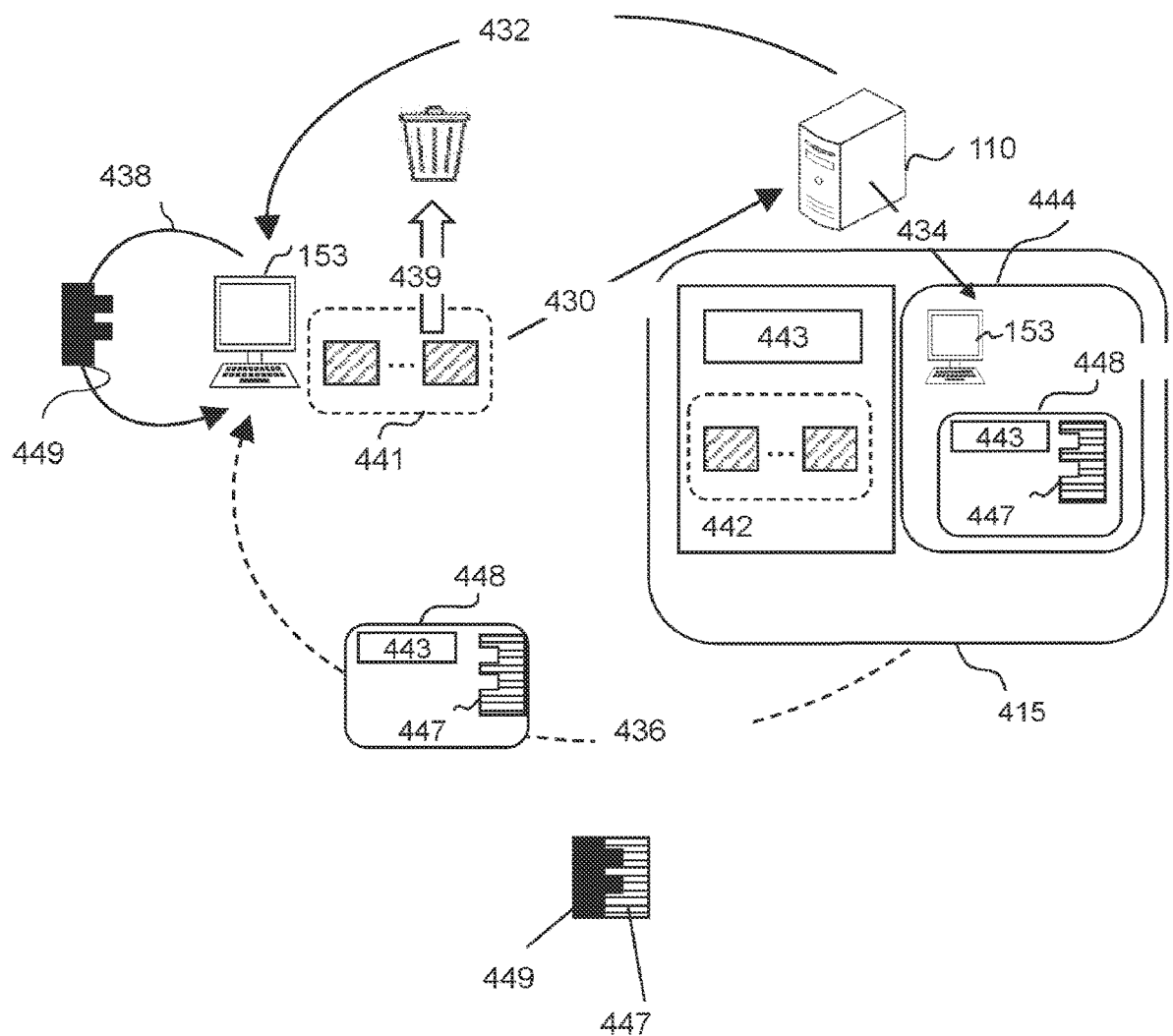
FIG. 4C is an exemplary diagram of a challenge-proof process for data communication, consistent with disclosed embodiments.

FIG. 4C shows a process 402 for providing a challenge to client device 153, for which a proof P may be computed by device 153. At step 430, client device 153 may request to offload data segments 441 corresponding to data of a broadcast program (e.g., program 411), and may provide data segments 441 to server 110. Server 110 may determine whether segments 441 are already stored in database 415, and if segments 441 are not stored in database 415, server 110 may be configured to verify that segments 441 correspond to program 411, and upload segments 441 to database 415. A process of verifying that segments 441 correspond to program 411 may include comparing the segment ID (e.g., probe parameters for the segment) with the segment IDs provided by other client devices 150.

FIG. 4C shows segments 442 stored in database 415. Segments 442 may be a substantially identical copy of segments 441. In an example embodiment, segments 442 may be identified in database 415 by a data segment identification (ID) 443. At step 434, server 110 may be configured to form a challenge 447. In an example embodiment, challenge 447 may be combined together with data segment ID 443 to form a challenge record 448. In an example embodiment, both challenge 447 and a related proof, computed for that challenge, may be stored at a local storage associated with client device 153. Additionally, or alternatively, in some cases, server 110 may maintain a client profile 444 corresponding to device 153, and record 448 may be stored in profile 444. In an example embodiment, client profile 444 may be stored in database 415.

At step 436, server 110 may transmit challenge record 448 containing challenge 447 and a corresponding ID 443 to client device 153. In an example embodiment, challenge record 448 may be digitally signed by server 110. At step 438, client device 153 may obtain and locally store a proof 449 (e.g., proof P, as discussed before) corresponding to challenge 447. Additionally, client device 153 may store challenge record 448. During subsequent download requests, client device 153 may provide proof 449 and data segment ID 447 as a proof that client device 153 is authorized to download segments 442. In some cases, both challenge 447 and proof 449 are provided by client device 153 during the download request. Additionally, or alternatively, in some cases, challenge 447 may be stored in user profile record 444 at server 110. Having challenge 447 stored in user profile record 444 with a corresponding ID 443 may be sufficient to establish that client device 153 is authorized to access segments 442 from database 415, provided that client device 153 is in possession of proof 449. After obtaining and storing proof 449, client device 153 may remove the local copy of data segments 441 at step 439.

In some cases, challenge 447 must be satisfied in any future data downloads for any one of data segments 441 that is to be offloaded. Client device 153 may use challenge 447 to generate a per-segment proof (e.g., proof 449 may include one or more per-segment proofs). Data for proof 449 may be encrypted with content key 232 and a common key. Having proof 449 encrypted with key 232 and the common key allows tying proof 449 to the content of segments 441, content key 232, and the common key.

During a download request, challenge 447 and proof 449 may be sent to server 110 for downloading segments 442. Server 110 may be configured to generate a copy of proof 449 from a copy of segments 442 stored in database 415 and validate that the generated copy of proof 449 identically matches proof 449 received from client device 153. When a match is determined by server 110, server 110 may be configured to provide client device 153 with data segments 442. In an example embodiment, when content key 232 is protected by a suitable digital rights management DRM approach a bad actor (i.e., a person or a computing system determined to undermine communications of client device 153 and server 110) may not be able to: download a data segment from server 110 that the bad actor did not originally record, download a segment without presenting a proof, download a segment using a content key other than content key 232, re-use a proof from someone else's recording of the same segment, or re-use a proof from a different recorded segment that may be available to the bad actor.

Figure 4D:
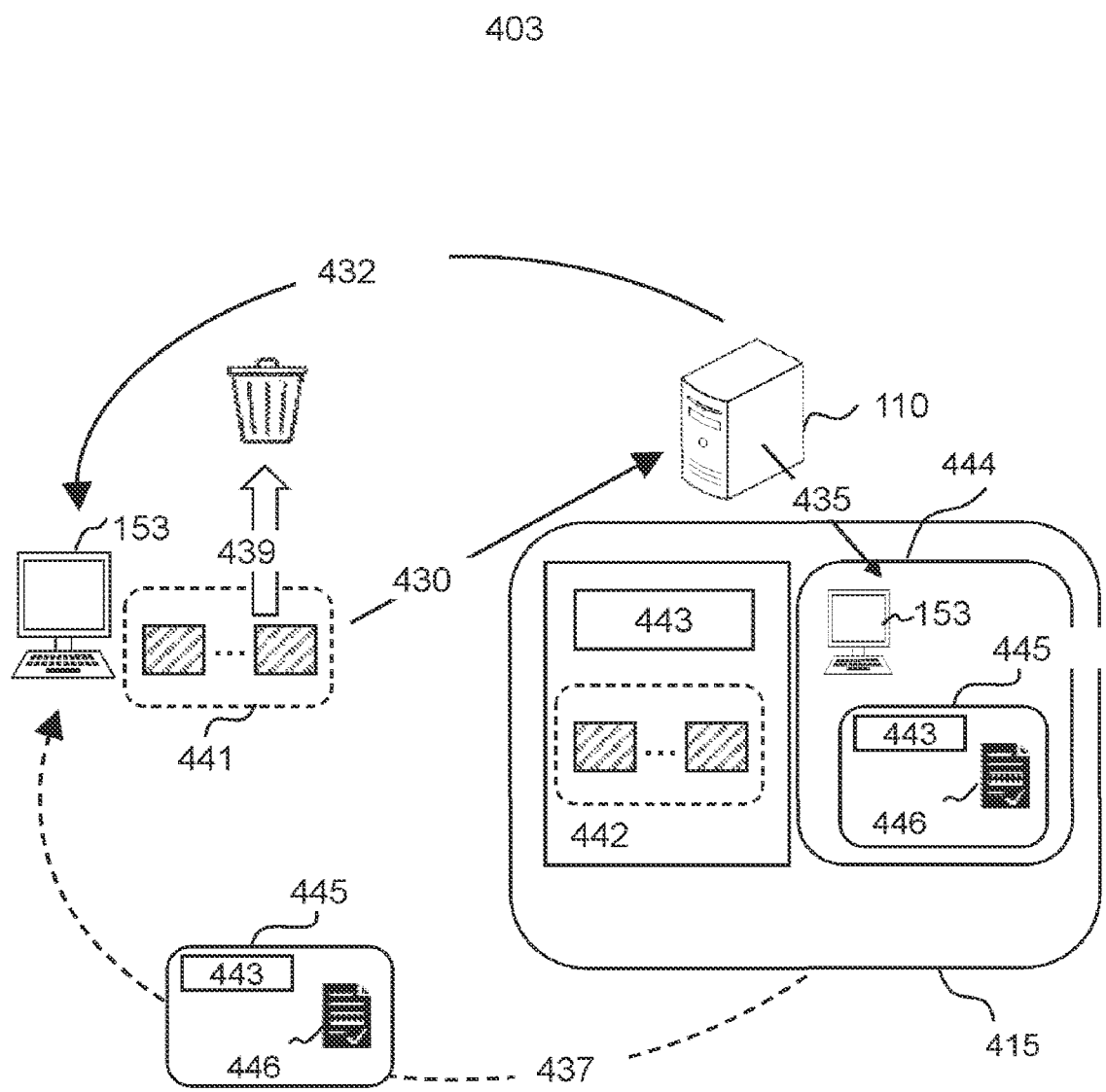
FIG. 4D is another exemplary diagram of a challenge-proof process for data communication, consistent with disclosed embodiments.

FIG. 4D shows process 403, which may be a variation of process 401. For example, steps 430 and 432 of process 403 may be the same as the same-numbered steps of process 401. At step 435, server 110 may generate an authorization 446 (instead of challenge 447). Authorization 446 may be part of an authorization record 445 that may combine authorization 446 and data segment ID 443. In some embodiments, authorization 446 may be computed based on information about segments 442, and additionally, in some cases, based on information about client device 153 (e.g., an identification for client device 153). For example, authorization 446 may be a hash value obtained by applying a hash function to data of segments 442 and data corresponding to the identification of device 153.

At step 437, server 110 may transmit authorization record 445 containing authorization 446 and a corresponding ID 443 to client device 153. In an example embodiment, record 445 may be digitally signed by server 110. During subsequent download requests, client device 153 may provide record 445 digitally signed by both server 110 and client device 153 to server 110 as a proof that client device 153 is authorized to download segments 442.

Figure 5A:
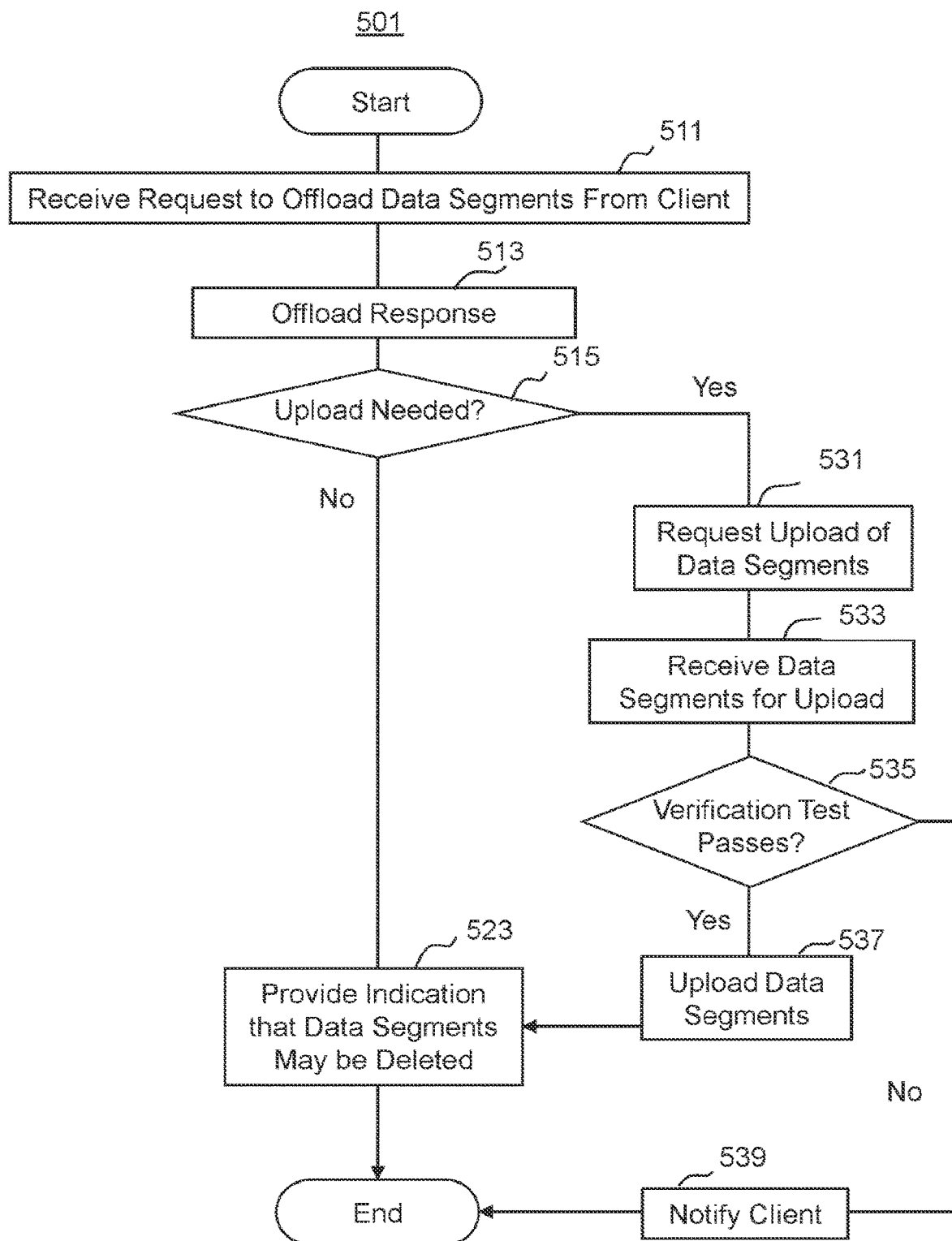
FIG. 5A is an exemplary diagram of a process for offloading data to a server, consistent with disclosed embodiments.

FIG. 5A shows an example challenge-proof process 501 performed by server 110 for offloading one or more data segments from a client device (e.g., device 153). At step 511, server 110 may receive a request from client device 153 for offloading one or more data segments. As described above, a request (e.g., request 413, as shown in FIG. 4A) may include probe parameters for the data segments as well as metadata associated with the data segment (e.g., a name of a broadcast channel associated with the data segment, and the like). In an example embodiment, a data segment may include a few seconds of video data of broadcast program 411. In some cases, the data segment may be less than a second or may be as large as tens of seconds of video data (or audio data or any other data), or one or more minutes of the video data (or audio data or any other data). In some cases, the data segment length is selected to have an acceptable number of errors per data segment associated with errors due to transmission from broadcast content provider 140. Thus, the length of the data segment may be determined by the quality of the transmission of data from provider 140. In various embodiments, the quality of transmission may be calculated as an average quality of transmission for various devices configured to receive broadcast content from provider 140. As described above, the data segments may be determined by a software application of various client devices and are configured to be the same between all the client devices that receive the same segment of program 411.

Figure 6:
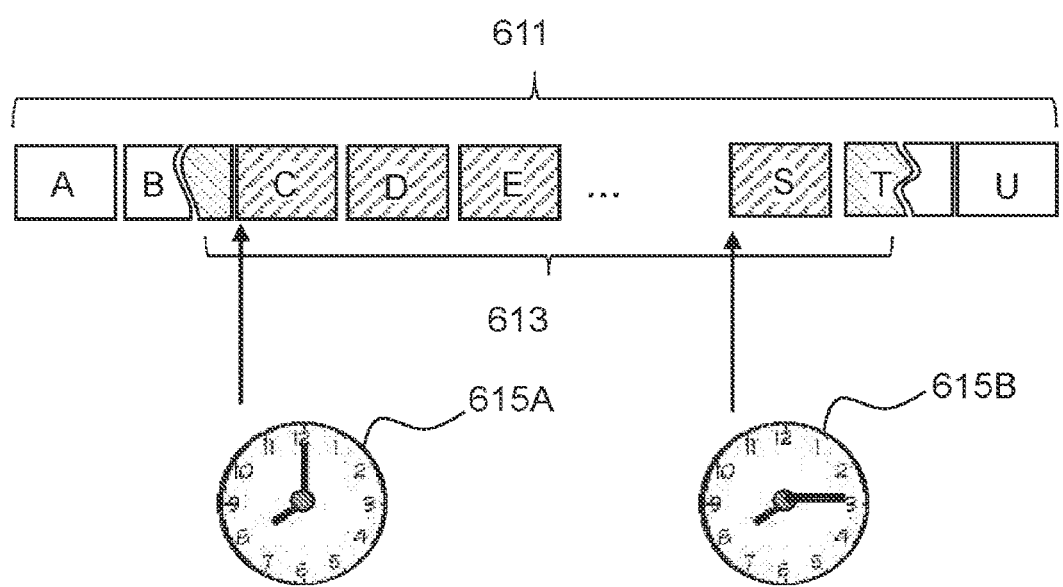
FIG. 6 depicts data segments corresponding to a portion of a broadcast program, consistent with disclosed embodiments.

As described above, a request (e.g., request 413, as shown in FIG. 4A) may include metadata associated with the data segment (e.g., a name of a channel (or in some cases a broadcast program) associated with the data segment, segment IDs, and the like). Further, request 413 may include data segments of a broadcast program which may be used to further identify and verify data of the broadcast program for which data needs to be offloaded. FIG. 6 shows data segments A-U for an example broadcast program 611, and data segments C-S corresponding to a portion 613 of broadcast program 611. As shown in FIG. 6, a portion of the broadcast program 613 may include a part of segment B, and a part of segment T. In an example embodiment, if client device 153 received portion 613, client device 153 may request to offload segments C-S. The request for offloading segments C-S may include providing of segments C-S to server 111 for data verification.

Returning to FIG. 5A, at step 513 server 110 may provide an offload response to client device 153. In an example embodiment, an upload of data segments may be necessary because server 110 may not contain a copy of the data segments in database 180. For example, server 110 may provide to client device 153 a canonicalized list of segment IDs as well as one or more challenges (e.g., challenge 447, as shown in FIG. 4C) and instructions for uploading data segments. The instructions may cause client device 153 to compute proofs for all data segments that can be offloaded using corresponding challenges for these data segments. In various embodiments, separate challenges may be provided for each data segment C-S of portion 613 that is needed to be offloaded to database 180.

At step 515, server 110 may determine if the upload of data segments (e.g., segments C-S, as shown in FIG. 6) is needed. For example, the upload may be needed if copies of corresponding segments C-S are not stored in a database (e.g., database 415, as shown in FIG. 4A) associated with server 110. For example, if segments C-E are stored in database 415, and segments F-S are not stored in database 415, segments F-S may be required to be uploaded.

Whether client device 153 is required to upload data segments (e.g., segments C-S) may be determined by server 110 via a probe service. The probe service may be any suitable approach executed by one or more software applications of server 110 for determining whether the upload of segments C-S is needed. In an example embodiment, server 110 may compare probe parameters for segments C-S received from client device 153 with probe parameters obtained from a local copy of probe parameters for segments related to program 611 to determine if segments C-S need to be uploaded. It should be noted that program 611 may be interpreted as a period of a service for a particular channel, and may not coincide with a particular broadcast program. In an example embodiment, determining whether the upload of segments C-S is needed may include comparing segment IDs received from client device 153 with stored segment IDs corresponding to a local copy of probe parameters related to segments C-S. If the received segment IDs do not match the stored segment IDs, the upload may be needed (step 515, Yes). Alternatively, if the received segment IDs are the same as the stored segment IDs, the upload may not be needed (step 515, No).

As previously described, the upload of data segments (e.g., segments C and S) may not be required, for example, when a local copy of segments C and S corresponding to server copies of these segments is stored in database 415. Server 110 may determine that the upload is not required when information available in a request (e.g., request 413) indicates that server copies of segments C and S are already stored in database 415. For instance, when request 413 includes probe parameters for data from segments C and S, server 110 may compare the received probe parameters with the probe parameters obtained using a local copy of probe parameters for segments C and S, and verify that segments of client device 153 match the segments of the local copy. If upload is not needed (step 515, No), process 501 may proceed to step 523 and provide an indication to client device 153 that data segments may be deleted after proofs (e.g., proof P, as described above) are computed for these data segments.

For segments that require upload (step 515. Yes), server 110 may proceed to step 531, and request data segments C-S from client device 153 for the upload. After receiving probe parameters for data segments C-S for the upload (step 511), at step 533, server 110 may store data associated with segments C-S in a temporary data storage location and evaluate at step 535 whether data of segments C-S accurately corresponds to portion 613 of broadcast program 611. Such step 535 is also referred to as a poison detection. For example, data of segments C-S may not accurately correspond to portion 613 if the data contains missing data, incorrect data, or extraneous data, as described herein. If the data of segments C-S corresponds to portion 613 (step 535. Yes), server 110 may upload and store data segments C-S at step 537. For example, server 110 may store data segments C-S by moving data associated with data segments C-S from the temporary data storage location to database 415, thus, completing a process of uploading segments C-S. Alternatively, if the data of segments C-S does not correspond to portion 613 (step 535, No), server 110 may notify client device 153 that verification test has failed at step 539 and complete process 501.

In an example embodiment, poison detection step may be carried out for each data segment C-S. An example data segment (e.g., data segment C) may be compared with a corresponding data segment (herein, for brevity referred to as a server data segment) stored in a database associated with server 110 by computing a hash digest (e.g., using MD5 hash digest) for data segment C and the server data segment. If the hash digest for data segment C matches the corresponding hash digest for the server data segment, then server 110 may determine that data segment C matches the server data segment. Otherwise, server 110 may determine that these segments are different. In an example embodiment, the process of reconciling content between temporary storage and "real" storage may be performed in the background without client's knowledge.

After uploading data segments C-S at step 537, server 110 may proceed to step 523. At step 523, server 110 may provide an indication to client device 153 that data segments may be deleted (however, the proofs are retained at client device 153) from local storage associated with client device 153 (e.g., such storage may be a hard drive available for receiver box 141, a hard drive of client device 153, a flash memory card of client device 153, or any other suitable data storage element associated with client device 153). In some cases, the indication may be any suitable visual indication (e.g., a message on a screen associated with client device 153, a graphical user element indicating that local data may be removed, and the like). Such an indication may be used by a client device (e.g., via an instruction from a user of the client device) to determine whether to remove portion 613 from local storage. Process 501 may be completed after the completion of step 523. In various embodiments, data segments may be deleted after proof for these segments is computed and stored at the local storage associated with device 153. In various embodiments, the removal of data segments may happen automatically without explicitly providing an indication to a client device.

Figure 5B:
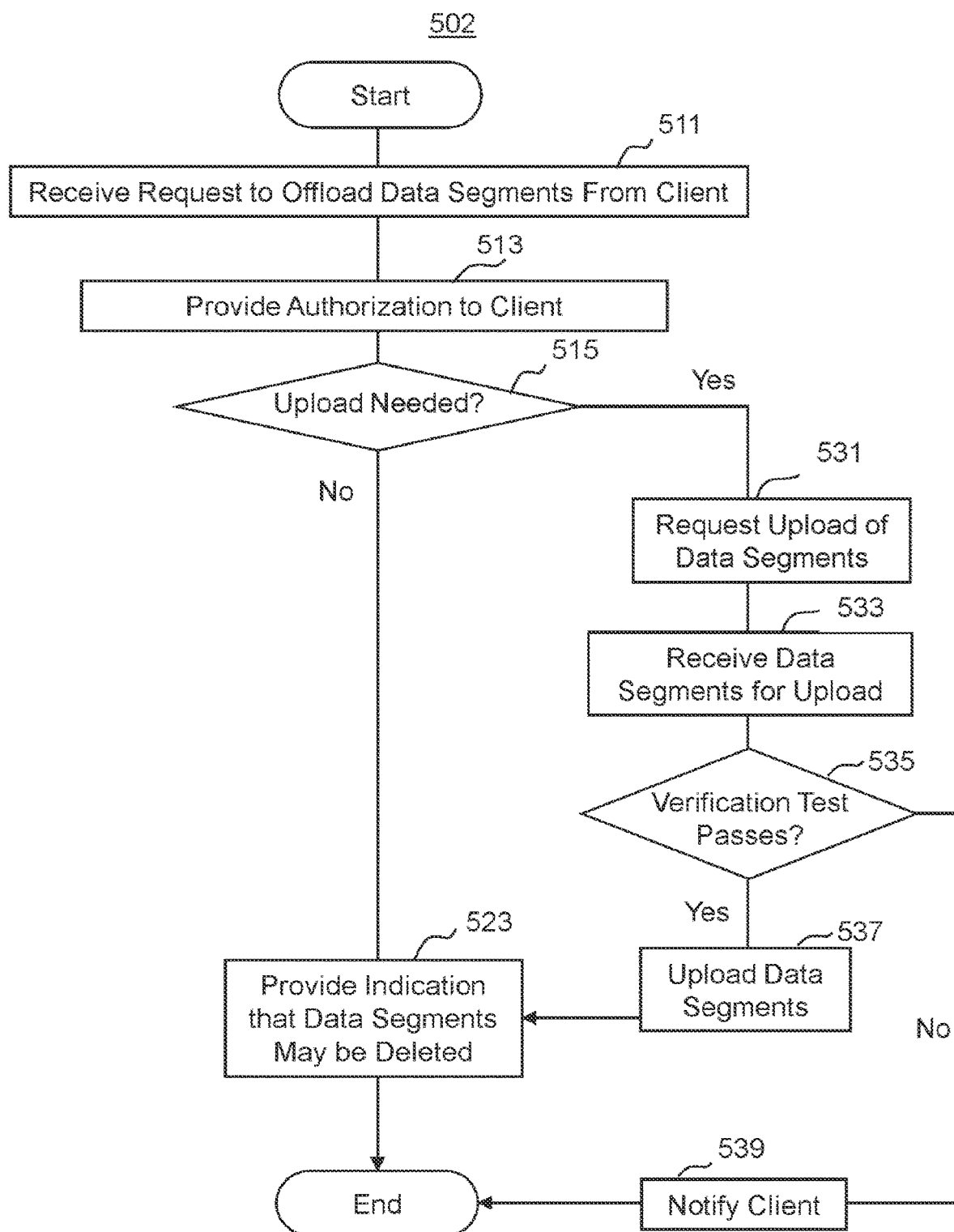
FIG. 5B is another exemplary diagram of a process for offloading data to a server, consistent with disclosed embodiments.

FIG. 5B shows a process 502 that may be a variation of process 501. For example, with the exception of step 512, steps of process 502 may be the same as the same-numbered steps of process 501. Instead of step 512 of process 501, process 502 may include step 513 for providing authorization to client device 153, as described in connection with FIG. 4D.

FIG. 7 shows a process 701 having steps 711-739 executed by client device 153 in response to correspondingly numbered steps 511-539 of process 503. Steps 711 and 713-739 may be mirror steps for the correspondingly numbered steps 511-539 of process 503. For example, for step 511 of receiving a request to offload data segments by server 110, a correspondingly numbered mirror step 711 may include submitting the request to offload data segments by client device 153. At step 713, client device 153 may receive a response from server 110, which may include challenges for data segments as well as a possible request to upload data segments (e.g., segments C-S, as shown in FIG. 6). If the upload is needed (step 715. Yes), process 701 may proceed to steps 731 and 733 and provide data segments C-S to server 110 for storing in database 415. If client device 153 receives information that data segments C-S are verified to match portion 613 of broadcast program 611 (step 735, Yes), client device 153 may upload data segments C-S at step 737. Alternatively, if data segments C-S are not verified to match portion 613 of broadcast program 611 (step 735, No), client device 151 may be configured to receive a notification that verification test has failed at step 739.

If the upload is not needed (step 715, No), client device 153 may receive an indication that data segments C-S may be deleted, and proof P needs to be locally stored at step 723, after which process 701 may be completed.

In addition to offloading content, client device 153 may request to download content from a database associated with server 110 (e.g., database 415, as shown in FIG. 4A). As described above, client device 153 may only be authorized to download content that was previously offloaded by client device 153. For example, if client device 153 has previously offloaded content portion 613, client device 153 may be authorized to download data content 613.

FIG. 8A shows an example process 801 for authorizing client device 153 to download data segments (e.g., data segments 442, as shown in FIG. 4B). Process 801 uses a challenge-proof approach for authorization of client device 153 described, for example, in relation to FIG. 4B. Server 110 may authorize access to the service and to the specific data segment, and this access may vary from one data segment to another.

In an example embodiment, steps of process 801 may be performed by server 110. At step 811, server 110 may receive a request to download data segments (e.g., segments C-S) of data 613. Each segment C, D, E . . . S, may be transacted individually (e.g., each segment C-S may be downloaded individually). In an example embodiment, a request to download data segments may include a routing request to start the permission chain and determining which download server to use. Such a request may be made over a secure link. In some embodiments, a request for downloading data segments C-S may include data segments ID (e.g., 443, as shown in FIG. 4B) such that, when presented to server 110, they may allow server 110 to retrieve all the data segments that client device 153 is authorized to download for data 613. In some cases, when a request to download data segments is done over a non-secure connection, the request for downloading data segments C-S may be digitally signed by client device 153 (e.g., data segments ID may be digitally signed by client device 153) to ensure that the request has not been altered by a person-in-a-middle attack. In some cases, a request to download content from database 415 may include a proof P, as discussed above.

In various embodiments, as discussed above, prior to submitting a download request, client device 153 may authenticate with server 110 via a secure network connection. Additionally or alternatively, as previously discussed, if client device 153 and server 110 have previously exchanged client and server public encryption keys corresponding to their private encryption keys, they can authenticate via an SSL handshake, as described above. Additionally, the communications between the license server and server 110 may be digitally signed to ensure that data is not altered by a "person-in-a-middle" attack.

To establish the validity of proof 449, server 110 may obtain client encryption key (e.g., content key 232, as shown in FIG. 2A) at step 833. In an example embodiment, content key 232 may be provided to server 110 in a secure way (e.g., via license or DRM token). Server 110 may use content key 232 to encrypt data segments C-S to obtain encrypted data segments DS, at step 835. At step 839, having challenge CH (e.g., challenge 447, as shown in FIG. 4B, stored at a local storage associated with client device 153), server 110 may compute a local copy of proof $P_{local}$ as CH(DS)=$P_{local}$, as discussed before. Further, server 110 may compare the computed proof $P_{local}$ with proof P received from client device 153 as a part of the request submitted by client device 153, and received at step 811. If $P_{local}$ matches P (step 839, Yes), process 801 may proceed to step 821 and transmit data segments (e.g., segments 442) to client device 153. Alternatively, if $P_{local}$ does not match P (step 839, No), process 802 may proceed to step 823 and report a failure to authorize download at step 823. After completion of either step 821 or 823, process 801 may be completed.

Figure 8B:
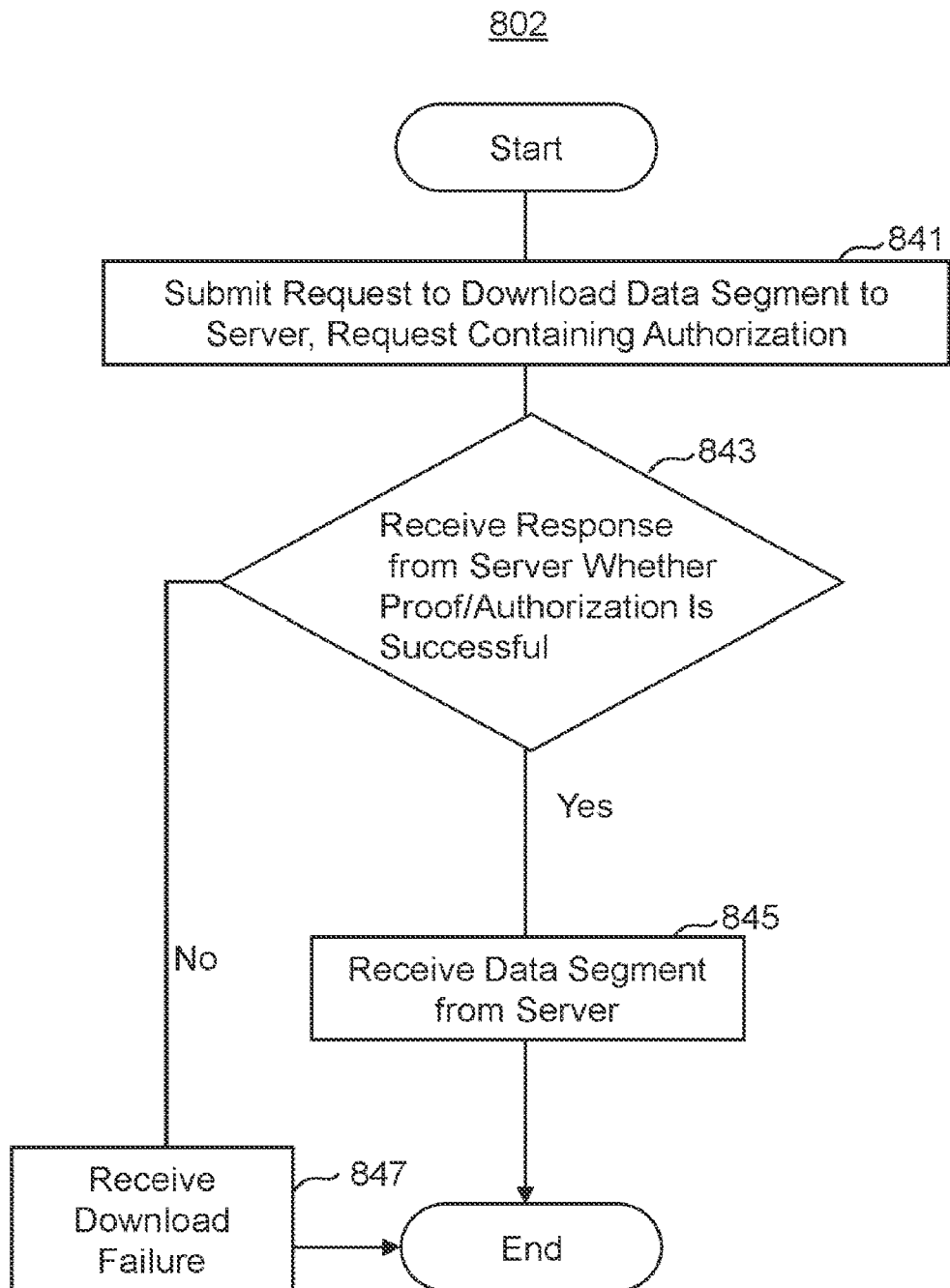
FIG. 8B depicts another example process for downloading data from a server, consistent with disclosed embodiments.

FIG. 8B shows a process 803 of downloading a data segment executed by client device 153. At step 841, client device 153 may submit a request to server 110, for downloading one of data segments 441. In some cases, the request may include proof 449 (or an authorization 446). The request may also include data segment ID 443. At step 843, client device 153 may receive a response from server 110, whether proof 449 has succeeded (or whether authorization 446 is successful). If proof 449 is successful (step 843, Yes), process 803 may proceed to step 845 and receive one of data segments 442 from server 110 (e.g., server 110 may retrieve a data segment (one of data segments 442) from database 415 and transmit the segment to client device 153). If proof 449 is not successful (step 843, No), process 803 may proceed to step 847 and receive a notification that server 110 has failed to authorize the download of the data segment. Process 803 may complete after the completion of either step 847 or step 845.

Aspects of the present disclosure describe various methods for offloading and downloading one or more data segments (e.g., segments 441, as shown in FIG. 4B) for client device 153. A method for offloading segments 441 may include receiving a request from a client device 153 to offload data segment 441 by server 110 and sending a challenge to client device 153. Additionally, server 110 may request client device 153 to store the challenge and the client proof, and client device 153 may be considered to store the challenge and the client proof in local storage associated with client device 153. The method may also include receiving data segments 441 (herein, also referred to as an upload) from client device 153 when the upload is required. In various embodiments, as discussed above, the upload data (or download data) may include information used to obtain a client content key (e.g., content key 232), wherein the client content key is configured to partially decrypt an entirety of data segments 441. In various embodiments, segments 441 may be encrypted commutatively with at least a client content key and a common key.

Other aspects of the method may include notifying client device 153 that the upload data is received after receiving the upload data. Also, the method may include notifying the client device that the upload is not required when the upload data is not required. In some cases, the upload may be determined not to be required if data equivalent to data segments 441 is known to be recoverable from server 110 (i.e., data segments 441 may be received by client device 153 from server 110). The method may also include notifying client device 153 whether the upload request is successful. As described above, a challenge from server 110 (e.g., challenge 447, as shown in FIG. 4B) may include a request for one or more bits of data of the data segment. In an example embodiment, client proof (e.g., proof 449) may include the one or more bits of data requested in challenge 447, as well as information configured to provide a client content key (e.g., content key 232) to a server.

Other aspects of the method may include generating the server proof based on a local server copy of the data segment (e.g., data segments 442, as shown in FIG. 4B) stored at storage associated with server 110. In an example embodiment, the local server copy of data segments may be encrypted by a client content key and a common key. The method may further include determining whether the client proof matches the server proof by comparing the one or more bits of data segments 441 with the one or more bits of the local server copy of the data segments (i.e., data segments 442). Additionally or alternatively, the method may further include determining whether the client proof matches the server proof by comparing a client result of a hash digest of the one or more bits of data segments 441 with a server result of the hash digest of the one or more bits of data segments 442. In some cases, server 110 may obtain content key 232 from a license server upon providing a license for the content key 232. In various embodiments, content key 232 may be obtained for either upload or download process.

In some embodiments, challenge 447 provided by server 110 may be unique (i.e., formulated uniquely) for client device 153. For example, challenge 447 may be generated for client device 153 based on an identification of client device 153. Other aspects of the method may include authenticating client device 153 before receiving the request from client device 153.

A method for downloading segments 442 to client device 153 may include receiving a request from client device 153 to download data segment 442, the request comprising a challenge and a client proof, generating a server proof based on data segments 442, and comparing the client proof with the server proof. When the client proof matches the server proof, the method may include providing the client device with data segments 442. The method may include authenticating client device 153 before receiving the request from client device 153. Further, the method may include obtaining a client content key (e.g., content key 232) and encrypting data segments 442 using content key 232.

Figure 9A:
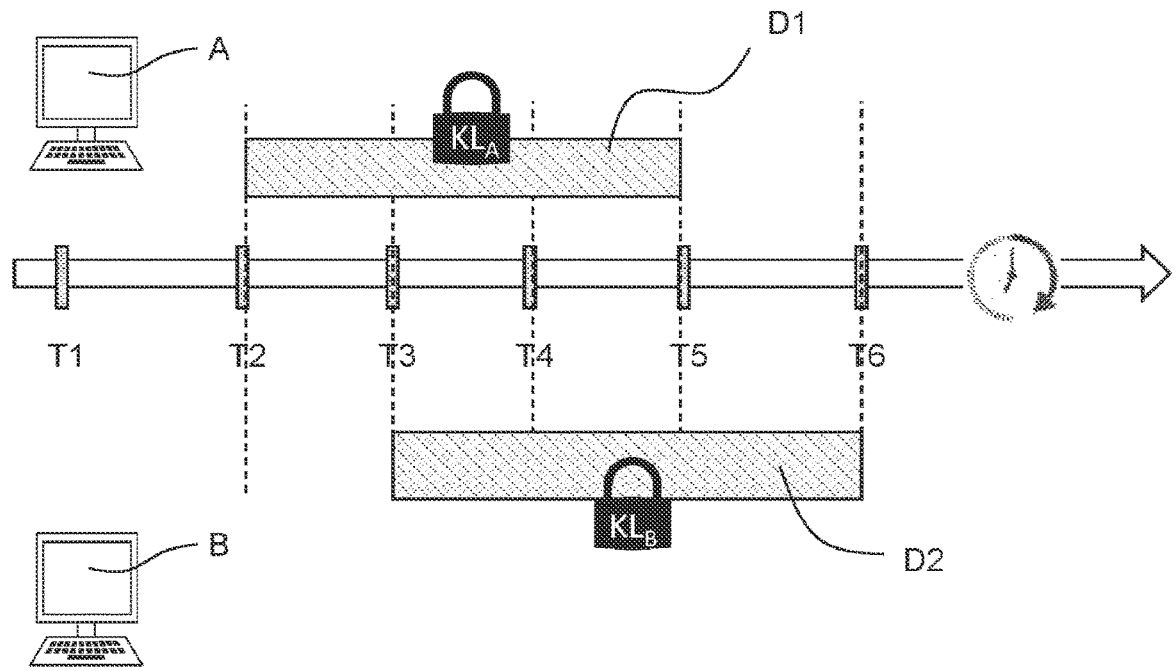
FIGS. 9A-9G depict various steps for recording broadcast data, submitting probe requests, receiving probe requests, and uploading data to a server, consistent with disclosed embodiments.

FIGS. 9A-9G show various steps for recording data, submitting probe requests to server 110, receiving probe responses from server 110, and uploading data to server 110. FIG. 9A shows step 1 at which a broadcast program may be recorded by a client device A and a client device B. In an example embodiment, client device A may record program data D1 starting at time T2 and finishing at time T5. Client device B may record program data D2 starting at time T3 and finishing at time T6. In some cases, program data D1 and program data D2 may correspond to the same broadcast program. In various embodiments, program data D1 may be encrypted using content key $KL_A$, and program data D2 may be encrypted using content key $KL_B$.

Figure 9B:
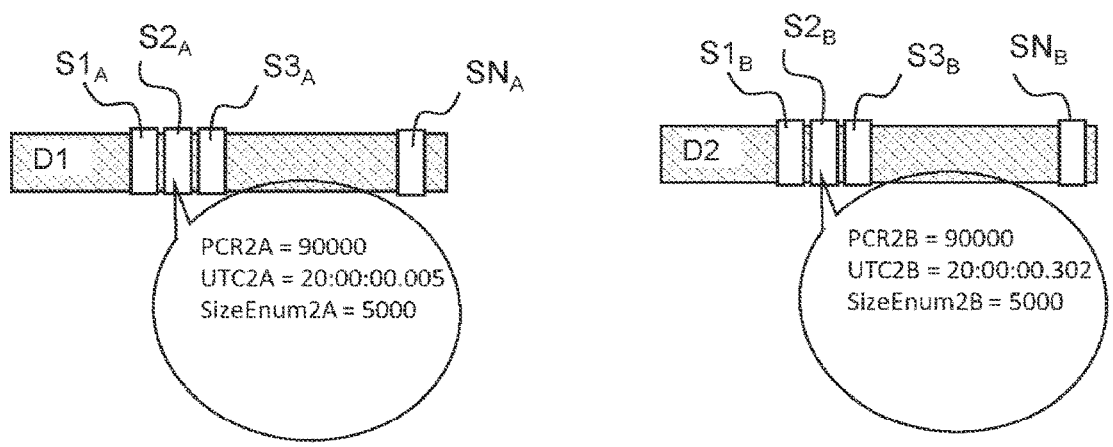

FIG. 9B shows step 2, at which program data D1 and D2 may be segmented into corresponding segments $S1_A$-$SN_A$ and $S1_B$-$SN_B$. In an example embodiment, step 2 may be concurrent with step 1. For segments $S1_A$-$SN_A$ or $S1_B$-$SN_B$, probe parameters may be calculated. For example, for segment $S2_A$, probe parameters may include PCR value PCR2A, as previously described, coordinated universal time value UTC2A, herein also referred to as wall clock value, as well as length enumeration SizeEnum2A. FIG. 9B shows, for example, PCR2A equals to 90000, UTC2A=20:00:00.005, and SizeEnum2A=5000. In various embodiments. PCR2A, UTC2A, and SizeEnum2A may be represented using any suitable numbers. Similarly, probe parameters for segment $S2_B$ may include PCR value PCR2B, wall clock value UTC2B, and length enumeration SizeEnumB. In various embodiments, when $S2_A$ and $S2_B$ correspond to the same portion of the broadcast program, PCR2A may be the same as PCR2B, and SizeEnum2A may be the same as SizeEnum2B. In some cases, UTC2A may be slightly different from UTC2B. In various embodiments, probe parameters (e.g., PCR2A, UTC2A, and SizeEnum2A) may be combined to form a number referred to here as a segment ID.

Figure 9C:
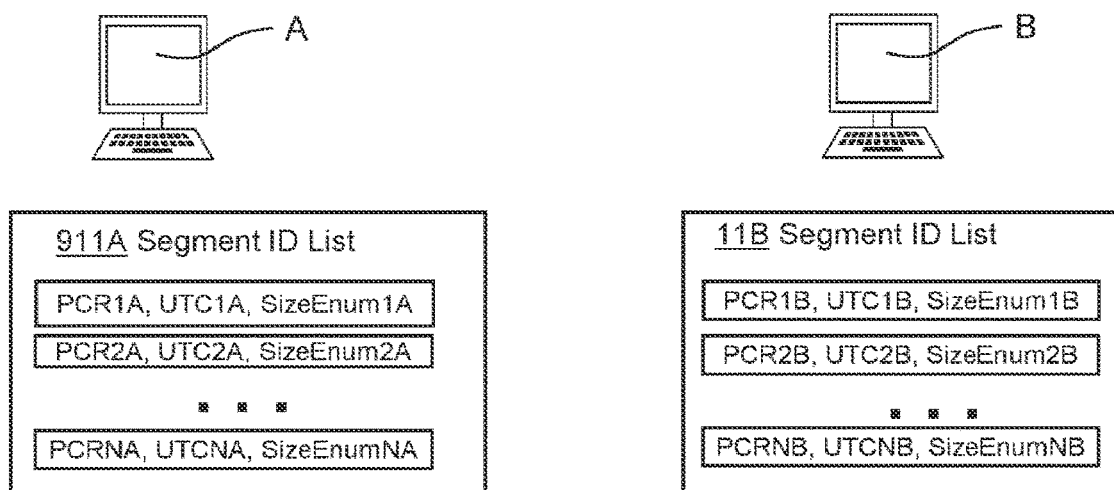

FIG. 9C shows step 3, at which a segment ID list 911A is formed for client A. and a segment ID list 911B is formed for client B. Segment ID list 911A may include IDs formed from values PCR1A-PCRNA, UTC1A-UTCNA, and SizeNum1A-SizeNumNA, as shown in FIG. 9C. Similarly, segment ID list 911B may include IDs formed from values PCR1B-PCRNB, UTC1B-UTCNB, and SizeNum1B-SizeNumNB.

Figure 9D:
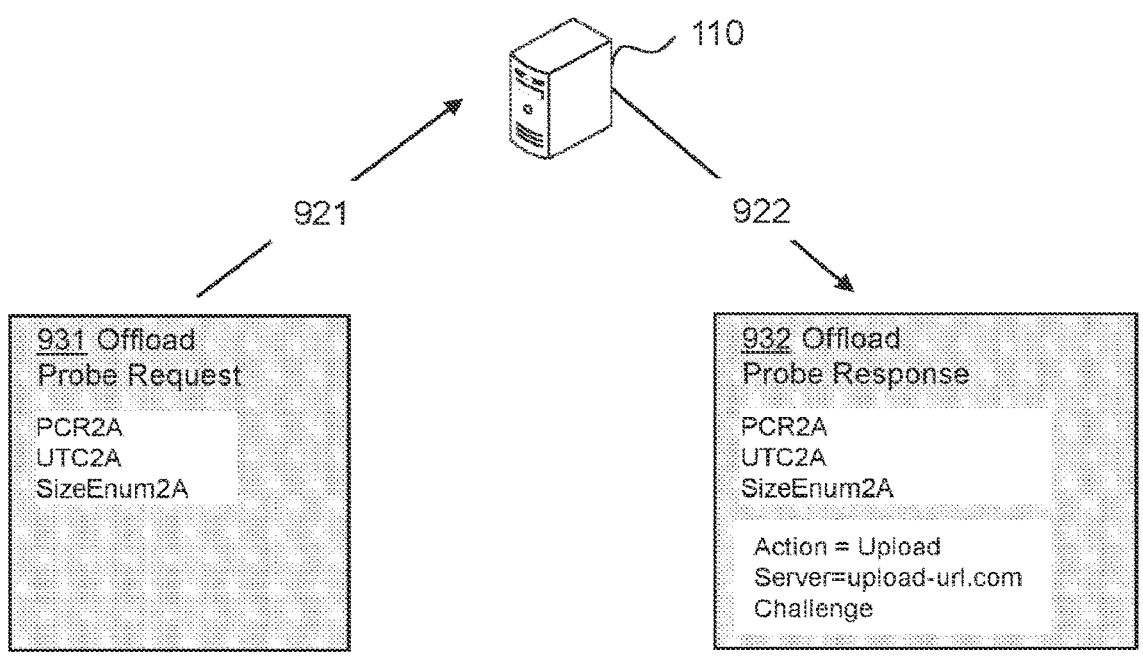

FIG. 9D shows step 4, at which client device A submits an offload probe request 931 to server 110 and receives an offload probe response 932. For example, device A may submit a probe request to offload segment $S2_A$ using probe parameters {PCR2A, UTC2A, SizeNum2A}. In an example embodiment, in response to the probe request, server 110 may provide to device A a probe response containing {PCR2A, UTC2A, SizeNum2A}, as well as an approved action indicated by "Action=Upload," address of the server for uploading data indicated by "Server=upload-url.com" and a challenge, as described above. In an example embodiment, probe requests may be made for each segment $S1_A$-$SN_A$ (or $S1_B$-$SN_B$).

In some cases, segment IDs may be different for two equivalent segments $S2_A$ and $S2_B$ due to differences in UTC2A and UTC2B. For such cases, a common UTC value may be selected by server 110 (e.g., a UTC2B value or an average value of UTC2A and UTC2B), and such common value may be used for forming an ID for segment $S2_A$ and $S2_B$. A process of selecting a common UTC value and forming a segment ID that is the same for segment S2A and $S2_B$ (using the selected common UTC value) is referred to as canonicalization of segment ID. The resulting segment ID is referred to as a canonical segment ID.

Figure 9E:
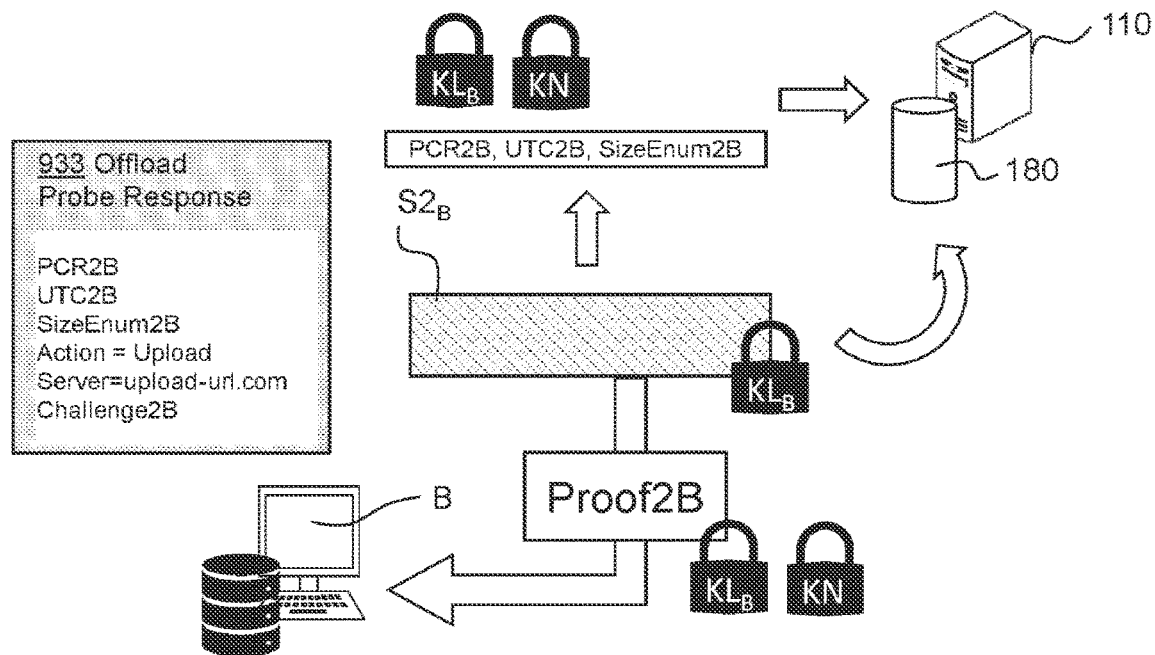

FIG. 9E shows step 5, at which client device B may request an upload of data (e.g., segment $S2_B$) to a database (e.g., database 180) related to server 110. For example, device B may submit a probe request containing probe parameters {PCR2B, UTC2B. SizeEnum2B} to server 110. In an example embodiment, device B may receive offload probe response 933 from server 110 and may upload $S2_B$ encrypted using content key $KL_B$ as well as common key KN to database 180. In an example embodiment, data segment $S2_B$ may be stored in a database (e.g., database 180) encrypted only with KN key. In an example embodiment, offload probe response 933 may include parameters {PCR2B, UTC2B, SizeEnum2B}, a challenge command Challenge2B, as well as information about an upload server "Server=upload-url.com" and information about an action "Action=Upload." In some cases, when a data offload was attempted the result of the offload of some segments may be uncertain and an action "retry" may be provided for those segments by server 110 as part of probe response 933. Challenge2B may be any suitable information (e.g., a string) for describing an operand to the action (i.e., an instruction to perform an action on data). Using Challenge2B, client device B may compute proof Proof2B in response to the challenge. For example, the string "Challenge2B=<offset=100, length=32>," may imply that proof Proof2B may include selecting 32 bits from segment $S2_B$ starting at the 101 bit of the segment. After computing Proof2B, client device B may store Proof2B and a related challenge at local storage. The proof may be extracted from a data segment that is encrypted using keys $KL_B$ and KN. Additionally, in response to action "Upload." client device B may submit probe parameters {PCR2B, UTC2B, SizeEnum2B}, as well as segment $S^{2B}$ to server 110 (or to database 180). In various embodiments, segment $S2_B$ may be encrypted using content key $KL_B$ and common key KL. After uploading segment $S2_B$, segment $S2_B$ may be removed from a local storage of client device B.

Figure 9F:
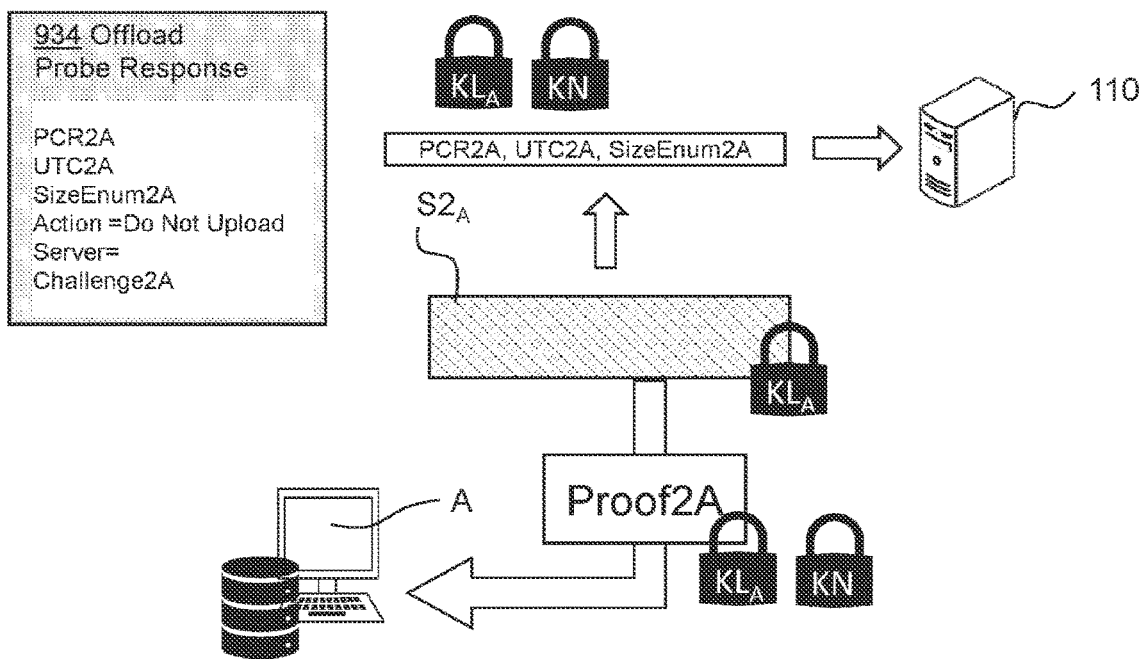

FIG. 9F shows step 6, at which client device A may submit an offload probe request to server 110. For example, device A may submit probe parameters {PCR2A. UTC2A. SizeEnum2A} (which may be the same as a canonical segment ID) and receive offload probe response 934, which may include parameters {PCR2A. UTC2A. SizeEnum2A}, a challenge command Challenge2A, as well as information about an action "Action=Do Not Upload," indicating that no upload is needed. When the upload is not needed, the upload server may not be provided, which may be indicated by a string "Server=." In various embodiments, Proof2A may still be computed based on Challenge2A, and Proof2A may be stored at the local storage encrypted with KN and $KL_A$. After storing Proof2A, segment $S2_A$ may be removed from a local storage of client device A, thus completing the offload process.

Figure 9G:
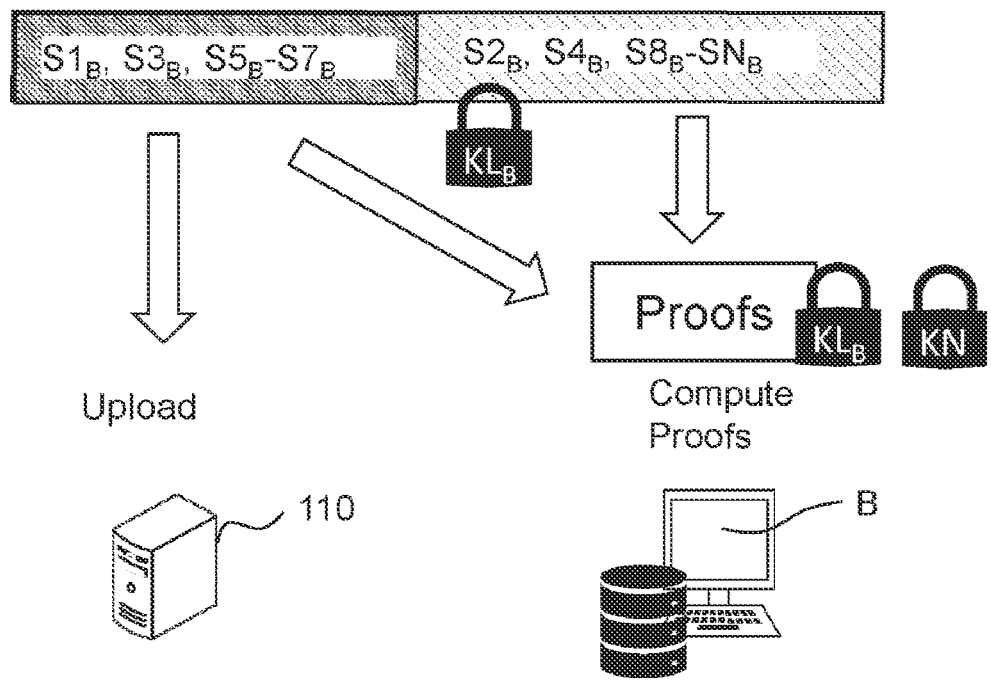

FIG. 9G shows step 7, at which some of the data segments may be uploaded to server 110 (or related database 180), and other data segments may not need to be uploaded. For example, after requesting offload for segments $S1_B$-$SN_B$, some of the segments (e.g., segments $S1_B$, $S3_B$, $S5_B$-$S7_B$) may need to be uploaded, and other segments (e.g., segments $S2_B$, $S4_B$, $S8_B$-$SN_B$) may not need to be uploaded. In various embodiments, proofs may be computed for all of the data segments $S1_B$-$SN_B$, and stored at a local storage of device B. As shown in FIG. 9G, segments S1B-$SN_B$ may be encrypted with content key $KL_B$ and KN.

Figure 10:
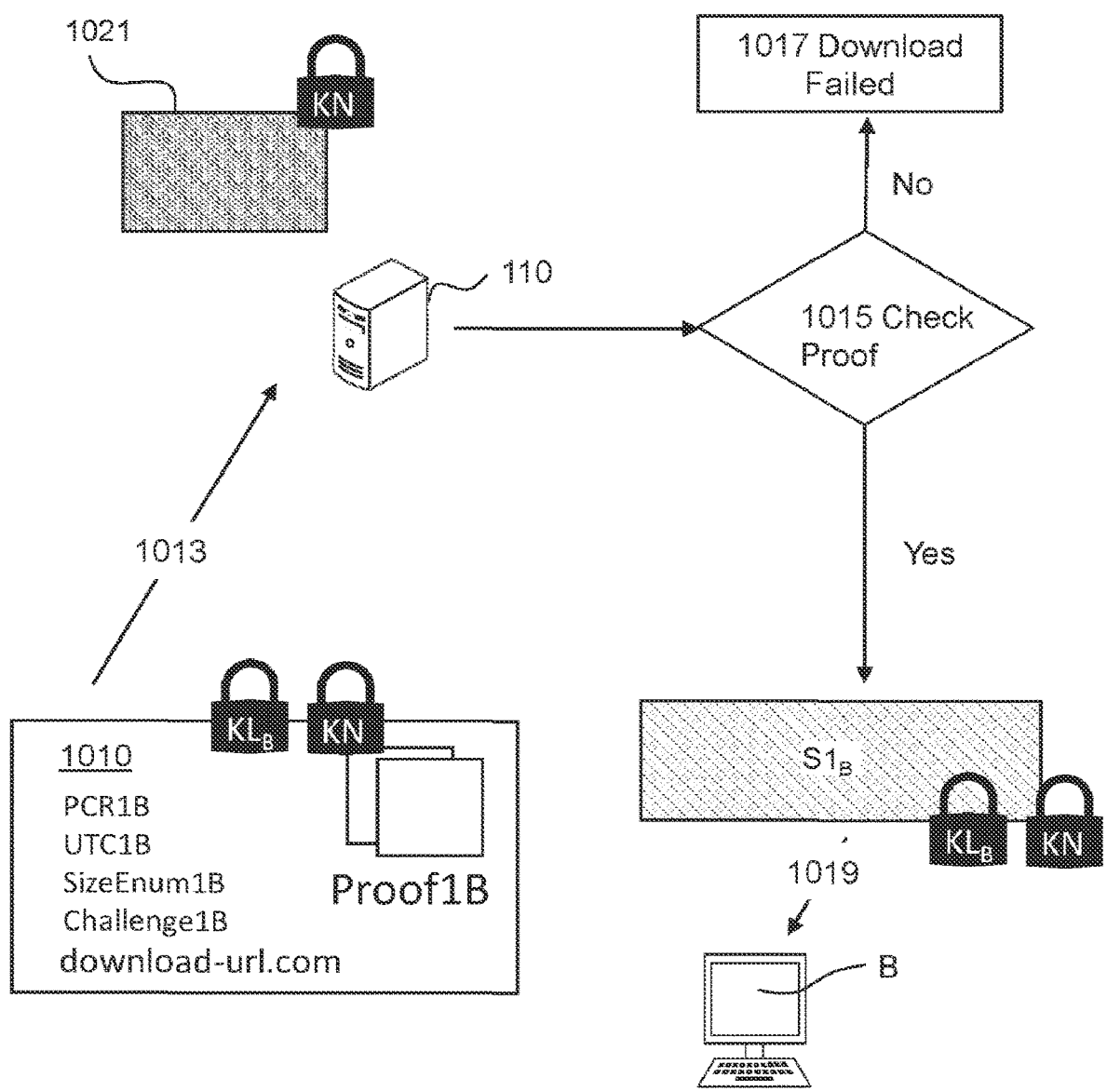
FIG. 10 depicts a process for downloading data from a server, consistent with disclosed embodiments.

FIG. 10 shows a process for downloading data from server 110, consistent with disclosed embodiments. Client device B may submit a request 1010 to server 110 for downloading segment $S1_B$. In an example embodiment, request 1010 may include probe parameters {PCR1B, UTC1B, SizeEnum1B}, a challenge command Challenge1B, as well as proof Proof1B corresponding to Challenge1B. In an example embodiment, probe parameters {PCR1B, UTC1B, SizeEnum1B} form a canonical segment ID. Upon receiving the canonical segment ID, and a proof (Proof1B) at step 1013, server 110 may be configured to verify that Proof1B matches the proof for stored segment S1B at step 1015, as previously described (e.g., by comparing Proof1B with a copy of Proof1B stored at server 110, or by recomputing Proof1B using segment S1B). In an example embodiment, segment SIB may be first encrypted using $K_{LB}$ key before recomputing Proof1B. If Proof1B is verified (step 1015, Yes), segment $S1_B$ may then be computed and received by client device B at step 1019. Alternatively, (step 1015, No), server 110 may notify client device B that the download request has failed at step 1017. In various embodiments, a copy of segment $S1_B$ (denoted by 1021, as shown in FIG. 10) may only be encrypted using KN key.

Additional aspects of the present disclosure relate to various approaches for authenticating and authorizing clients to offload data to server 110 and download data from server 110. Further, the proposed approaches provide systems and methods for minimizing impacts of person-in-a-middle attacks related to eavesdropping on data or altering data while the data is transmitted between client device 153 and server 110. Further, the proposed approaches reduce costs associated with storing data and costs associated with various computing operations related to person-in-a-middle attacks.

Without a sufficient authentication and authorization, a malicious actor (also referred to as an attacker) may be able to access data on server 110 and consume computing/network resources. Whilst the content itself may be encrypted, having a secure authentication may be important to the operation of server 110. The secure authentication can be particularly important when allowing client devices to upload content to server 110. Without proper authentication, the malicious actor may be able to poison (e.g., corrupt, change, delete, compromise, etc.) data stored on server 110 using data that is presented as an authentic copy of a broadcast program. While there may be many checks in place to ensure that uploaded data is authentic (e.g., as described herein, data from multiple client devices may be compared to ensure that segments include the same data), some of the checks may not withstand the attack of multiple malicious actors or a single malicious actor that is attempting to upload data from multiple accounts. For example, multiple malicious actors may be determined to undermine operations of server 110 by uploading the same corrupted (also herein referred to as poisoned) data to server 110. Without adequate authentication, server 110 may be configured to compare one copy of poisoned data with another copy of poisoned data, and upon confirming that copies match, saving one of the copies in a database associated with server 110 (e.g., database 180).

Further, without proper authentication, the malicious actor may be able to obtain credentials of another client (if such credentials are not communicated via a secure connection) and may be able to download data from server 110. Even though the malicious actor may not be able to decrypt the downloaded data (e.g., the downloaded data may require content key 231 for decryption, the malicious actor may disrupt operations of server 110 and may result in unnecessary transmission costs associated with the transmission of information to the malicious actor. Such requests from the malicious actor may overwhelm server 110 and may result in failure of server 110 to provide data to various authorized client devices (e.g., client devices 150). Similarly, unauthorized attempts to upload data to server 110 may result in server 110 incurring unnecessary costs in receiving data, analyzing data (e.g., comparing data from one client device to another client device), and discarding the fraudulent data. In some cases, the costs may also include blacklisting IP addresses of client devices that engage in malicious activity.

In an example embodiment, server 110 may provide a signed URL to client device 153. The signed URL may be a URL that provides a limited permission and time to make a request. Signed URLs can contain authentication information in their query string, allowing users without credentials to perform specific actions on a resource. When server 110 generates a signed URL, server 110 may specify a user or service account which must have sufficient permission to make the request that the signed URL will make. After server 110 generates a signed URL, anyone who possesses it can use the signed URL to perform specified actions, such as reading an object, within a specified period of time.

URL signing allows server 110 to distribute a URL that accesses a resource and contains authorization information that allows server 110 to validate whether client device 153 is allowed to access the resource. Access might be as simple as an HTTP GET request to or from a server, or it might be more powerful or destructive like PUT or even DELETE. Access is typically limited to a time window. Anyone with access to the URL may be able to perform the defined operation on that resource during that time window.

In various embodiments, server 110 may be configured to allow clients to PUT/GET resources in public cloud storage over an insecure connection. Exposing a PUT URL (e.g., a signed URL that authorizes a PUT operation) may be potentially damaging as anyone with visibility of that URL could perform a PUT for that object.

Signed URLs can suffer due to the lack of privacy and a resultant bloated size of a probe request and a response (e.g., if a request is made from one or more client devices that 100 segments need to be uploaded, the resultant response, when using signed URLs, may contain 100 signed URLs).

In various embodiments, in order to keep transmission and CPU costs low, server 110 may be configured to allow only authorized users to access resources related to offloading and downloading content from server 110. Also, the use of signed URLs may require server 110 to set a broad time period to ensure that a client can make all of the necessary (or subsequent) requests. However, such an extended period of time for placing the requests may not be desirable. Granting permissions or privileges for a longer time than needed introduces security vulnerabilities.

Additional aspects of the present disclosure describe systems and methods for authorizing client device 153 by an authentication server (e.g., server 114 or server 110) over a secure link to prove over an insecure link that they were authorized in such a way that an eavesdropping attacker could not gain access to resources that are accessed over that insecure link by either replaying or modifying the data exchanged over that link. Additionally, authorizing client device 153 may include providing client device 153 with a challenge that may be configured to be bound to content (e.g., content offloaded to server 110 by client 153), such that a person-in-a-middle attacker is not capable of replacing the content.

The systems and methods described herein may be configured to minimize the cost that may be associated with authentication of client device 153. In an example embodiment, a response from server 110 to offloading requests from client devices 150 may include a small amount of data, and may not require complex data manipulations in order to minimize associated processing costs. Minimizing costs may allow for an increased number of requests per second to server 110, which, in some cases, may receive a surge of requests. Also, by exchanging small amounts of data between a client device 153 and server 110, the disclosed techniques may help minimize storage requirements for the client device 153. Furthermore, the systems and methods described herein may not require a transport layer security (TLS) protocol to securely transfer data segments that may be already encrypted. The systems and methods described in this disclosure may use only a few specific details related to an example data segment (e.g., last few bits of the data segment as described herein) to determine whether the data segment is an authentic data segment.

Aspects of the present disclosure include systems and methods for authenticating data received from a client device (e.g., client device 153, as shown in FIG. 1) by a service provider (e.g., by server 110, as shown in FIG. 1). Some steps of the method may be performed by at least one hardware processor of server 110, while other steps of the method may be performed by at least one hardware processor of client device 153 or hardware associated with client device 153 (e.g., a receiving box 141, such as set-top box (STB), set-top unit (STU), customer premises equipment (CPE), and the like, as shown in FIG. 1). In an example embodiment, the method may include receiving user credentials from client device 153 (herein also referred to as user device 153) via a secure communications channel. In an example embodiment, the secure communication channel may be an SSH encrypted channel, a VPN connection, a transport layer security (TLS) connection, or any other suitable connection that allows exchanging information securely. The secure channel may be accessed via any suitable software application (e.g., a web browser, an SSH client, and the like). In an example embodiment, client device 153 may provide user credentials in the form of client device 153 identification and a password. In an example embodiment, client device 153 may use the credentials to establish secure communication with server 110. In an example embodiment, STB identity may also be used as the credentials, or any other suitable credentials may be used.

Some aspects of the present disclosure include client device 153 establishing a secure communication channel with a standalone authentication server, such as, for example, server 14, as shown in FIG. 3. In an example embodiment, server 114 may be able to establish secure communications with client device 153 and server 110. Alternatively, server 110 may be configured to establish a secure communication channel with client device 153 and authorize client device 153.

In various embodiments, client device 153 may prove to server 110 (or authentication server 114) that device 153 is authorized to access upload/download services provided by server 110. Client device 153 may be configured to connect to a "fronting service" via a private link using an appropriate upload or download service, and that service can authenticate client device 153 (by state-of-the-art means). The fronting service may be, in some cases, executed by server 110. In an example embodiment, after authenticating client device 153, the probe service may be run by server 110 and may be a first step for determining if client device 153 needs to upload one or more data segments. The probe service may be configured to determine if client device 153 possesses data related to a recorded broadcast program. Additionally, the probe service may assign a canonical segment IDs for data segments uploaded to server 110. In some cases, canonical segment IDs may be provided to client device 153 along with a challenge. These canonical segment IDs may substitute related segment IDs computed for the related data segments stored at client device 153. Additionally, the probe service may be configured to determine the action (e.g., the action may be Upload, or Do Not Upload), that needs to be taken by client device 153 during the offload process. Using the probe service, server 110 may determine what uploads may need to take place and where the segments should be sent to an appropriate storage (e.g., a database).

For example, the fronting service may be the service for receiving user credentials from client device 153 via a secure communications channel, as described above. In an example embodiment, the fronting service may communicate with a client device via an HTTP session. In one embodiment, a permission token may be similar to an HTTP cookie, which is encrypted to secure the contents so that the permission token is opaque data to the client device. Alternatively, permission tokens may be a handle (e.g., a pointer) that can be used by server 110 to look up server 110's copy of the data related to the permission token.

After receiving user credentials, fronting service may determine that client device 153 is authorized to access upload/download services and provide to client device 153 a permission token, via the secure channel. The permission token may include any suitable data structure that can contain data that can be used in later communication for authenticating client device 153. The permission token may include, for example, any suitable secret data that may not be accessible to client device 153. For example, secret data may include a validity period (e.g., a period of time through which communication between client device 153 and server 110 is being authorized). In some cases, secret data may be protected with a secret key only known to server 110 and may not be known to client device 153.

Additionally, the permission token may include a shared secret (e.g., a secret that may be known but not visible to both server 110 and client device 153). In an example embodiment, the shared secret may include a special token-identifying number, herein referred to as a sequence number, and an increment algorithm for incrementing the sequence number. In an example embodiment, the algorithm may provide instructions, such that, when executed by a processor (e.g., a processor of client device 153 or processor of server 110), results in an output of a new sequence number (or an incremental number for the sequence number, which may be used to increment the sequence number). Also, the increment algorithm may be transmitted to client device 153 as a separate data (i.e., not as a part of a permission token). In an example embodiment, the algorithm may be used by a client program application associating with client device 153, and in addition, the algorithm may be used by a server program application associated with server 110.

In some embodiments, server 110 may share the sequence number and an increment algorithm via a secure channel with client device 153 (e.g., client device 153 may have access to the sequence number and an increment algorithm). Additionally, the sequence number and the increment algorithm are contained in an encrypted portion of a data structure of the permission token. In some cases, client device 153 and server 110 may maintain their own copies of the shared secret. Client device 153's copy of the shared secret may be initialized during a secure communication via the secure channel. Further, during the secure communication, the permission token may be sent to client device 153 and include server 110's copy of the shared secret (or a handle that can be used by server 110 to look up server 110's copy of the shared secret). In various embodiments, only server 110 may be able to read the server 110's copy of the shared secret.

After a successful request is made for offloading or downloading data, server 110 may update a local copy of the shared secret and explicitly issue a new permission token containing or referencing the updated shared secret. Subsequently, the new permission token may be transmitted to client device 153. After receiving the new permission token, client device 153 may update its shared secret by incrementing a sequence number contained in the shared secret using the increment algorithm contained in the shared secret.

In some cases, client device 153 may maintain a client's public key and a client's private key. Similarly, server 110 may maintain a server's public key and a server's private key. Upon exchanging their respective public keys, server 110 may use the server private key to digitally sign messages to client device 153, and client device 153 may use the client's private key to digitally sign messages to server 110. Such digital signing may be used to verify that messages received from client device 153 are not altered and were issued by client device 153, while messages received from server 110 are not altered during the transmission (e.g., via a person-in-a-middle attack) and were issued by server 110. In some cases, a server 110 may be configured to exchange a symmetric client-server keys during a secure connection, and the symmetric key may be used for digitally signing transmitted data.

In some cases, when communication of client device 153 with server 110 relates to a process of downloading content recorded by client device 153 from a database (e.g., database 180) associated with server 110, server 110 may provide a challenge to determine client device 153 has a proof allowing device 153 to download the content. The challenge may be provided to client device 153 for client device 153 to produce a proof, which client device 153 may present at the time of download. The proof may indicate that client device 153 was previously able to make a recording of the data for which the downloading request is being made. If client device 153 presents a valid proof to server 110, server 110 may allow client device 153 to download.

For example, as described herein, the challenge for a data segment of the content may include providing a portion of the data segment to server 110 (e.g., providing a few bits of data to server 110, or a hash digest of the data segment, the hash digest performed by a suitable hash function communicated as a part of the challenge). In various embodiments, the challenge may be incorporated into a data structure, forming the permission token.

In various embodiments, data obtained from the shared secret may be used for signing messages between client device 153 and server 110. For example, any data communicated over the non-secure communications channel between client device 153 and server 110 (also herein referred to a service provider) may be signed by a token-based cryptographic key. The token-based cryptographic key may be formed, for example, using data from the shared secret. For example, at least some of the data from the permission token (e.g., a shared secret) may be passed to a hash function, which may compute a hash digest. The hash digest may then be used as the token-based cryptographic key. In some cases, all data of the permission token may be used by the hash function to compute the hash digest.

Upon receiving a message from client device 153 digitally signed using information from the permission token, server 110 may be configured to verify the digital signature by reconstructing the information contained in the digital signature using data from the permission token.

It should be noted that if the message is modified by a person-in-a-middle attack, the digital signature will not match a corresponding digital signature formed by server 110, and server 110 may determine that the message was tampered with. If the message is tampered with, server 110 may be configured to request another communication from client device 153. In an example embodiment, when a message appears to be modified during transmission, server 110 may be configured to reestablish the communication over a secure channel.

Figure 11A:
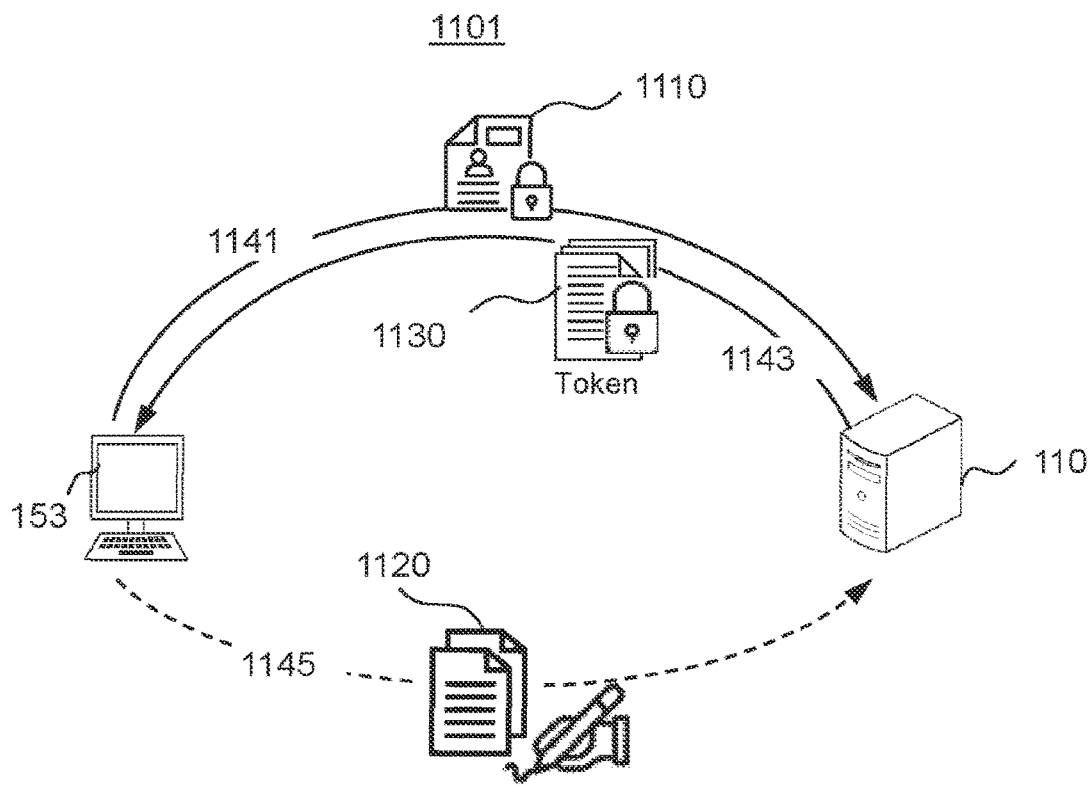
FIG. 11A is an exemplary diagram of a client device communicating with a server, consistent with disclosed embodiments.

FIG. 11A shows an example process 1101 for authenticating client device 153 with server 110. At step 1141, client device 153 may be configured to submit to server 110 an encrypted message 1110 that may contain a request for offloading or downloading data from server 110. In an example embodiment, request message 1110 may include user credentials and may be communicated via a secure connection (indicated by a solid arrow in FIG. 11A). In response, server 110 may transmit to client 153 a permission token 1130 at step 1143. As described before, permission token 1130 may include a data structure that may include various secret information (e.g., time at which permission token is activated, time at which permission token is terminated, and the like). The information within the data structure may be dependent on a type of request from client device 153. For example, for a request to download (or offload) an episode of a talk show "Rachel Maddow," the information may include a challenge (e.g., challenge 447, as shown in FIG. 4B), as described herein. A different challenge (or, in some cases, the same type of challenge) may be provided for a different request. For example, for the request to download the show "Rachel Maddow," a challenge may include providing last bits of data for each data segment of the show, while a request to download an episode of "Morning Joe" may include a hash digest of the data segments. Both message 1110 and permission token 1130 may be communicated via a secure channel, and may not require being digitally signed by client device 153 or server 110.

In various embodiments, as described above, the permission token may be provided by server 110. In various cases, the information in the data structure of the permission token may include a challenge, for example, during an offload process (e.g., the initial challenge may be provided during a probe process).

Figure 11B:
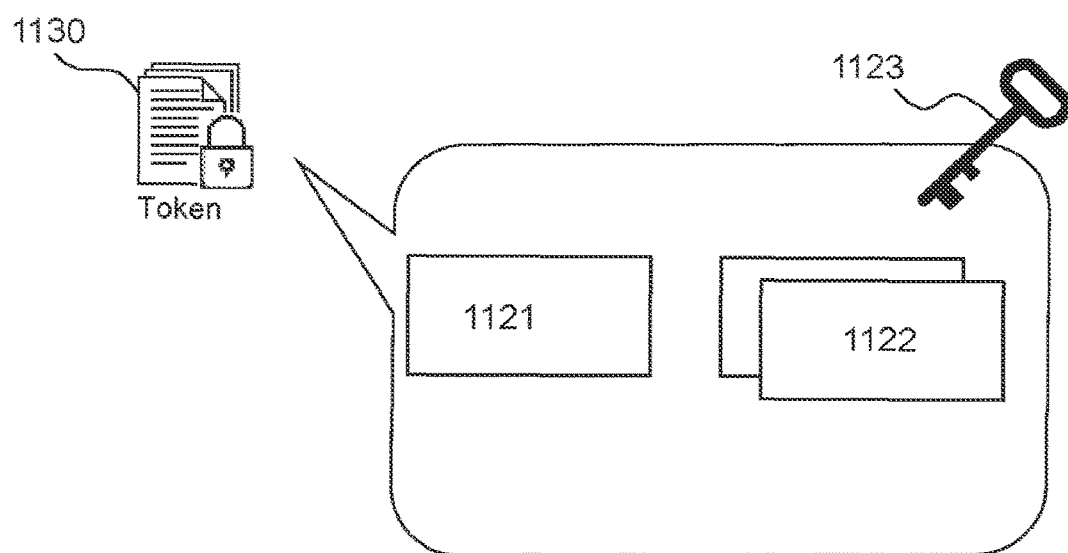
FIG. 11B is an exemplary diagram of a structure of a token, consistent with disclosed embodiments.

FIG. 11B shows that permission token 1130 may include various data such as data 1121 and 1122. In an example embodiment, 1121 may include a challenge (e.g., challenge 447), the sequence number described above, or any other relevant information as described above. In an example embodiment, 1122 may include a hash function that may be used for signing digital messages.

As described before, permission token 1130 may have a shared secret that may be shared between client device 153 and server 110. The shared secret may include the sequence number, an increment algorithm, and/or a download challenge. Further, permission token 1130 may include a secret that may not be known to client device 153 (e.g., the secret may be encrypted by a cryptographic key associated with server 110). The secret may include information that is only accessible to server 110. For example, the secret may include a period of validity of permission token 1130. Further permission token may include information related to a request from client device 153. Such information may include a broadcast channel name, a broadcast program name, or any other metadata related to video data associated with the request.

Figure 12:
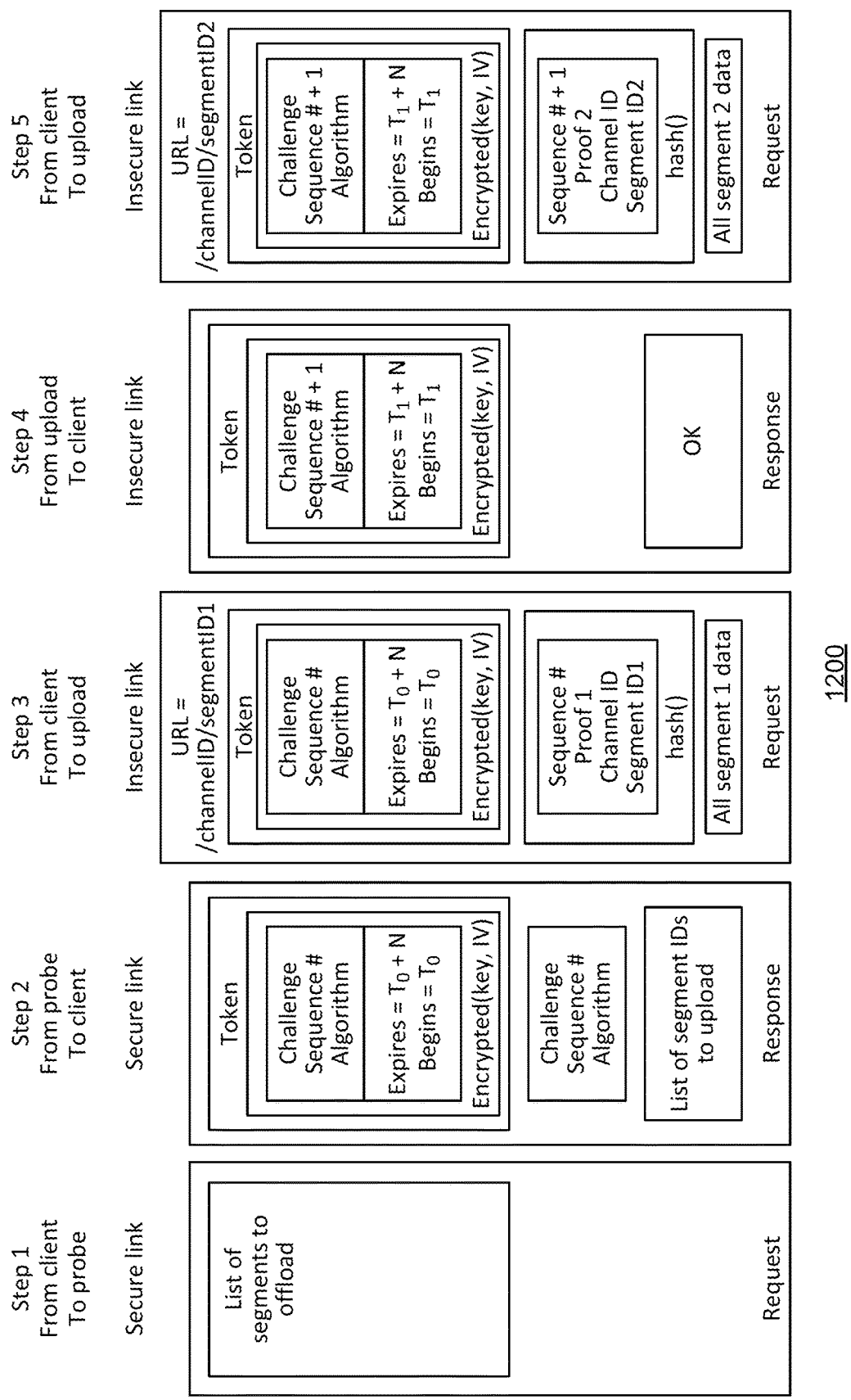
FIG. 12 is an exemplary process of offloading data to a server using permission token authentication, consistent with disclosed embodiments.

FIG. 12 shows an example data offloading process between a client device (e.g., device 153) and server 110. In an example embodiment, the offloading process may include uploading data segments recorded by client device 153 to a database associated with server 110.

At step 1, client device 153 may request to offload a list of data segments. The offloading request may be established via a secure connection (also referred to as a secure link). As previously described, during the secure connection, client device 153 may provide device credentials. Server 110 (or any other authentication server connected to server 110) may verify device 153 credentials and provide to device 153 a permission token at step 2 of the process. Permission token may be encrypted using a cryptographic key. In some cases, an initialization vector (IV) may be used, as shown in FIG. 12. Alternatively, an encryption without IV may be used as well. In an example embodiment, the information contained in the permission token and encrypted with the cryptographic key and IV may only be decrypted by server 110 and may not be accessible to client device 153. In an example embodiment, as shown in FIG. 12, permission token may include a challenge, a sequence number, and an algorithm for incrementing the sequence number. Further, the permission token may include information related to the expiration of the token. For example, as shown in FIG. 12, the permission token may include a time $T_0$ at which the token is activated, and a time $T_0+N$ at which the token is terminated. In an example embodiment, times $T_0$ and $T_0+N$ may be measured using a clock available to server 110.

Additionally, as part of step 2 of process 1200, challenge, sequence number, and incremental algorithm for updating the sequence number may also be provided to client device 153 outside of the data structure of the permission token. Such information may be provided to client device 153, such that it can be read by client device 153. Additionally, a list of segment IDs may be provided to client device 153 as a part of a response to the request by client device 153. In an example embodiment, the response to the client's request may be provided via a secure link to ensure that any data communicated to client device 153 is not subject to any of person-in-a-middle attacks (or any other attacks).

After completing step 2 of process 1200, subsequent steps of communication of client device 153 and server 110 may be via a non-secure communication (i.e., via an insecure link, as shown in FIG. 12). At step 3, client device 153 may provide server 110 data for upload. In an example embodiment, the data for the upload may include a first data segment corresponding to the segment ID number (segmentID1, as shown in FIG. 12). In an example embodiment, a URL may be formed using channel ID (e.g., a channel ID may be "CNN", as is indicated by channel ID, as shown in FIG. 12). As shown in step 2, segment IDs may be formed by server 110 and provided to client device 153. In an example embodiment, the data segment with segmentID1 may be digitally signed using information available to the client device 153 and using a permission token. For example, client device 153 may use a sequence number, a proof corresponding to the challenge (as stored in the permission token) as well as channel ID and segment ID as data used by a hash function to obtain a hash digest from the data known to the client. The hash digest may be used as a digital signature. Such a digital signature formed from the hash digest may include at least some information known to both client device 153 and server 110. When server 110 obtains the digital signature, it can verify such a digital signature by forming the hash digest using a sequence number, the copy of the proof for the challenge stored in the permission token, challenge ID and segment ID 1. In some cases, when the copy of the proof is not available for server 110, the proof may not be included as a part of the hash digest.

Server 110 may include all the necessary information for forming the hash digest. After forming the hash digest, server 110 may compare the result with the digital signature received from client device 153. If the digital signature matched the result obtained by server 110, server 110 may establish the authenticity of the digital signature, and a fact that the message has not been tampered with via a person-in-the-middle attack.

At step 4 of process 1200, server 110 may update the sequence number of the token by incrementing a sequence number of the token using the increment algorithm (in FIG. 12, such process is indicated as sequence #+1). Additionally, server 110 may be configured to update the activation and termination time for the token. For example, the token may be activated at time $T_1$ and be terminated at time $T_1+N$. In an example embodiment, the updated token is encrypted and may be digitally signed. Further, at step 4, server 110 may transmit to client device 153 a message that the data was successfully received.

At step 5, client device 153 may use the previously received increment algorithm to update the sequence number (this is indicated by sequence #+1 for step 5, as shown in FIG. 12). Further, client device 153 may request to upload a second data segment (data segment 2, having a second segment ID (segment ID 2, as shown in FIG. 12)) to server 110. In an example embodiment, client device 153 may use a hash function to form a hash digest from a data that may include an incremented sequence number, a second proof (proof 2, as shown in FIG. 12) for the second data segment, a channel ID, and a segment ID 2 to form a second digital signature for the data segment 2. The second digital signature may be verified by server 110, as server 110 may have all the necessary information for verifying the second digital signature as previously described.

While the above description was related to the offloading process, a similar process may be related to a download process. For example, client device 153 may request a permission token from server 110 via a secure connection at step 1, at step 2 receive the permission token from server 110, as described above, at step 3 request data for download, by providing, for example, a hash digest formed from a sequence number for the token, a proof for a segment that needs to be downloaded, a related challenge, a channel ID, and a segment ID. Upon receiving the request from client device 153, server 110 may provide to the client device the requested data segment digitally signed as previously explained using the hash digest. After completing the download request for a first data segment, server 110 may update the permission token, and transmit the updated permission token to client device 153 digitally signed as previously described using the hash digest. In an example embodiment, client device 153 may update a sequence number using an increment algorithm upon receiving the updated permission token and request download for another data segment.

Figure 13:
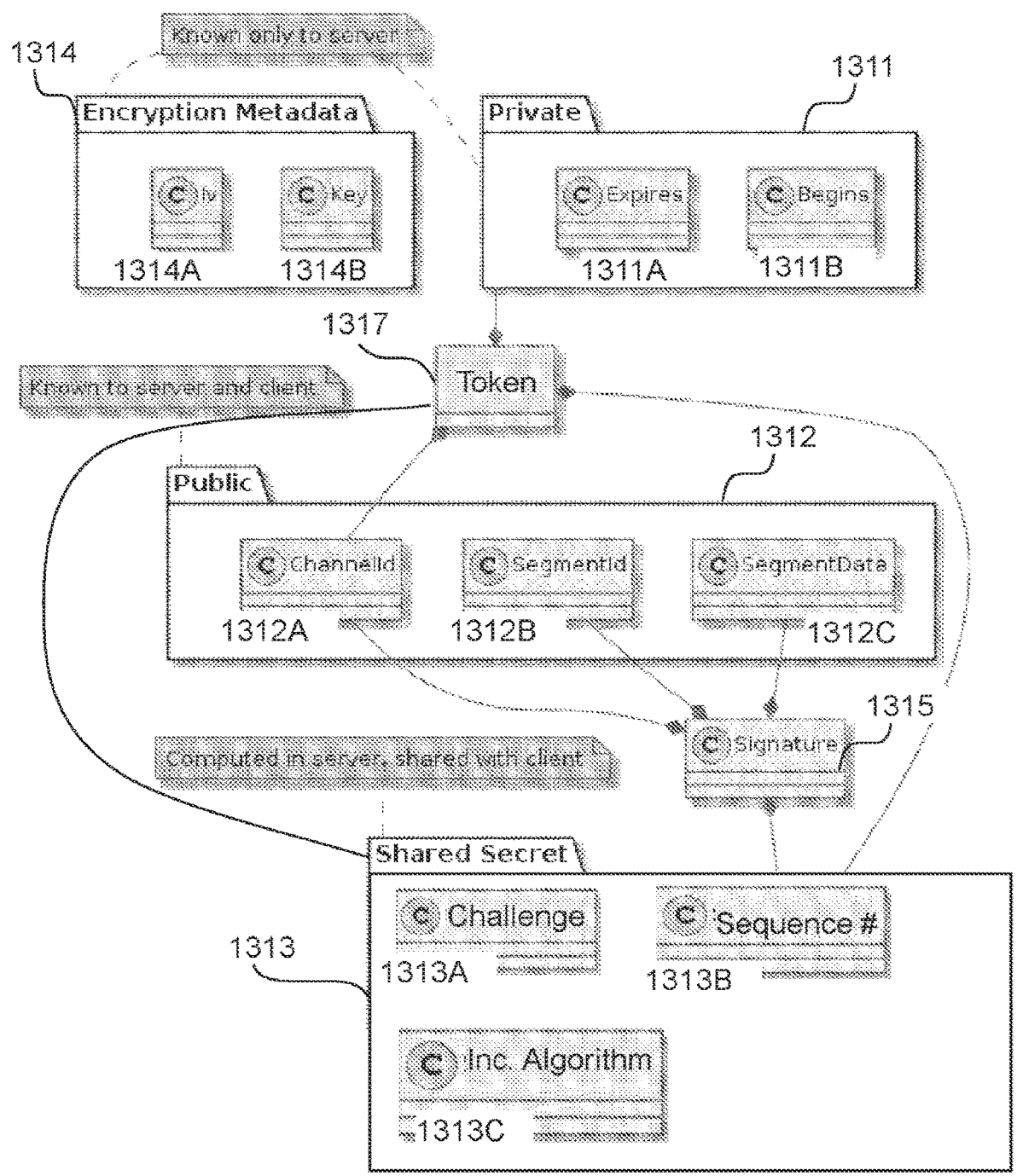
FIG. 13 depicts components of a permission token and related data for digital signature, consistent with disclosed embodiments.

FIG. 13 shows an example data structure of an example permission token (e.g., permission token 1317). Permission token 1317 may be encrypted with a cryptographic key 1314B known to server 110 and an initialization vector 1314A, both key 1314B and vector 1314A being part of a metadata 1314 available only to server 110. Also, as described above, permission token 1317 may include a private data structure 1311 that may contain a beginning time 1311A at which token may be activated and an ending time 1311B at which token may be terminated. For example, if permission token 1317 is received by server 110 after time 1311B, server 110 may determine that permission token 1317 is invalid.

In an example embodiment, permission token 1317 may also include information from public data structure 1312, such as channel identification 1312A. Additionally, permission token 1317 may include information from a shared secret data structure 1313, such as a challenge 1313A and a sequence number 1313B, as described above (e.g., the sequence number is indicated as sequence # in FIG. 12). Furthermore, shared secret data structure 1313 may include an increment algorithm 1313C.

In various embodiments, as described above, various data may be used to form a first hash digest, as described above. In an example embodiment, public and shared secret data structures may be used for generating the first hash digest that can be used for digital signature 1315. For example, segment ID 1312B, channel ID 1312A, and sequence number 1313B may be used to form the first hash digest. In some cases, other information obtained from a data segment (or from probe parameters related to the data segment indicated by segment data 1312C) may be used to form the first hash digest.

Other aspects of the present disclosure relate to systems and methods for updating permission token 1317 either after completion of the request or after the expiration of token 1317. For example, after completion of a downloading request, permission token 1317 may be updated. In an example embodiment, the request may be completed (e.g., the content of a broadcast program may be downloaded from server 110 to client device 153, or video data recorded on client device 153 may be offloaded to server 110), and server 110 may transmit a message to client device 153 with the updated permission token 1317. As described above, the increment algorithm may be previously transmitted to client device 153 either as a part of permission token 1317 or, in some cases, as separate data. In an example embodiment, when the increment algorithm is transmitted separately from permission token 1317, the increment algorithm may be transmitted during a secure communication between client device 153 and server 110.

In various embodiments, the increment algorithm may include any suitable updates of the sequence number. For example, the increment algorithm, when operating on the sequence number, may result in the sequence number being incremented by one. In an alternative embodiment, the increment algorithm may include adding any other integer (e.g., two) to the sequence number, multiplying the sequence number by any selected integer, or subtracting any chosen integer. In some cases, the increment algorithm may include more complex numerical operations, for example, computing an MD5 message digest of the current sequence number, encrypting the sequence number using an appropriate key (e.g., the appropriate key may be based on the sequence number) or, in some cases, using a pseudo random integer number generator configured to take as an input value the sequence number and return a next sequence number. The random integer number generator may take any suitable number as a seed number (e.g., the seed number may be the first sequence number).

In some cases, there may be more than one increment algorithm, and there may be an algorithm for selecting which one of the increment algorithms is selected for incrementing the sequence number in a subsequent sequence number incrementing step.

In some embodiments, upon receiving a request from client device 153, server 110 may record the use of permission token 1317 and/or a digital signature based on permission token 1317 (e.g., the digital signature based on a token-based cryptographic key, as described above) in a "burned list" so that any subsequent request to server 110 that may reuse permission token 1317 and/or the digital signature may be rejected. The validity period, as determined by times 1311A and 1311B for permission token 1317, may be sufficiently short (e.g., a few seconds, ten seconds, a few tens of seconds, a minute, and the like), and the burned list may be purged quickly. In an example embodiment, the use of the burned list may facilitate identifying a person-in-a-middle attack that attempts to acquire data related to permission token 1317 and/or a related digital signature during transmission of this data and instigate multiple simultaneous connections to server 110.

In various embodiments, permission token 1317 may be updated after completing the request to upload at least one data segment to server 110. When completing the request, server 110 may provide client device 153 a challenge for uploading at least one data segment, wherein the challenge may be digitally signed with the digital signature based on the permission token (e.g., a token-based cryptographic key, as described above). In various embodiments, when receiving data segments during an uploading process by server 110, the data segments may be digitally signed by the digital signature based on the permission token. In some cases, the challenge and the asserted proof are encrypted by the token-based cryptographic key, as described above. Additionally, any data communicated over the non-secure communications channel between client device 153 and server 110 may be encrypted by the token-based cryptographic key. Further, the data may also be encrypted by content key 231 and a common key, as described herein.

In an example embodiment, client device 153 may initiate a request (e.g., a request for uploading content) via a secure channel and may provide at least some data related to data segments of the content (e.g., sizes of the data segments that needs to be uploaded, or some data related to the data segments) as well as metadata for the data segments (e.g., channel ID, program name, and the like). Upon receiving the request, server 110 may provide, via the secure channel, permission token 1317 that may include a challenge, as described above, as well as some partial segment data. In various embodiments, server 110 may maintain a server copy of permission token 1317.

Client device 153 may treat the permission token 1317 as opaque data. For example, client device 153 may pass the public and shared secret data structured to a hash function and generate a corresponding hash digest. In the case of an upload request for a data segment, client device 153 may additionally pass the size of the data segment and, in some cases, partial segment data as an input to the hash function. The resulting hash digest may be used to form a token-based cryptographic key that can be used to digitally sign the request. The resulting digital signature may bind the request for uploading the data segment to other data of permission token 1317, such as the sequence number of permission token 1317, and properties of the data segment (for a case of the upload request).

In some embodiments, systems and methods for authenticating client device 153 with server 110 may include any suitable combination of authentication steps discussed above. For instance, the method may include receiving a client public key from client device 153 by server 110 and transmitting a server public key to client device 153. Further, the method may include receiving user credentials encrypted with the server public key and digitally signed with a digital signature associated with the client's private key. The method may include verifying the digital signature by server 110 using the client public key, decrypting the user credentials, and upon verifying the user credentials, providing to client device 153 a permission token (e.g., permission token 1317) encrypted via the client public key and digitally signed with a digital signature associated with the server's private key. Additionally, the method may include receiving a request from client device 153 by server 110 via a non-secure communications channel. The request may be digitally signed by the digital signature based on the permission token. The method may also include server 110 verifying the digital signature by using a local copy of the permission token.

In an example embodiment, server 110 may update its copy of permission token 1317 via the increment algorithm, as discussed above, and transmit the updated permission token 1317 to client device 153. Further, the updated permission token may be digitally signed using any suitable approach. In some cases, an encryption scheme for the permission token may also be used to encrypt the token. In some embodiments, a permission token may be a server-side handle and may not require to be signed.

Upon receiving the updated, encrypted, and digitally signed permission token, client device 153 may analyze the digital signature to verify that server 110 is the sender of the updated, encrypted permission token, may use it as a new permission token, and may delete a previously used permission token.

In various embodiments, a suitable time incrementing algorithm may be used to increment times 1311A and 1311B, as shown in FIG. 13. Such an update may only be done by server 110 when updating permission token 1317.

Aspects of systems and methods for authorizing client device 153 to communicate with server 110 may not prevent a person-in-a-middle attack, but may not allow the attacker to obtain any useful information from a transmitted message or to alter a message without server 110 or client device 153 noticing that the message is altered. For instance, the attacker may intercept messages from client device 153. Any attempts by the attacker to change the size (or any data bits) of a message from client device 153 to server 110 may fail, as at least some of the information of the data communicated between client device 153 (herein referred to as a message) and server 110 is used for generating a digital signature. Thus, if any data bit of the message is modified, the digital signature that was used to sign the original message may not correspond to the modified message, and server 110 will be able to establish such a lack of correspondence. Similarly, while communicated messages digitally signed by server 110 and transmitted to client device 150 may be attacked and modified during the person-in-a-middle attack, such attacks may be easily detected due to a lack of correspondence of the digital signature and the content of the modified message. In the case of the attack, server 110 may be notified of attack attempts. It should be noted that since at least data segments between client device 153 and server 110 are encrypted at least by content key 231 and a common key, as previously described, the attacker will be unable to understand the at least data segments unless he/she is in possession of keys for decrypting the data segments.

Figure 14:
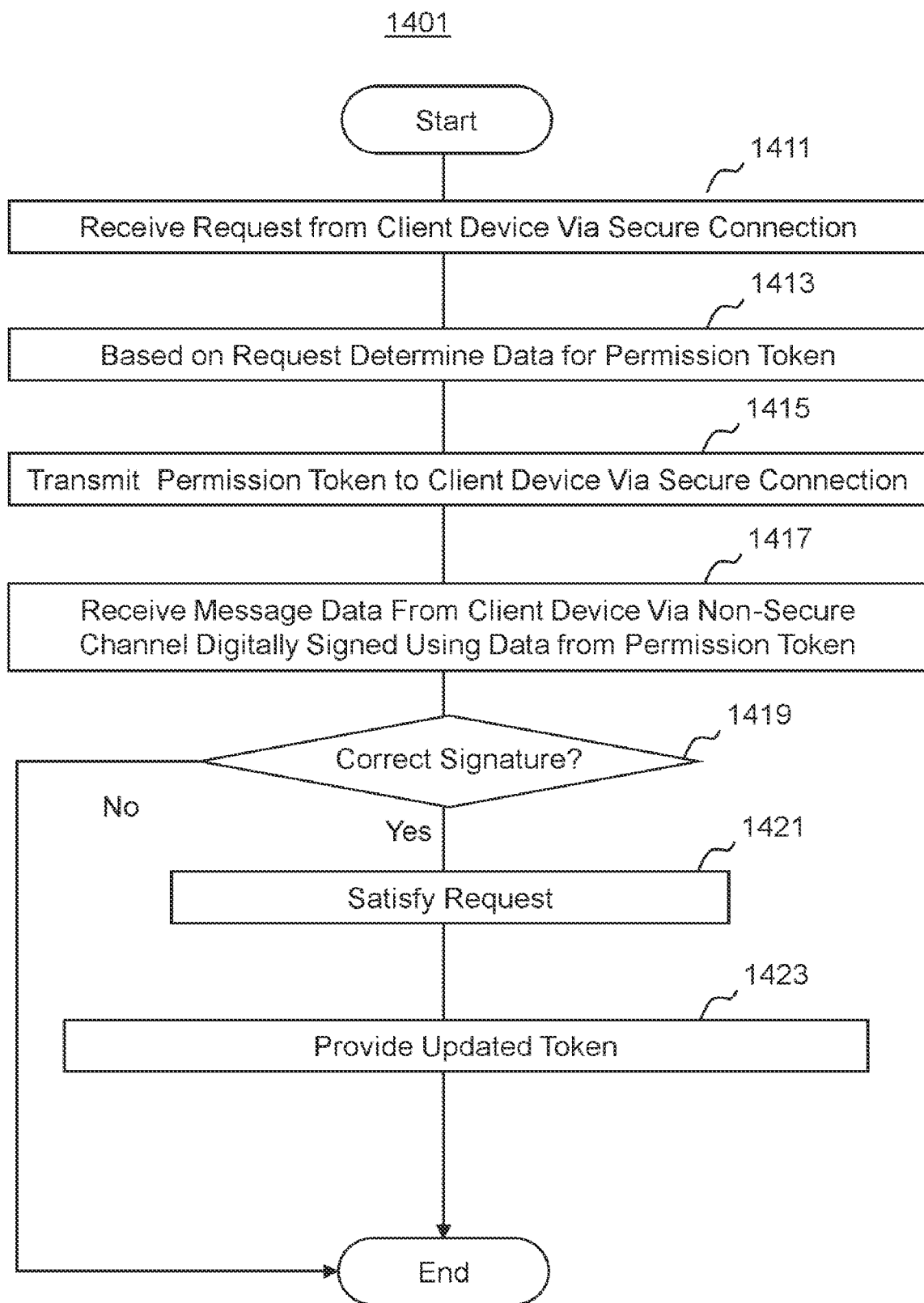
FIG. 14 is an exemplary diagram of a process of authentication, consistent with disclosed embodiments.

FIG. 14 summarizes an example process 1401 for authenticating client device 153 to communicate with server 110 using more than one request. Process 1401 may be performed by server 110. At step 1411, server 110 may receive a request from client device 153 to offload content to server 110 (or download content from server 110). The request at step 1411 may be made via a secure connection authenticated using user credentials such as a user identification number and/or password. At step 1413, server 110 may be configured to generate a permission token (e.g., permission token 1317). For example, for cases when the request is an upload request, permission token 1317 may include a challenge (in some cases, the challenge may also be included in a data structure forming the permission token for download requests). At step 1415, server 110 may transmit permission token 1317 to client device 153 via a secure connection. At step 1417, server 110 may be configured to receive other messages pertaining to the request from client device 153. For example, such other messages may include providing a proof that client device 153 is in possession of content. Further, at step 1417, client device 153 may form a digital signature using data that may include a sequence number, a proof, a channel ID, and a segment ID, and a permission token, as previously described.

At step 1419, server 110 may determine whether the digital signature is correct. If the digital signature is successfully verified (step 1419, Yes), server 110 may satisfy the request from client device 153 at step 1421. For example, server 110 may offload data from client device 153 at step 1421 or may allow client device 153 to download data from server 111. Following step 1421, at step 1423, server 110 may provide an updated permission token, as described above. Alternatively, if the digital signature is not successfully verified (step 1419, No), process 1401 may be completed.

In some cases, due to data errors, if a request from client device 153 cannot be satisfied, even when the digital signature is verified, if the data errors can be corrected in a short period of time (e.g., by resending data), server 110 may return a new permission token. However, if the data errors may not be immediately corrected, server 110 may not provide the permission token to client device 153, and client device 153 may be forced to reauthenticate.

Figure 15:
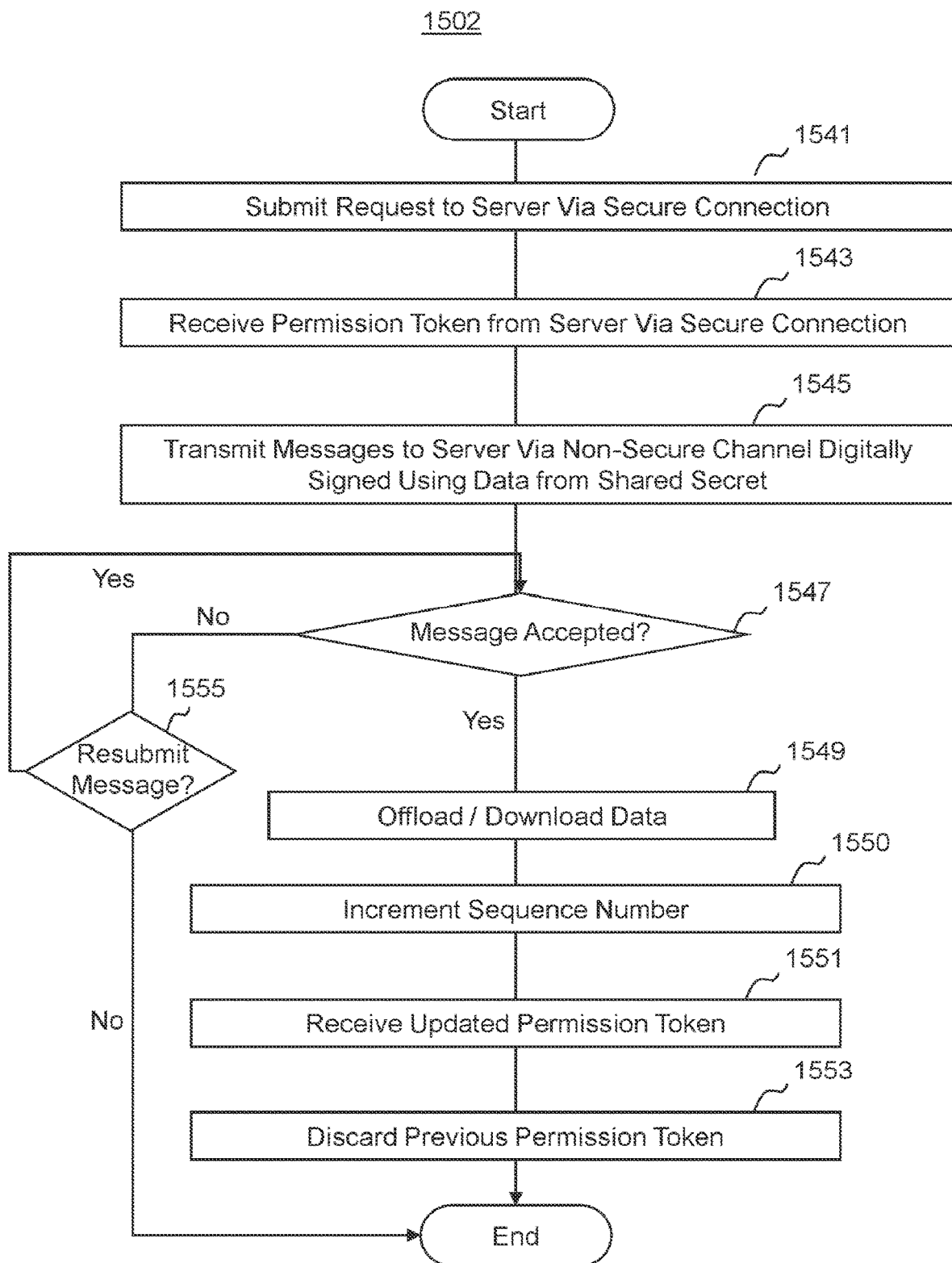
FIG. 15 is another exemplary diagram of a process of authentication, consistent with disclosed embodiments.

FIG. 15 summarizes an example process 1502 for authenticating client device 153 to communicate with server 110 using more than one request. Process 1502 may be performed by client device 153. Steps of process 1502 may mirror the steps of process 1401. At step 1541, client device 153 may submit a request to server 110 to offload or download content. The request may be made via a secure connection authenticated using user credentials such as a user identification number and/or password. At step 1543, client device 153 may receive a permission token (e.g., permission token 1317) from server 110 via a secure connection. At step 1545, client device 153 may be configured to transmit other messages pertaining to the request from client device 153, as discussed above. The messages include a hash digest formed from shared secret information. If client device 153 receives information that the message is accepted by server 110 (step 1547, Yes), client device 153 may offload or download data at step 1549. At step 1550, client device 153 may increment sequence number, as described above, and at step 1551, client device 153 may receive updated permission token 1317. At step 1553, client device 153 may discard the previous version of the permission token. Alternatively, if client device 153 receives information that message is not accepted by server 110 (step 1547, No), client device 153 may be configured to resubmit the message at (step 1555. Yes) and proceed to step 1547, at which it receives information determining whether or not the message is accepted. Step 1555 may be repeated several times (e.g., a set number of times) before the resubmission is not selected (step 1555, No). When the resubmission is not selected (step 1555, No), process 1502 may be completed.

In various embodiments, a method of authenticating data received from a user device by a service provider may be performed by at least one hardware processor of the service provider. The method may include receiving user credentials from the user device via a secure communications channel, and upon verifying the user credentials, providing to the user device a permission token via the secure channel, wherein the permission token includes a secret and a shared secret. The method may include receiving a request from the user device via a non-secure communications channel, wherein the request may be digitally signed with a digital signature based on the permission token. In an example embodiment, the permission token may be encrypted based on a cryptographic key maintained by the service provider, which is not made available to the user device. The method may further comprise verifying the digital signature based on at least the cryptographic key. Further, the shared secret may be shared between the service provider and the user device and includes at least one of a sequence number, an increment algorithm, and a challenge. In some cases, the secret represents a period of validity of the permission token. In some cases, the request may include information about video data, and wherein the permission token includes information about at least one of a broadcast channel or a broadcast program related to the video data. In some cases, the request may be a request to offload at least one data segment.

In some embodiments, the method may include upon successfully verifying the digital signature, completing the request, communicating to the user device (e.g., client device 153) that a sequence identification number requires to be incremented via an algorithm, and updating a local copy of the permission token by incrementing the sequence identification number via the increment algorithm. The increment algorithm (also referred to as the algorithm) may include adding an integer to the sequence identification number. In some cases, the algorithm may include a pseudo random integer number generator configured to take as an input value the sequence identification number and return a next sequence identification number.

In some cases, completing a request to offload the at least one data segment may include providing to the user device a challenge for offloading the at least one data segment, wherein the challenge may be digitally signed with the digital signature based on any suitable secret that can be verified by a server and optionally by a client device. Further, completing such a request may include receiving a communication from the user device wherein an asserted proof for the received challenge is included in a hash digest for computing a digital signature, and upon verifying the digital signature based on the hash digest using information from the permission token, authorizing the user device to offload the at least one data segment. In an example embodiment, the communication may be any suitable data (e.g., data segment that may be uploaded to server 110). Asserted proof (or simply proof as described herein) for the received challenge may be included in a hash using any suitable approach. For example, a hash function may be used to obtain a hash digest from the asserted proof, and such digest may be used for computing a digital signature (e.g., such a proof-based hash digest may be encrypted by a data obtained from the permission token, such as cryptographic key stored in the permission token, or a hash digest obtained from the permission token). Completing the request may further include receiving one or more data segments by server 110, wherein at least one of the data segments may be digitally signed by the digital signature based on the permission token. In some cases, the asserted proof may not be part of a digital signature.

In various embodiments, a method of authenticating data received from a user device by a service provider may be performed by at least one hardware processor of a server of the service provider. Aspects of the present disclosure further describe a system for exchanging data securely between a user device and a server, the system including server instructions, wherein at least one processor of the server performs the server instructions resulting in server operations. The server operations may include receiving a user credential from the user device via a secure communications channel, upon verifying the user credential, providing to the user device a permission token via the secure communications channel, and receiving a request from the user device via a non-secure communications channel, wherein the request is digitally signed by a digital signature based on the permission token. Further, the server operations may include verifying the digital signature using a local copy of the permission token. Further, the user device of the system may include at least one processor configured to perform operations that may include providing the user credential to the server via the secure communications channel, receiving the permission token via the secure communications channel, forming the request to the server, digitally signing the request with the digital signature based on the permission token, and providing the digitally signed request to the server via the non-secure communications channel.

For cases when client device 153 is in possession of data segments of the recorded content (e.g., during a process of offloading the content to server 110), any suitable information about the data segments may be incorporated as a part of the data structure of the permission token. For example, the information about one or more data segments may include a number of data segments, a hash digest of one or more data segments, segments identification numbers (if such numbers are present), metadata associated with the content, such as the title of a broadcast program associated with the content, a name of a channel translating the broadcast program, an identification of the channel, a time at which the broadcast program was translated (e.g., a starting time for the broadcast program), duration of the broadcast program, a genre for the broadcast program, or any other metadata may be incorporated.

As previously described, the data for offloading may be segmented into multiple segments. Each segment may comprise a sequence of packets. There may be, in some situations, reasons to identify a particular segment uniformly across all client devices 150. At least some packets of a segment may carry identifiers, such as PCRs as described above.

The arrival time of a first data packet of a data segment may also be used as a parameter for verifying that the data segment representing a broadcasting program matches other data segments from other client devices submitted to server 110 for offloading. In an example embodiment, a broadcast medium may deliver the packets to all receiving clients 150 at approximately the same time. Having identified the start of the segment unambiguously, the end can also be identified through a measurement of the number of data packets received between the start of one segment and the start of the subsequent segment.

The PCR values of PCR packets may be used to detect equivalent segments that have the same length, STC value, and approximately the same arrival time, and assign them the same canonical segment identifier. Herein the term "equivalent" in relation to data segments, refers to data segments representing the same broadcast data. While two data segments may be equivalent, these segments may not be identical. For example, these segments may be transmitted to different devices, and they may be encrypted using different cryptographic keys. In some cases, data segments may correspond to the same broadcast data, but may not be equivalent due to possible transmission errors associated with the transmission of these segments. For example, one data segment may not include a data packet due to transmission errors. All client devices receiving the segment can have the same PCR values obtained from corresponding PCR packets but may have slightly different times at which these segments were recorded by the client devices (herein a time at which a data segment is recorded by a client device is referred to as an arrival time or recording time). Hence, any two segments that have the same length. PCR values, and arrival time not differing by, for example, one second, two seconds, five seconds, ten seconds, twenty seconds, thirty seconds, a minute, or any other relatively small time difference (herein the difference between arrival times is referred to as a time difference), may be considered to be the same (i.e., equivalent) data segment and may be assigned a canonical segment identifier comprising a function of various parameters of a data segment, such as a length of the data segment (e.g., the number of packets within the data segment), an arrival time (herein, the arrival time may be an approximate time of the arrival of the first data packet of the data segment) of the data segment, a PCR value found in a first PCR packet of the data segment, or any other suitable parameter of the PCR packet. In various embodiments, data may not be segmented when it is arrived, and may be segmented using a suitable software installed at a client device. In an example embodiment, the function may depend on a 3-tuple {length. PCR value, arrival time}. Herein, the length may be the length of the data segment, and the arrival time may be the time of arrival of the data segment as recorded by a clock associated with a client device (e.g., client device 153). In an example embodiment, when a time difference for arrival times for two different data segments is smaller than a selected threshold time difference, server 110 may determine that arrival times for the two data segments are substantially the same.

Figure 16:
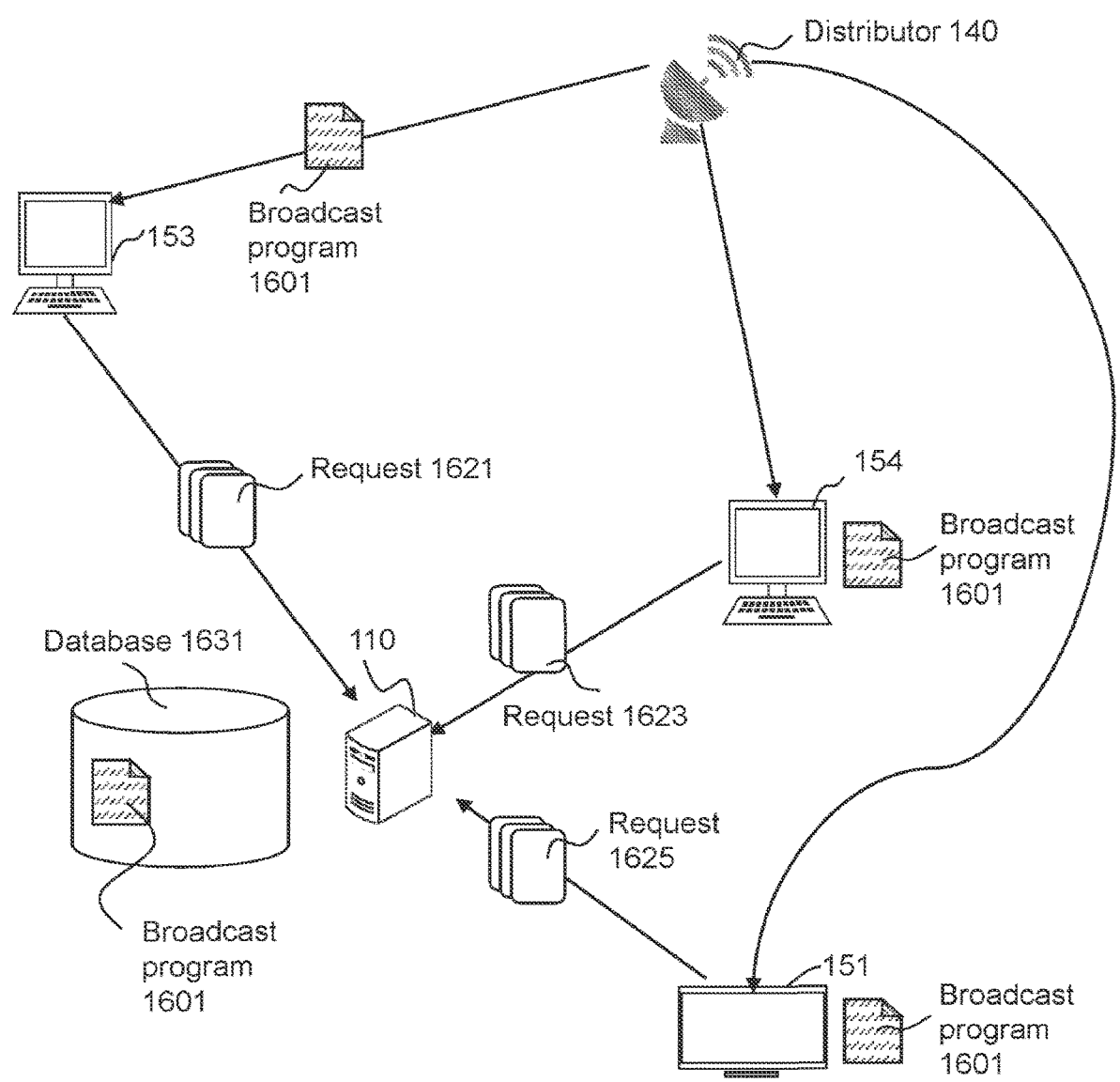
FIG. 16 is an exemplary diagram of a data communication system, consistent with disclosed embodiments.

FIG. 16 illustrates a schematic diagram of an exemplary system for distributing data, consistent with embodiments of the present disclosure. According to various embodiments, distributor 140 may distribute broadcast program 1601 to client devices 153, 154, and 151. Any of client devices 153, 154, and 151 may request to offload data to server 110. For example, client device 153 may submit a request 1621 for offloading a data segment (e.g., a data segment corresponding to a broadcast program 1601) to server 110. Upon receiving request 1621, server 110 may determine whether a copy of the data segment has been stored at a database (e.g., database 1631) associated with server 110. For example, database 1631 may have stored the data segment in response to requests from other client devices 150 (e.g., client device 154 or client device 151). In an example embodiment, probe parameters for a data segment (e.g., PCR values found within the data segment, arrival time, data segment header, and/or data segment length) may be used as a data segment identification (herein referred to as a segment ID). For example, the segment ID may be determined by combining bits of data corresponding to PCR value, arrival time, and data related to segment length using any suitable combination (e.g., making an ID by concatenating data bits together). A list of segment IDs may be a unique way of defining a recorded program. In some cases, segment IDs may not represent an entire broadcast program, and may represent one or more portions (e.g., disjoint portions) of the broadcast program. In this way, if two consecutive recordings are represented by equivalent lists of segment IDs they will both reference at least some of the same data segments even if the recordings are protected with different local keys. During an upload process, for each data segment, a client may only upload that data segment once because the segment ID is consistent between the two recordings. The data segment may then be stored in a database associated with server 110, encrypted using only a common encryption key. Additionally, the database associated with server 110 may include user profiles that may store local user keys (e.g., content key 232, as shown in FIG. 2A). During a download process initiated by a client device (e.g., device 153), server 110 may retrieve a copy of the data segment encrypted with a common key, encrypt it with content key 232, and provide the encrypted data to client 153.

Client device 154 may have received data segments (e.g., data segments corresponding to broadcast program 1601)

and may have submitted request 1623 for offloading at least some of the received data segments to server 110 prior to client device 153. Alternatively, client device 151 may have received the data segments and may have submitted request 1625 for offloading the data segments to server 110 prior to client device 153. Server 110 may have stored data related to the data segments offloaded by client device 154 or client device 151. Alternatively, server 110 may have stored the data related to the data segments for broadcast program 1601 offloaded by client device 151 because client device 151 may have requested to offload the data segments to server 110 prior to client device 153. To determine whether server 110 may have stored the data related to the data segments for broadcast program 1601 in database 1631, server 110 may verify data segments offloaded by client device 153 and data segments offloaded by a different client device 150 (e.g., client device 154 or client device 151). The process of identifying equivalent data segments is described below.

Figure 17:
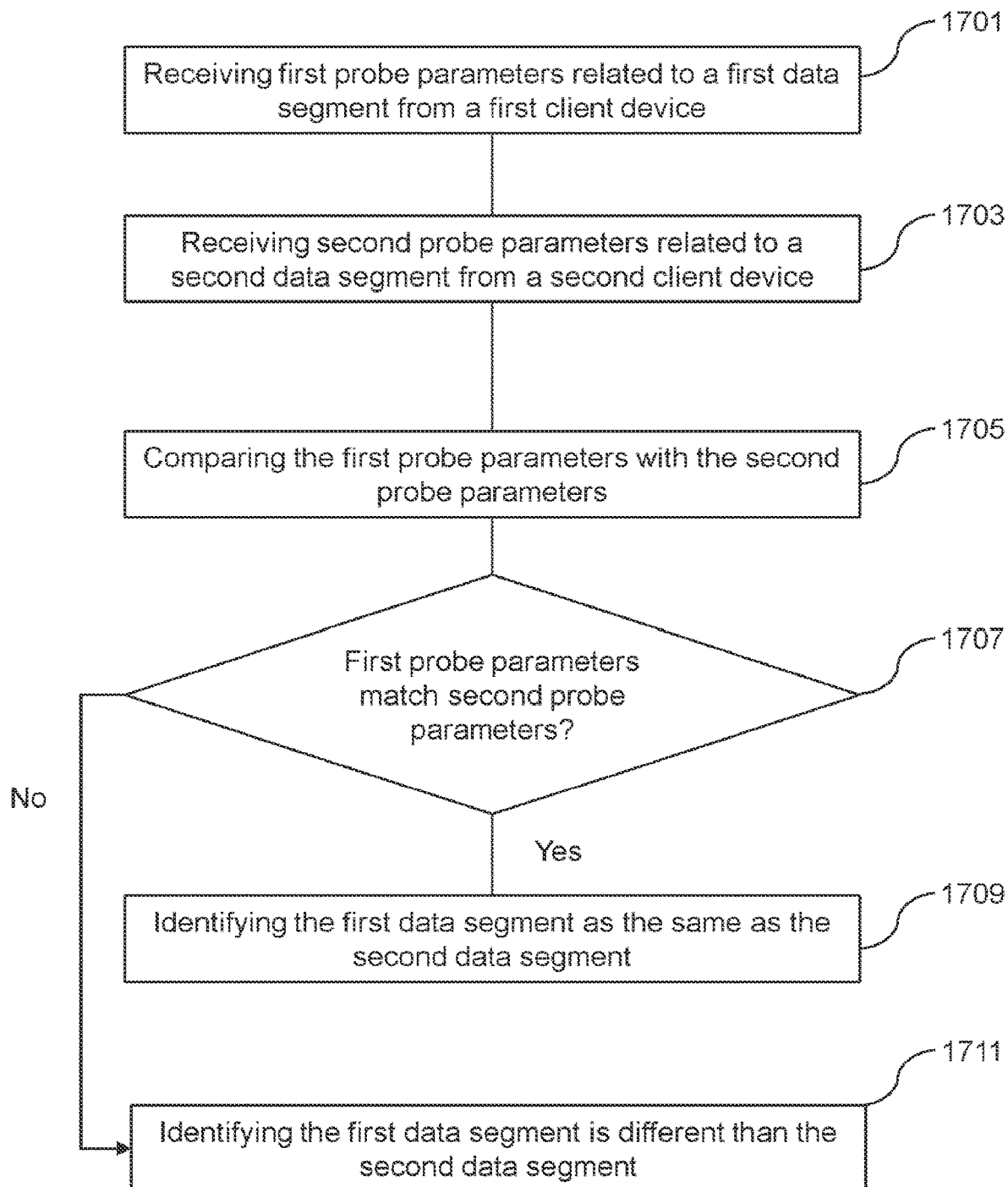
FIG. 17 is an exemplary diagram of a process of determining a match between data segments, consistent with disclosed embodiments.

FIG. 17 illustrates a flow chart of an exemplary method 1700 for identifying a data segment, consistent with embodiments of the present disclosure. The method 1700 can be performed by, for example, at least one hardware processor of a server (e.g., a server processor of remote storage server 110 in FIG. 1).

Server 110 may receive data segments from one or more client devices (e.g., client devices 150 in FIG. 1). Several techniques can be used to determine whether data segments from different client devices are equivalent. For example, some techniques may involve determining that the data segments from different client devices 150 arrive at these devices at approximately the same time. As an illustration, two different client devices (e.g., client devices 153 and 154) may receive the same streaming content at approximately the same time. As described above, the arrival time for the streaming content may be a parameter that is used to identify that data segments corresponding to the streaming content are the same.

Another technique may involve determining that identifiers of packets in the data segments from different client devices 150 are the same. In general, any unique identifiers that are encapsulated in the packets but are not encrypted can be used to indicate whether the packets from different client devices 150 are the same, since these identifiers may uniquely identify the streamed packets.

Further, another technique may include comparing lengths of data segments to verify that the data segments are equivalent. The length of a data segment may correspond to a number of data packets within the data segment (or length enumeration, as described above). Further, each data packet may have a set number of data bits (herein, the set number of data bits for the data packet is referred to as a bit length for data packet). Additionally, a bit length for a data segment may be referred to as a number of data bits in a data segment. In an example embodiment, when a first client device (e.g., client device 153) receives the data pertaining to a first data segment having a first length enumeration, and a second client device (e.g., client device 154) receives a second data segment having a second length enumeration, the first and the second length enumerations may be the same for determining that the first and the second data segments are the same (i.e., equivalent).

If the errors are present, the first data segment may have a different length enumeration than the second data segment, and thus, the first and the second data segments may include different segment identifiers. In an example embodiment, a bit length (herein also referred to as bit enumeration) may be used to further discriminate data segments that might otherwise have the same approximate arrival time and stream packet time (PCR value). The bit length may be used to discriminate data segments to accommodate the unreliable delivery nature of the broadcast medium.

In some cases, a first length enumeration for the first data segment may be slightly less or slightly greater than a second length enumeration for the second data segment. Such difference in the length enumerations may indicate that one of the first or the second data segment include data loss. In some embodiments, such data segments may be recognized by server 110 as distinct data segments. However, in other embodiments, when a difference between the first and the second enumeration is irrelevant, server 110 may determine that the first and the second data segments are equivalent.

To identify that the same content is separately uploaded by different client devices 150, techniques may include identifying data segments that different client devices 150 upload and comparing such data segments. For example, such techniques for identifying a data segment can include the following steps.

In various embodiments, server 110 may receive data related to a first data segment (or several data segments) during a step referred to as a probe step. At such a probe step, client device 153 may supply to server 110 various parameters (herein also referred to as probe parameters) related to the first data segment, such as an arrival time for the first data segment (herein also referred to as a wall clock), a PCR value of the first PCR packet, and a number (or length enumeration) of packets in the first data segment. Upon receiving the probe parameters, server 110 may compare these parameters with probe parameters of various other data segments (herein for brevity referred to as stored probe parameters) that may be already stored in a database associated with server 110, and when the received probe parameters match the stored probe parameters, server 110 may determine that upload of the first data segment may not be required. Alternatively, when the received probe parameters do not match any of the stored probe parameters, server 110 may determine that the first data segment needs to be uploaded.

In various embodiments, probe parameters for a data segment may be any suitable data that can be extracted from the data segment. For example, probe parameters may include a number of bits in the data segment, any suitable header information, a hash digest of the data segment, and the like. In some cases, header information that is not encrypted may be extracted from the data segment. In an example embodiment, the probe parameters may be computed using unencrypted data of the data segment.

Method 1700, as shown in FIG. 17, relates to comparing data segments by server 110. In an example embodiment, probe parameters for data segments may be uploaded, and such probe parameters may be computed. For example, client device 153 may record a first data segment and submit the first probe parameters to server 110, while client device 154 records a second data segment and submits second probe parameters to server 110. In an example embodiment, server 110 may compare the first and the second probe parameters and determine whether the first and the second segments match (i.e., the data segments are equivalent). If the match is determined, server 110 may be configured to upload one of a first or a second data segment to a database associated with server 110. For example, if server 110 uploads the first data segment, it may be configured to allow client devices 153 and 154 to download the first data segment.

In some cases, aspects of method 1700 relate to uploading probe parameters corresponding to data segments from different client devices and verifying that the uploaded probe parameters match. Such a match may be used to indicate that the data segments correspond to a segment of a broadcasting program received by different client devices. In step 1701, client device 153 may upload first probe parameters related to the first data segment to server 110. In step 1703, server 110 may receive second probe parameters related to a second data segment having second data packets, with at least some of the second data packets also including second time reference values. In an example embodiment, the second probe parameters may include a second arrival time, second time reference values, and a second length of the second data segment. For example, such data may be represented by a 3-tuple of {length, PCR value, arrival time}. In an example embodiment, the first probe parameters may be received from a first client device (e.g., client device 153), and the second probe parameters may be received from a second client device (e.g., client device 151)

Figure 18:
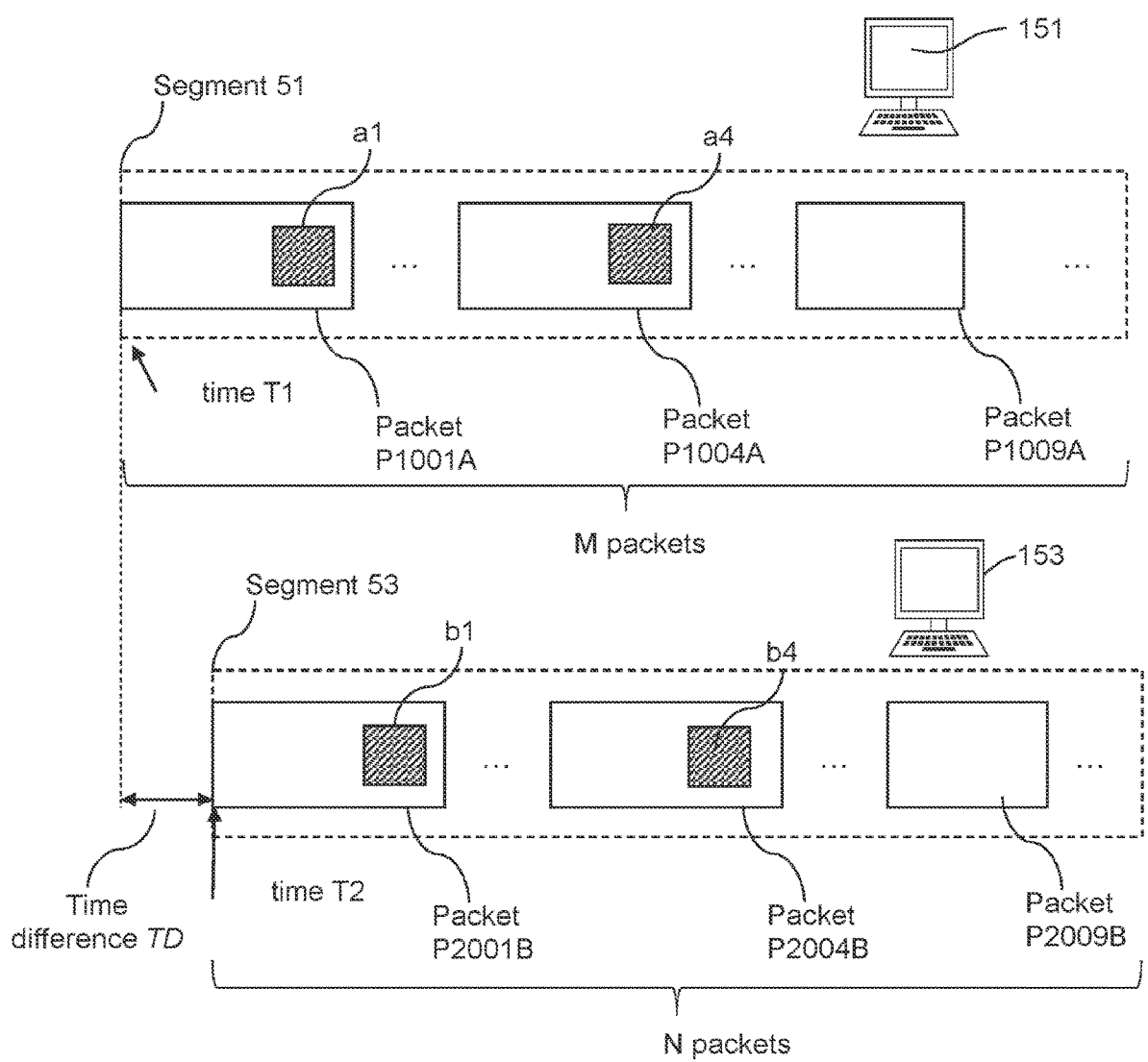
FIG. 18 depicts exemplary data segments having data packets, consistent with disclosed embodiments.

FIG. 18 illustrates exemplary data segments 51 and 53, acquired by client devices (e.g., client devices 151 and 153) and recorded as arriving at times T1 and T2. Data segments 51 and 53 may correspond to the same data received from a broadcast provider (e.g., distributor 140). While these data segments may correspond to the same data, label 51 is used to indicate that data segment 51 is received by a first client device (e.g., client device 151, as shown in FIG. 18) and label 53 is used to indicate that data segment 53 is received by a second client device (e.g., client device 153, as shown in FIG. 18). Times T1 and T2 at which corresponding data segments 51 and 53 are received by corresponding devices 151 and 153 may be different due to differences in reference clocks of client devices 151 and 153. In an example embodiment, as shown in FIG. 18, data segment 51 may start with a PCR packet P1001A, having a first time reference PCR value of a1 and end with a finishing packet P1009A. In an example embodiment, the finishing packet may not be a PCR packet. Segment 51 may include more than one PCR packet (e.g., as shown in FIG. 18, segment 51 includes another PCR packet P1004A with a PCR value of a4). Similar to data segment 51, data segment 53 may start with a PCR packet P2001B having a second time reference PCR value of b1 and end with a finishing packet P2009B. In an example embodiment, the finishing packet may not be a PCR packet. Similar to segment 51, segment 53 may include more than one PCR packet (e.g., as shown in FIG. 18, segment 53 includes another PCR packet P2004B with a PCR value of b4).

In an example embodiment, some of the first data segments may be long enough to carry at least one PCR packet. The PCR value can be a fixed number of bits and wraps every time a bitfield for the bits is overflowed. The PCR values may be used with other parameters of the data packets for uniform segment identification. In the example shown in FIG. 18, data packet P1001A may contain PCR packet a1, and data packet P1004A may contain PCR packet a4.

Returning to FIG. 17, in step 1705, server 110 may compare the first and the second probe parameters to determine whether the first data segment matches the second data segment. In an example embodiment, arrival time T1 may be compared with arrival time T2 to determine whether the first data segment represents the same content as the second data segment. Additionally, or alternatively, a1 value may be compared with b1 value, and/or a4 value may be compared with b4 value. Also, additionally, or alternatively, a first number of packets M (e.g., M packets are shown in FIG. 18) for data segment 51 may be compared with a second number of packets N (e.g., N packets are shown in FIG. 18) for data segment 53 for determining a match between the first and the second data segment. Alternatively, a first length enumeration for data segment 51 may be compared with a second length enumeration for data segment 53. In various embodiments, when discussing the comparison of number of packets, it should be understood that length enumerations (as previously described) may also be (or alternatively) compared.

In step 1707, server 110 may determine whether first probe parameters match the second probe parameters. Establishing the match may include computing a time metric (TM) which may be based on the first recorded time T1 and the second recorded time T2. Further, the time metric may comprise an absolute value of a difference between T1 and T2. The difference of the first arrival time and second arrival time (e.g., TM=|T1−T2|) may be used to find out whether the first segment and the second segment recorded to arrive at a corresponding client (e.g., client 153 for the first segment and client 154 for the second segment) at about the same time. In the example shown in FIG. 18, recorded time T1 and recorded time T2 may have a time difference TD. Time difference TD may indicate that segment 53 arrives at client 154 later by TD seconds than segment 51 that arrives at client 153. In various embodiments, time metric TM may be required to be below a selected target time threshold TT.

In some embodiments, to determine that segment 51 is equivalent to segment 53, time reference values, such as PCR values (e.g., a1 and b1) identified in data packets of the first and the second data segments may be compared, for example, by comparing data bits of a1 and b1 to ensure that a1 and b1 match identically. Similarly, other PCR values (e.g., a4 and b4) may be compared. Further, to compare the number of packets in each data segment, related length enumerations for segments 51 and 53 may be compared to ensure that these length enumerations are identical.

As described above, the time metric can be based on a difference between the first time and the second time. For example, the first data segment may arrive at time T1 (T1 being a wall-clock time), and the second data segment may arrive at time T2. When T1 and T2 do not differ by more than a certain amount of time. e.g., 5 seconds, the first data segment and the second data segment are considered as arriving at the same time (e.g., if time difference TD in FIG. 18 is less than 5 seconds, segment 51 and segment 53 are considered as arriving at the respective client devices 153 and 154 at the same time). For example, if time difference TD is less than target time threshold TT, then segment 51 and segment 53 may be considered to arrive at respective client devices 153 and 154 at the same time. Arriving at the same time is one of the factors for determining that two data segments are equivalent. Therefore, calculation of the difference between the first time and the second time can be performed for subsequent comparison with a predetermined threshold.

The server 110 can further use the length enumeration for a data segment (or number of packets in the data segment) as a part of probe parameters for that data segment. For example, the number of packets in data segment 51, as shown in FIG. 18, may be used to form a segment ID as defined above. In some cases, if a segment ID for segment 51 received from one client device (e.g., device 151) matches the segment ID for segment 53 received from another client device (e.g., device 153) then lengths of data segments 51 and 53 may be the same. In some cases, segment IDs received from different client devices may be different due to a difference in number of packets for segments 51 and 53.

Client devices 151 and 153 provide probe parameters in a form of segment IDs, which may be canonicalized, i.e., converted to a uniform timeline. In an example embodiment, during canonicalization, the arrival time for data segment 51 may be compared to the arrival time for data segment 53, and may be modified (e.g., arrival time value T1 for data segment 51 may be replaced by arrival time value T2 for data segment 53, if difference TD is smaller than a target threshold value). Such canonicalization may be needed to ensure that segment ID for segment 51 is the same as segment ID for data segment 53. Thus, a canonical ID for both data segments 51 and 53 may be the same as a segment ID for data segment 53. After a canonicalization process, server 110 may determine if the upload of data segment 51 or data segment 53 is needed. In various embodiments, the length enumeration of a data segment may be used as a way to detect data loss. For example, when two clients are reporting the same length enumeration, these clients likely have received the same content, and such content is likely not to contain data loss. Clients that obtained data segments with a data loss may obtain a different length enumeration (e.g., a lower value for the length enumeration may be obtained for data segments with a data loss).

Length enumerations (or number of the packets) from different client devices 150 may, for example, need to be the same to indicate the segments that contain those packets, respectively, are the same. In some cases, however. N (number of packets for segment 53, as shown in FIG. 18) and M (number of packets for segment 51) may be slightly different (e.g., if one/a few data packets transmitted to a client device was/were dropped during the transmission). In such cases, if N and M are different, probe parameters for data segments 51 and 53 may be compared with probe parameters of other segments received from other client devices to further determine which probe parameters match probe parameters of other segments. One or more pairs of data segments with matching probe parameters may be determined to accurately represent broadcast data, and one of such data segments may be referred to as a representative data segment. In various embodiments, the segment containing probe parameters that do not match probe parameters of the representative data segment may be considered separately (e.g., uploaded and stored separately for the client device that received such a data segment).

Determining whether the first probe parameters match the second probe parameters (step 1707) may include computing time metric and comparing time reference values, as well as comparing the length enumerations. When the first probe parameters match the second probe parameters (step 1707. Yes) server 110 may determine that there is a match between the first data segment and the second data segment (herein, the match between the first data segment and the second data segments indicates that these segments are equivalent). For example, when such a suitable time metric is below a respective threshold for such a time metric and when other parameters match identically between the first and the second data segment, server 110 may determine that the first data segment is equivalent to the second data segment. In the example shown in FIG. 18, when time difference TD between arrival time T1 of segment 51 and arrival time T2 of segment 53 is less than 5 seconds, a1 matches b1 and M is the same as N, it may be determined that there is a match between segment 51 and segment 53.

In step 1709, server 110 may identify the first data segment as the same as the second data segment if the match is established between the first and the second probe parameters (step 1707. Yes).

If the first probe parameters do not match the second probe parameters (step 1707, No), server 110 may identify in step 1711 that the first data segment is different than the second data segment.

Figure 19:
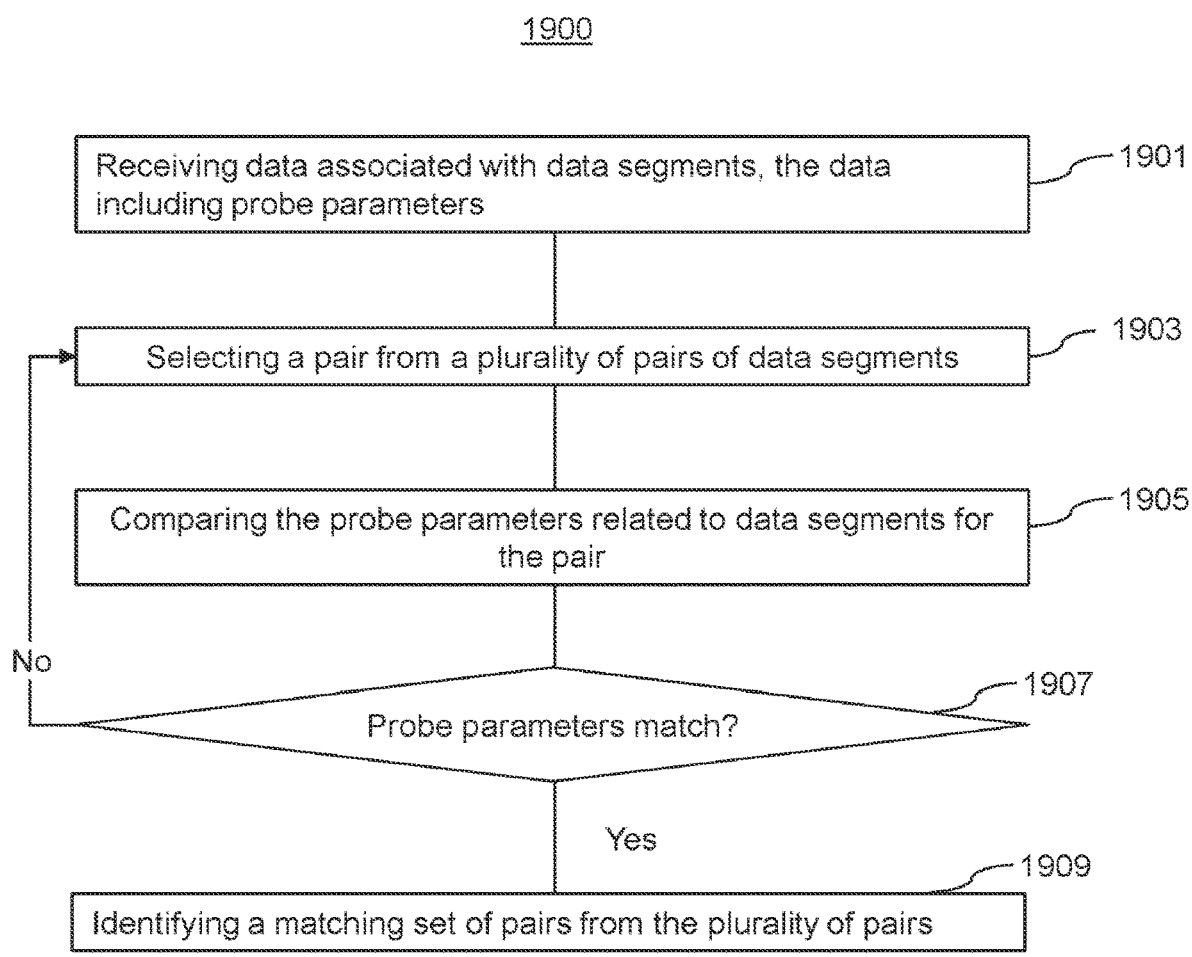
FIG. 19 is an exemplary diagram of a process of identifying matching data segments, consistent with disclosed embodiments.

In some embodiments, there can be more than two client devices 150 that upload contents to server 110. When there are multiple data streams from multiple client devices 150, embodiments of the present disclosure may also provide techniques for comparing data segments. FIG. 19 illustrates a flow chart of an exemplary method 1900 for comparing data segments, consistent with embodiments of the present disclosure. The techniques can be performed by at least one hardware processor of a server (e.g., server processor 230 of remote storage server 110 in FIG. 1). The techniques can include the following exemplary steps.

Figure 20:
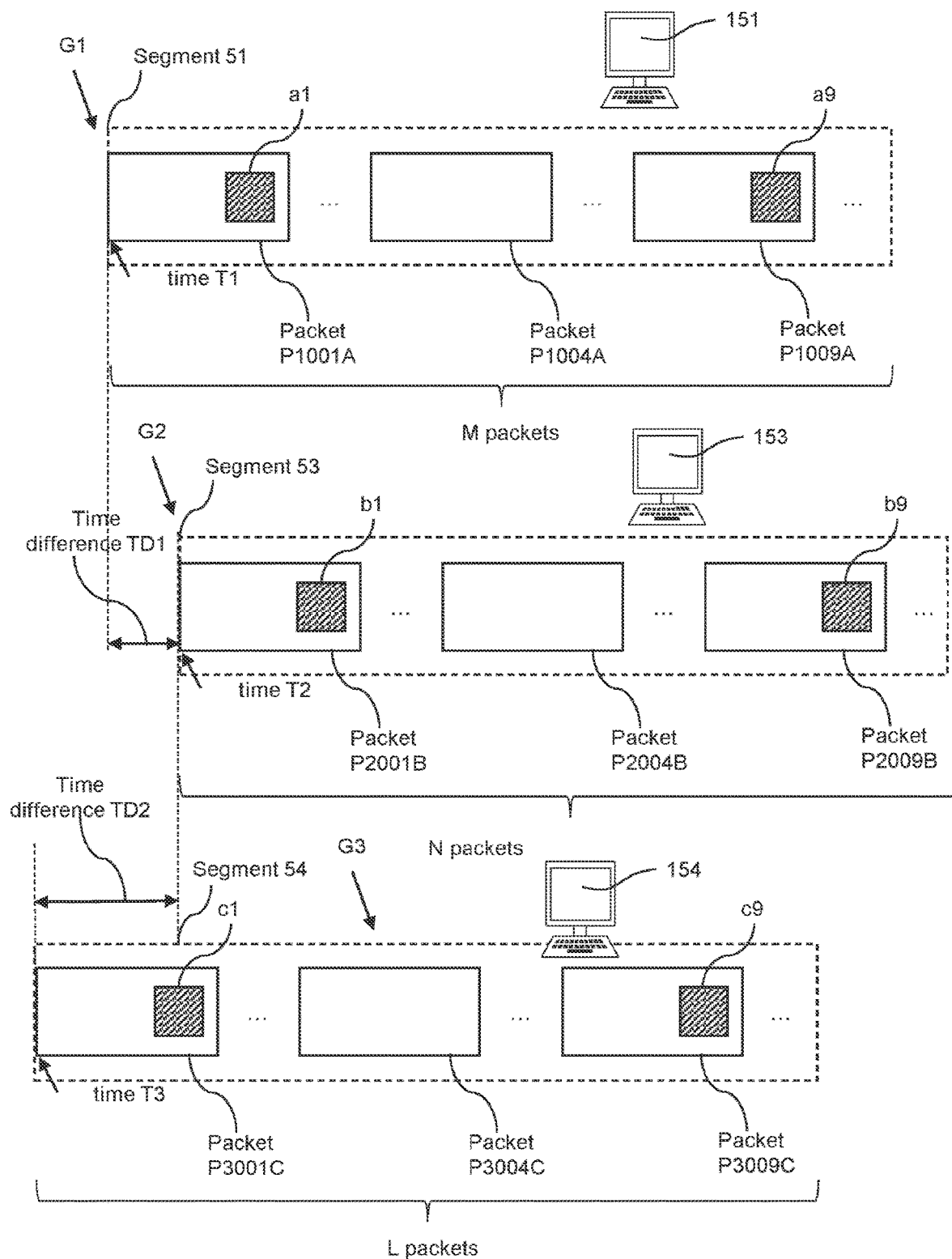
FIG. 20 depicts exemplary data segments having data packets, consistent with disclosed embodiments.

In step 1901, server 110 can receive data associated with groups of data segments from multiple client devices (e.g., client devices 150 in FIG. 1). The data associated with each segment in the group of the data segments includes segment probe parameters as described above. In an example shown in FIG. 20, server 110 may receive probe parameters for segment 51 from client device 151, probe parameters for segment 53 from client device 153, and probe parameters for segment 54 from client device 154. In various embodiments, segments 51, 53, and 54 may be part of groups of segments corresponding to broadcast programs recorded by respective client devices 151, 153, and 154. For instance, segment 51 may be a part of G1 group of segments, segment 53 may be a part of G2 group of segments, and segment 54 may be a part of G3 group of segments as indicated in FIG. 20.

In step 1903, server 110 may compare a pair of data segments where at least one data segment is selected from one of groups G1-G3 and another data segment is selected from another one of groups G1-G3. Server 110 may select, for example, a pair of probe parameters for segments 51 and 53 or a pair of probe parameters for segments 53 and 54. If it is established that segments in a pair of segments (e.g., segments 51 and 53, segments 51 and 54, or segments 53 and 54) are equivalent, a segment ID for one of these segments (e.g., the segment ID for segment 53) may be used as a canonical segment ID. Alternatively, a canonical segment ID may be obtained as a combination of data used in segment IDs for segment 51, 53, and 54. For example, if segment IDs for 51, 53, and 54 are respectively {T1, PCR Enumeration}, {T2, PCR Enumeration}, and {T3, PCR Enumeration}, and T1, T2, and T3 are established to be the same, the canonical segment ID may be, for example, {T2, PCR Enumeration}.

In step 1905, for each pair (the pair having a first segment probe parameters and a second segment probe parameters) of the plurality of pairs of probe parameters, server 110 may compare the first segment probe parameters of a first data segment with the second segment probe parameters of a second data segment as previously discussed. For example, server 110 may compare probe parameters for segments 51 and 53, or compare the probe parameters for segments 53 and 54.

In step 1907, server 110 may determine whether parameters of one data segment match parameters of another data segment, as previously described. For example, when referring to FIG. 20, server 110 may determine that T1 matches T2, or that a1 is the same as b1. Server 110 may determine that M is the same as L. In an example embodiment, server 110 may calculate time difference TD1=(T1−T2) and TD2=(T3−T2), as shown in FIG. 20, and determine whether T1, T2, and T3 correspond to approximately the same time.

In step 1909, if probe parameters match (step 1907, Yes), server 110 may identify the matching data segments obtained by different clients (e.g., the pair of segments 51 and 53 or the pair of segment 53 and 54) from the plurality of pairs.

Alternatively, if probe parameters do not match (step 1907, No), server 110 may proceed to step 1903, and select another pair of probe parameters from the plurality of pairs of probe parameters.

In some embodiments, server 110 may further determine a group of data segments that are all equivalent to each other. For example, server 110 may determine that segments 51, 53, and 54 are equivalent to each other, and such segments may form a group. In some cases, when a group includes more than two data segments for a broadcast program, server 110 may conclude that these data segments accurately represent the broadcast program. In some cases, when several groups of data segments are identified (with each group containing equivalent data segments) but where data segments of one group are not equivalent to data segments of another group, the group with the largest number of the data segments may be determined to accurately represent the broadcast program.

Additional aspects of the disclosure describe systems, methods, and computer readable media for performing a segmentation using the data packets for a data stream (e.g., a transport stream). In various embodiments, the segmentation of the data stream into data segments is achieved by selecting starting and finishing data packets for the data segments. Further, aspects of the present disclosure describe the segmentation of the encrypted data stream (i.e., the data stream that may include encrypted information). For example, if the data stream is video data, the video data may be encrypted for each client device that receives the video data. In example embodiments described in this disclosure, a process of segmentation may not involve decryption of the data stream, communication between various client devices that received the data stream, or modifying data of the data stream. The outcome of the segmentation may be a sequence of data segments. Cut points for the data stream (e.g., points at which the data stream may be cut into segments) may be defined uniformly across all client devices. Each segment may have an appropriate size such that there will not be an inordinate number of segments to process. Also, the size of segments is selected such that a data segment may not be too large to process.

Program clock reference (PCR) data (or PTS, as defined above) corresponding to the system time clock (STC) values contained within at least some of the data packets of the data stream may be used to define the time reference values for performing the segmentation. The cut points may be identified by data packets that contain PCR values (such data packets are referred to as PCR packets), which may be used as starting points of data segments. In an example embodiment, a data segment may end, and a new one may start when the STC values conveyed in the PCR packets have changed by more than the minimum segment duration. As discussed above, the cut points of segments may be defined uniformly across all client devices 150 without communication between the client devices 150. The cut points may not be anchored to the start of the acquisition of the data stream, but to some globally agreed and signaled start point. e.g., an STC value having a set value.

The PCR packets may contain a sample of the system time clock (STC), which may provide a way to uniformly select packets for potential segment boundaries across all client devices. The PCR values are not encrypted in PCR packets. For example, while PCR packets may contain encrypted data (e.g., video data), additional (also referred to as adaptation) data within PCR packets (e.g., PCR values) are not encrypted. PCR values may be incorporated as metadata (e.g., headers) of PCR packets. Therefore, the segmentation can be carried out without decrypting the payload.

The PCR packets may be one example of reference points for segmentation that may not require decryption. However, depending on a type of data stream and information contained in the data stream, there may be other data that can be used to determine reference points. For example, broadcast data may be configured to include explicit reference points for the segmentation and partitioning data stream into data segments. Alternatively, at least some of the data segments of a broadcast may include segment identifications that may be used for the segmentation. In some cases, broadcast data may include particular data segments (e.g., data segments of different lengths, having different headers, and the like), which may be used for the segmentation. In some cases, a pattern identified within data segments may be used for segmentation (e.g., the pattern may include, for example, segments with first metadata following segments with second metadata, where metadata may be any type of data included in the data segment, that is not encrypted). In some cases, a mere presence of metadata within the data segment may indicate a reference data segment that may be used for the segmentation of the data stream.

In various embodiments, a segmentation of a data stream recorded by a client device (e.g., client device 153) may be performed by one or more program applications installed on client device 153 or on hardware associated with client device 153 (e.g., receiving box 141). In various embodiments, when the segmentation application identifies all the data packets containing PCRs, as signaled by PCR values (e.g., the PCR values may be included in MPEG-2 TS headers or any other suitable data headers), the segmentation application may extract the PCR values and determine which PCR packets may be used for segmentation cut points. The segmentation may be performed in a uniform manner across a disparate client base, as each client device may have started to acquire a data stream at a different time and might have different reception packet loss.

A nominal segment period may be selected to be similar to target segment durations in HTTP live streaming (HLS) or other adaptive bitrate (ABR) systems such as dynamic adaptive streaming over HTTP (DASH) system. All data segments for the received stream of data may have a duration of time of about a nominal segment period. The segmentation application may sub-divide the overall time domain corresponding to the entirety of the received stream of data (herein referred to as STC time domain) into time subdomains of the nominal segment period durations. An example data segment starting point may be defined to be the first PCR packet that is found in each time subdomain. Consequently, after one data segment ends, another segment may start. For example, if a data segment $D_1$ corresponding to a time subdomain $T_1$ ends, a data segment $D_2$ corresponding to a time subdomain $T_2$ may start. In various embodiments, a first data packet of $D_2$ of a data segment may be the first PCR packet that is found in the $T_2$ time subdomain.

The nominal segment duration may be chosen as a power of two multiple of a selected number b divided by a frequency of a system time clock associated with a decoder for the compressed video data (herein referred to as STC clock frequency). Such an approach may be an efficient way of determining the nominal segment duration. In some cases, this operation may be preferential to a division operation that may consume more computer resources. Hence segment boundaries may occur when any but the bottom b bits of an STC time value conveyed by a PCR value obtained from a PCR packet change, where the choice of b may define the nominal segment duration.

Figure 21:
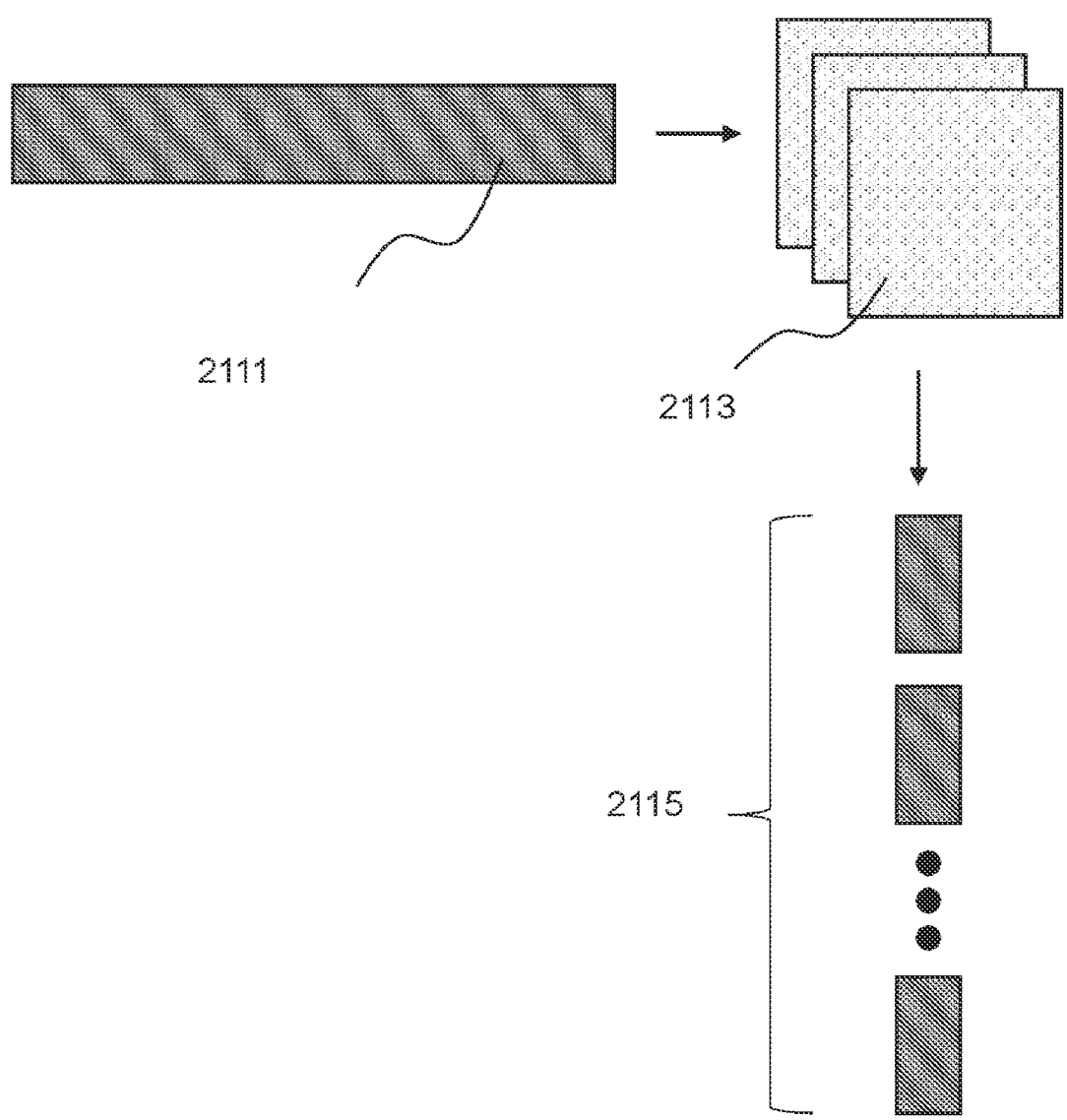
FIG. 21 is an exemplary diagram of a process of partitioning the data stream into data segments, consistent with disclosed embodiments.
Figure 22:
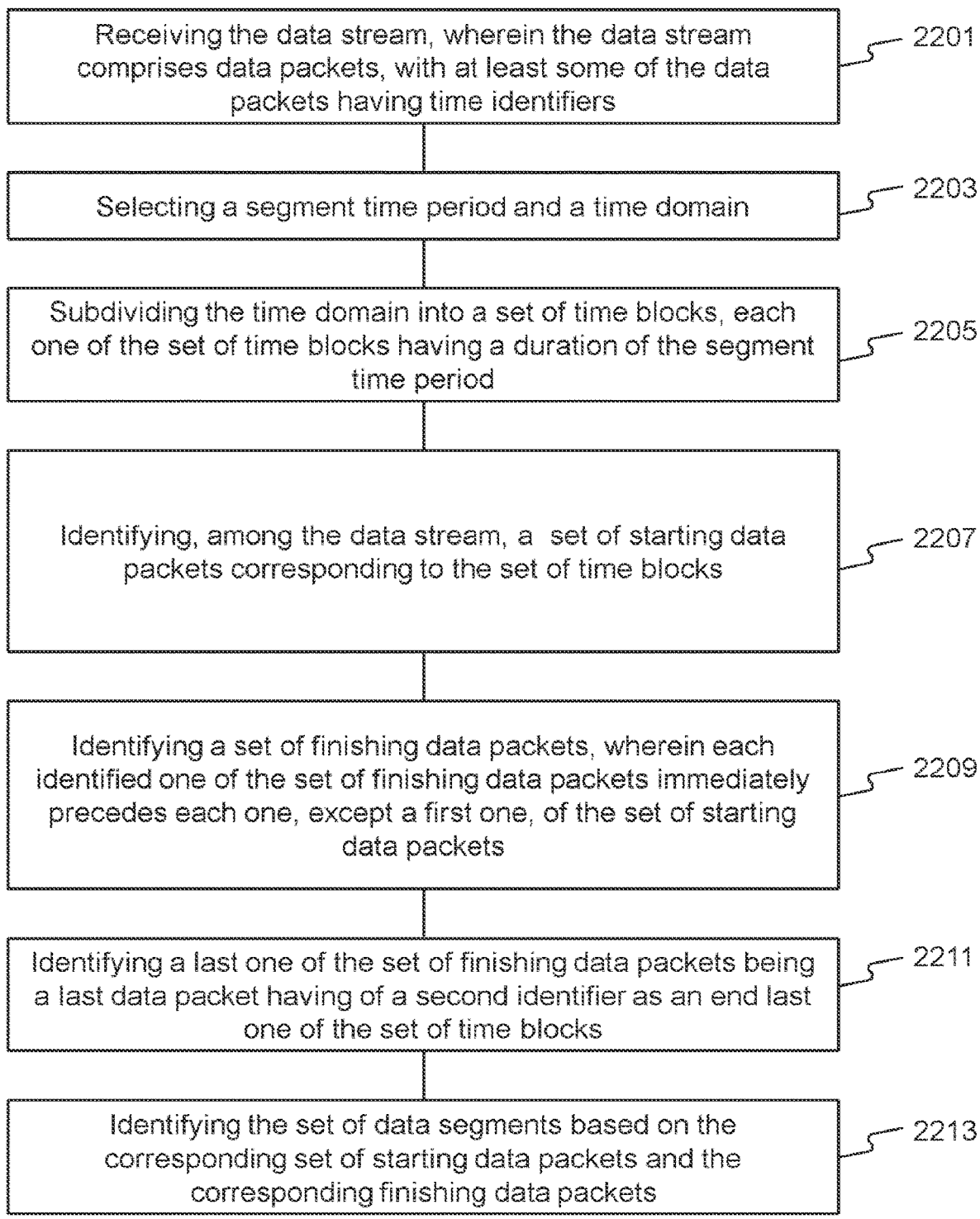
FIG. 22 is an exemplary diagram of a process of identifying data segments, consistent with disclosed embodiments.

FIG. 21 illustrates an exemplary process 2100 for splitting data stream 2111 into a set of data segments 2115, consistent with embodiments of the present disclosure. Process 2100 may be carried out in conjunction with method 2200, as described in connection with FIG. 22 below. The method 2200 may be performed by segmentation application 2113 using one or more hardware processors and software applications. The method 2200 may contain the following exemplary steps.

In step 2201 of process 2200, data stream 2111 of FIG. 21 may be received by segmentation application 2113. Data stream 2111 may include data packets with at least some of the data packets having time identifiers, such as PCR values as described above. Segmentation application 2113 may determine which data packets (e.g., MPEG-2 packets) may be used for determining the cut points for carrying out the segmentation. The time identifiers contained in the data packets may be used to select the data packets for segmentation. In one example, the time identifier can be a PCR packet. ISO13818-1 ITU-T H.222.0, for example, defines how transport streams are constructed using PCR values. An STC time domain, as described above, may be sampled and conveyed using the PCR values. At least some of the data packets may have PCR packets.

Figure 23:
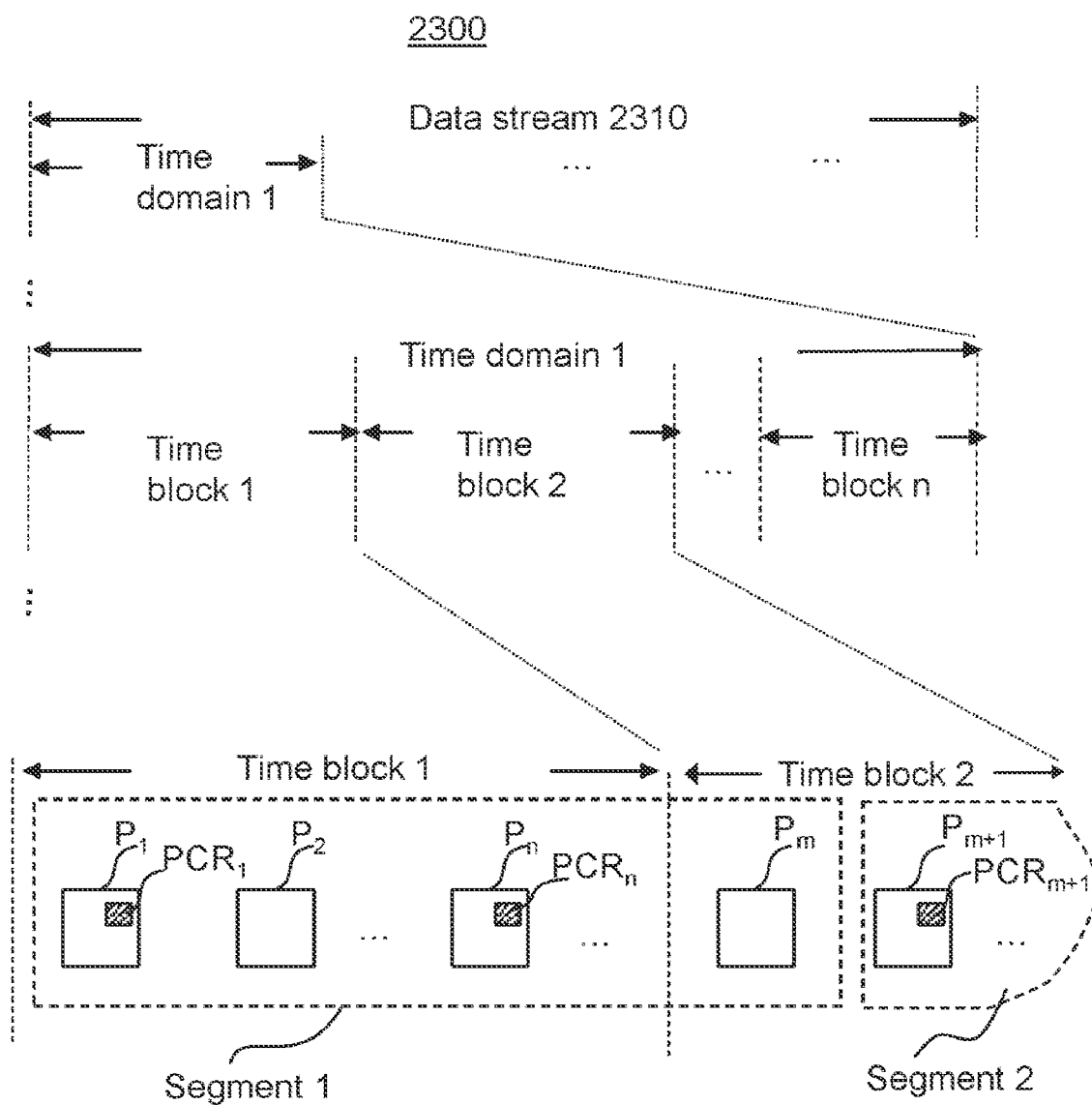
FIG. 23 depicts an exemplary diagram of a process of partitioning a data stream into data segments, consistent with disclosed embodiments.

In step 2203, segmentation application 2113 may select a segment time period and a time domain, which may be, for example, a subdomain of the STC time domain. As shown in an exemplary chart 2300 of FIG. 23, data stream 2310 (which may be the same as data stream 2111, as shown in FIG. 21) received by segmentation application 2113 may contain multiple data packets (e.g., $P_1-P_{m+1}$). Time domain 1 is referred to as a stream time domain, as shown in FIG. 23. It should be noted that for the same broadcast program (e.g., program 1601, received by client device 153 and client device 154, as shown in FIG. 16), stream time domains corresponding to each device may be different. For example, if client device 153 received a data segment of program 1601 with a system time clock (STC) value that precedes an STC value of a data segment received by the client device 154, the time domain for client device 153 may start with an earlier STC value. Similarly, if client device 153 stops receiving program 1601 with a data segment (i.e., the finishing data segment) with an STC value that is larger than an STC value of a finishing data segment of client device 154, the time domain for client device 153 may end with a later STC value.

In some embodiments, the segment stream time period may be in a range of one to a few tens of seconds. The segment time period may be determined by a number, such that the segment time period is being substantially an exponentiation of two in the power of the number divided by a frequency of a clock. In some cases, data stream 2111 may comprise compressed video data. The clock may be a system time clock associated with a decoder for the compressed video data. For example, a system time clock (STC) may run at 90 kHz (i.e., 90,000 clock ticks per second); thus, STC may update every clock tick, which is about 11 microseconds. The segment time period may be set as $2^b \times 1/90$ kHz.

In an example, the segment time period may be chosen as 5.8 seconds, which is about $2^{19} \times 1/90$ kHz (b equals 19).

In some embodiments, time identifiers may be used to identify time within a time domain of data stream 2111 received by a client device 150. The time identifiers may be based on time values obtained from the system time clock (STC). For example, video data can be broadcast program 1601, as shown in FIG. 16, and a recording starting time corresponding to a time at which device 153 started recording broadcast program 1601 may have a specific numerical time value (e.g., time $T_s$). When comparing to a start time of broadcast program 1601 (e.g., $T_b$), recording starting time $T_s$ may be later than the broadcast start time $T_b$. Further, a local recording time may be computed as a time duration from the recording starting time. Similarly, recording finishing time $T_f$ may be defined as a time at which client device 153 finished recording broadcast program 1601.

Even when client device 154's starting recording time and finishing recording time may be different from a corresponding starting recording time, and a finishing recording time of client device 153, at times when their recordings overlap, contents of their recordings may be compared. In some cases, when clocks of client devices 153 and 154 are not synchronized, starting recording times and finishing recording times for the devices may be different as well. For such cases, in an example embodiment, starting recording and finishing recording time determined by at least one client device may be adjusted to account for the asynchronization between the devices.

In step 2205, segmentation application 2113 may subdivide the stream time domain into a set of time blocks, each one of the sets of time blocks having a duration of the segment time period (also referred to as a nominal segment period or a nominal segment duration). As shown in FIG. 23, time domain 1 may be divided into time blocks 1-$n$. Each time block (e.g., time block 1) may have a duration of the segment time period. In the example, the segment time period may be $2^{19} \times 1/90$ kHz, which is about 5.8 seconds. Therefore, time block 1 may have a duration of 5.8 seconds.

In step 2207, segmentation application 2113 may identify a set of starting data packets corresponding to the set of time blocks. Each one of the set of starting data packets may comprise a first data packet having a time identifier in a corresponding each one of the sets of time blocks. As shown in FIG. 23, within time block 1, there may be packets that do not contain PCR values (e.g., packet $P_2$) and packets that contain PCR values. Segmentation application 2113 may identify data packets, shown in FIG. 23, by $P_1$, $P_n$ as containing PCR values $PCR_1$ and $PCR_n$, respectively. In an example embodiment, $PCR_i$ may be represented by numbers $x_i \cdot 2^b + y_i$, and PCR values for a given data segment (e.g., $PCR_1-PCR_m$ for segment 1, as shown in FIG. 23) may have the same value for $x_i$ while having different values for $y_i$. In some cases, PCR packets may be evenly spaced among all of the data packets forming data stream 2111.

As shown in FIG. 23, data segments are configured to start with a PCR data packet. For example, data segment 1 starts with $P_1$ PCR packet, and data segment 2 starts with $P_{m+1}$ PCR packet having $PCR_{m+1}$ value. In various embodiments, a first PCR packet within a time block may be determined to be the starting packet for a data segment. The first PCR packet may have a different value in the most significant bits from the previous PCR packet. For example, as shown in FIG. 23, $P_1$ is the first PCR packet of time block 1, and $P_{m+1}$ is the first PCR packet of time block 2. These packets are starting packets of data segments 1 and 2, respectively. In various embodiments, a data packet preceding a first PCR packet of a time block may be the last data packet of a data segment. In an example embodiment, PCR value may comprise 33 bits.

In step 2209, segmentation application 2113 may identify a set of finishing data packets corresponding to the set of starting data packets. Each one of the sets of finishing data packets may immediately precede each one, except a first one, of the set of starting data packets. As shown in FIG. 23, segmentation application 2113 may identify finishing data. For example, data packet $P_m$ is the data packet directly preceding the first PCR packet $P_{m+1}$ of time block 2 and may be the last data packet of data segment 1. In step 2211, segmentation application 2113 may identify a last one of the set of finishing data packets being the last data packet of a last one of the set of time blocks, corresponding to a last recorded data packet. In step 2213, segmentation application 2113 may identify the set of data segments based on the corresponding set of starting data packets and the corresponding finishing data packets. An example data segment includes a starting data packet, a finishing data packet, and all recorded data packets of data stream 2111, as shown in FIG. 21, located between the starting data packet and the finishing data packet. In some cases, some of the broadcast data packets may be missed resulting in a length of the data segment (or the bit enumeration of length enumeration) being different from a corresponding data segment recorded by another client device.

In some embodiments, the data stream (e.g., data stream 2310, as shown in FIG. 23) may comprise a transport stream of the data packets communicated via a broadcast. The transport stream may be cut into transport stream packets. A transport stream packet may comprise a header and a payload containing a portion of an elementary stream carrying data such as video and audio. PCR values may be written to a system layer as part of an extension to the header in an adaptation field. The PCR values may provide an STC sample for the system layer packets while the elementary stream may be encrypted.

In some embodiments, segmentation application 2113 may determine a probability of a data packet being missed from a data segment during the communication of data stream 2111. Segmentation application 2113 may select the segment time period (e.g., $2^b \times 1/90$ kHz) such that a probability of the data packet being missed from the data segment is less than a target probability value. For example, a number b can be selected as 19, such that the segment time period is about 5.8 seconds.

In some embodiments, segmentation application 2113 may determine an overhead cost associated with a processing of a data segment and select the segment time period such that the overhead cost is less than a target overhead value. For example, an overhead cost for processing data segments may be related to comparing data segments received from different client devices 150 to establish that data segments are related to the same broadcast program. In some cases, data segments may be compared by comparing probe parameters of the data segments, as previously described.

Depending on the segment time period, the number of data segments representing data stream 2111 may vary. For example, if the segment time period is small, a large number of data segments may be used to represent data stream 2111, and if the segment time period is large, a smaller number of data segments may be used. Since each data segment may require processing costs, having a smaller number of data segments may be preferred, at least from the standpoint of reducing processing costs. However, having data segments with a large segment time period (herein referred to as large data segments) may result in such large data segments incorporating transmission errors. Since data segments with transmission errors may be separately stored on server 110, having large data segments with transmission errors may result in storing a large amount of bit data that otherwise would not have been stored if the data segments were smaller.

In some embodiments, for a time segment period, segmentation application 2113 may determine a probability of a data packet being missed from a data segment having the segment time period, determine an overhead cost associated with the processing of the data segment, and based on a cost function associated with the probability and the overhead cost, segmentation application 2113 may determine a target time segment period that minimizes the cost function.

In various embodiments, determining an optimal segment time period or segment length unit may be based on ensuring that most data segments do not include transmission errors and that there are not too many data segments. For example, if a data stream is segmented in only a few large data segments using large segment time periods (or large segment length units), such large data segments may include transmission errors and may be separately uploaded and stored in a database associated with server 110. Thus, data segments with transmission errors may need to be separately stored, which may lead to an associated cost (herein referred to as "large segment costs") of storing such data segments. Alternatively, if the data stream is segmented into small data segments using small segment time periods (or small segment length units), most of such small data segments may not include transmission errors. However, a large number of such small data segments may lead to a large cost (herein referred to as "small segment costs") associated with processing these small segments. For example, if a challenge (as described herein) is provided for each small data segment, communications between client device 153 and server 110 may substantially increase due to a large number of such segments leading to communication-related costs. Further computing a proof for each challenge may also increase the computational costs due to a large number of segments. Further, the cost may also be associated with storing multiple proofs for data segments on a client device or a device associated with the client device such as, for example, receiving box 141, as shown in FIG. 1.

Thus, determining the optimal segment time period (or the segment length unit) may require finding a balance between the large segment costs and the small segment costs. In an example embodiment, the large segment costs may depend on a probability of having a transmission error within a portion of the data stream or, in other words, an expected frequency of transmission errors within the data stream. For example, if a frequency of transmission errors is large, smaller data segments may be preferred, and if the frequency of transmission errors is small, large data segments may be preferred to minimize the overall cost associated with the large segment costs and the small segment costs. In an example embodiment, the probability of transmission errors may be identified to further determine the size of data segments. For example, a probability of a data packet being missed from a data segment during the communication of the data stream may be determined. In various embodiments, determining a size of the segment based on the segment time period (or the segment length unit) may include selecting the size such that the probability of the data packet being missed from the data segment is less than a target probability value. Additionally, or alternatively, a small segment cost (herein also referred to as an overhead cost) associated with a processing of a data segment may be determined, and the size of the data segment may be selected to minimize the overall cost related to the combination of the large segment costs and the small segment costs. The small segment cost may be related to the cost of transmitting information (e.g., a challenge and a proof) for each data segment from client device 153 to server 110 and/or computing the challenge and the proof for each data segment. Other small segment costs associated with a large number of small segments may include collecting probe parameters for each one of small segments, digitally signing each one of the small segments, and the like. In an example embodiment, a cost function describing the overall cost associated with the large segment costs and the small segment costs may be introduced, and the size of the data segment may be selected to minimize the cost function.

In some cases, the duration of a segment may be determined based on a likelihood of data loss for a given region. For example, if weather conditions may likely result in high data loss (e.g., heavy rain, thunderstorm, dust storm, and the like), system 100, as shown in FIG. 1, may update an algorithm for partitioning data into data segments. For example, server 110 may be configured to communicate with client devices 150 to update the algorithm for partitioning received data from broadcast provider 140 into data segments. In some cases, the algorithm may be updated based on a predicted data loss (e.g., the predicted data loss may be based on predicted weather conditions). Additionally, or alternatively, the algorithm may be updated by analyzing a data loss based on information obtained from offload requests (e.g., offload request may indicate a data loss for data segments, when probe parameters for data segments indicate that data segments have varying lengths). For example, if data loss is observed, the segmentation algorithm may be updated such that shorter data segments may be formed.

Figure 24:
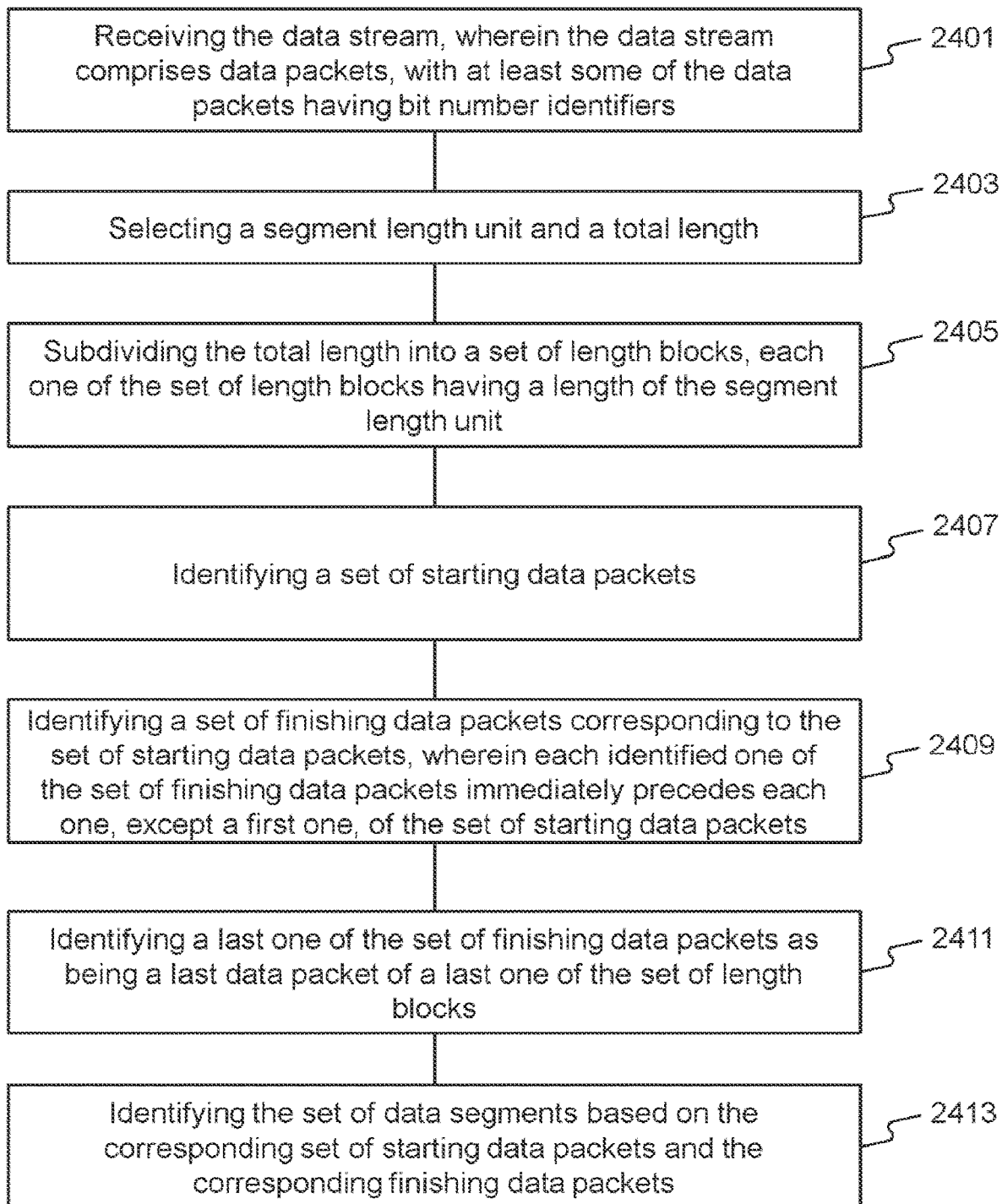
FIG. 24 is an exemplary diagram of a process of identifying data segments, consistent with disclosed embodiments.

As described above, the data packets may be identified by any suitable identifiers (e.g., PCR values), and the data packets in data stream 2111 may be grouped into data segments 2115. FIG. 24 illustrates an exemplary method 2400 for splitting data stream 2111 into a set of data segments, consistent with embodiments of the present disclosure. The method 2400 can be performed by, for example, segmentation application 2113 using at least one hardware processor.

Figure 25:
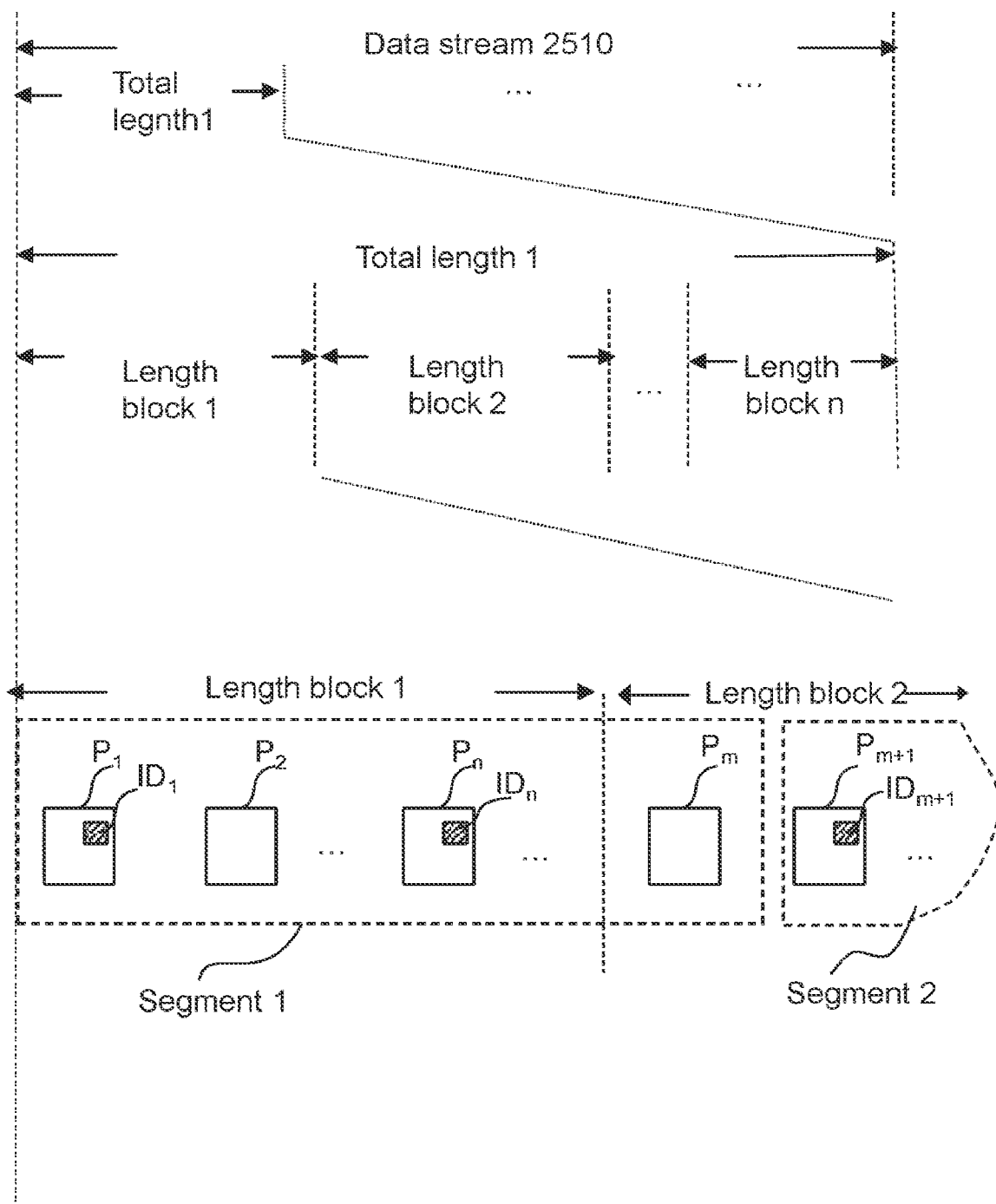
FIG. 25 depicts another exemplary diagram of a process of partitioning a data stream into data segments, consistent with disclosed embodiments.

In step 2401, segmentation application 2113 may receive data stream 2111. The data stream (e.g., data stream 2510, as shown in FIG. 25 or data stream 2111, as shown in FIG. 21) may comprise data packets of a fixed length, with at least some of the data packets having bit number identifiers (herein also referred to as data packet identifiers). For example, one identifier may utilize a few bits in a header field.

In step 2403, segmentation application 2113 may select a segment length unit, as shown in FIG. 25. In some examples, the segment length unit may be preset, may be configurable by a user, or may be automatically adjusted or calibrated during the use of the disclosed techniques.

In some embodiments, the segment length unit may be determined by a number, such that the segment length unit is being substantially an exponentiation of two in the power of the number. For example, the segment length unit may be $2^n$.

In step 2405, segmentation application 2113 may subdivide the total length into a set of length blocks, each one of the sets of length blocks having a length of the segment length unit. For example, the segment length unit may be a length of L; each length block may have a length of multiple L. Segmentation application 2113 may subdivide total length 1 in FIG. 25 into length block 1–n. Length block 1 is used as an example to illustrate how a segment of data packets may be determined.

In step 2407, segmentation application 2113 may identify a set of starting data packets (e.g., $P_1$, $P_n$, and $P_{m+1}$, as shown in FIG. 25) with corresponding data packet identifier (e.g., $ID_1$, $ID_n$, and $ID_{m+1}$). The data packets that do not have data packet identifiers (e.g., $P_2$, and $P_m$) may not be used to start a data segment. In step 2409, segmentation application 2113 may identify a set of finishing data packets (e.g., $P_m$) corresponding to the set of starting data packets. Similar to the previous discussion, a finishing data packet of a first data segment may immediately precede a starting data packet of a second data segment that immediately follows the first data segment. In step 2411, segmentation application 2113 may identify a last finishing data packet that may be the last data packet of the last data segment. In step 2413, segmentation application 2113 may identify the set of data segments based on the corresponding set of starting data packets and the corresponding finishing data packets. For example, data segment 1 may be based on starting packet $P_1$ and finishing packet $P_m$. In some embodiments, a data segment may include a starting data packet, a finishing data packet, and all the data packets of data stream 2111 located between the starting data packet and the finishing data packet.

Additional aspects of this disclosure relate to methods, systems, devices, and computer readable media for selectively encrypting or decrypting encrypted data. In the context of electronic computing technology, the information contained in data may exist in the form of binary data, or '0's and '1's, and each of the 0 and 1 values may be a 'bit.' A portion of encrypted data may refer to bits, bytes, or other magnitudes in the encrypted data that are less than the total number bits, bytes, etc., of the data. Data may be encrypted or unencrypted. Unencrypted data may contain bits, bytes, etc., that exist in forms that allow information to be readily accessible or readable by any party.

Encrypted data may refer to information that has been encoded, enciphered, scrambled, or otherwise modified into forms not readily readable by parties who are not authorized to read the encrypted data. In some embodiments, the encrypted data may contain media information, such as video, audio, or image data, that may be encrypted. Data may be encrypted using a variety of different algorithms. For example, asymmetric key pairs (e.g., generated using algorithms such as RSA, Transport Layer Security (TLS), S/MIME, PGP, GPG, or various other algorithms) may be used to perform the encryption and decryption of data. Further, symmetric keys (e.g., generated using algorithms such as Twofish, DES, Blowfish, AES, Serpent, etc.) may be used in some embodiments.

A hardware processor may refer to one or more circuits or electronic components capable of carrying out the processing of information. Examples of a hardware processor may include field-programmable gate arrays (FPGAs), central processing units (CPUs), graphic processing units (GPUs), and/or other types of microprocessors, integrated circuit (IC) chips, or logic gate arrays. Such hardware processors may be implemented in computing devices such as personal computers, servers, switches, laptops, consumer electronic equipment, such as TVs, set-top-boxes, as well as portable computing devices (e.g., smartphones, tablets, etc.) and various types of IoT devices (e.g., autonomous vehicles, network-connected televisions, smart home appliances, sensor devices, robotic devices, etc.), consistent with above embodiments.

In some embodiments, a portion of encrypted data may refer to bits contained in specific segments of the encrypted data. For example, the encrypted data may be a stream of encrypted bits representing video, audio, or some other media file, and a segment of this data stream may be the portion of the encrypted data. In some instances, a party may be interested in accessing only a specific segment of encrypted video or audio, and thus require decryption of only that specific segment. If the video or audio is decrypted, system resources may be wasted in decrypting unnecessary bits. As an exemplary illustration, the encrypted data may be media data broadcasted to or from a personal video recorder (PVR) (also known as DVR) system. For example, media data may be delivered via a broadcast medium (e.g., satellite) to PVR devices in homes or other locations, where the media data are stored in recorded form on discs or other memory storage and may be protected with a cipher key that is personal to each household or device.

An encrypted block may refer to a group of bits that are encrypted. During an encryption process, each block of bits may be encrypted separately (e.g., using data stream counter mode of encryption). In some embodiments, the encrypted blocks may be of the same size. For example, each encrypted block may contain the same number of bits.

A counter may refer to a number (e.g., a nominal number) that can be incremented to produce a non-repeating sequence for an extended period. In some cases, the counter may be randomly accessed, thus computing an nth counter or an (n+m)th counter and may be performed by accessing a corresponding memory address location. An example of the counter may include an increment-by-one counter, according to which the sequence is increased by one with each step or count. In some embodiments, there may be a counter that corresponds to an encrypted counter, and a plurality of counters may correspond to a plurality of encrypted counters, respectively. For example, a first counter may correspond to a first encrypted counter, a second counter may correspond to a second encrypted counter, and so on. In some embodiments, the counters may cause variations in the encrypted counters, so that each encrypted counter varies from other encrypted counters.

An encrypted counter may refer to an algorithm, function, string, code, or other information for encrypting bits of a data stream in units of blocks. In some embodiments, an encrypted counter may have a specific size (i.e., operating on a fixed number of bits). In some embodiments, two or more encrypted counters may be of the same size. The encrypted counters may operate on a stream of unencrypted bits, in turn creating blocks of encrypted bits, i.e., encrypted blocks. In some embodiments, the encryption process of the encrypted counters may be determined by a cipher key. In some embodiments, the encrypted counters may encrypt (or decrypt) data bits in a data stream cipher counter mode (herein referred to as a counter mode). In a counter mode, the stream of plaintext (i.e., unencrypted bits) may be encrypted by encrypted counters that are different from each other while using the same cipher key. These differences between the encrypted counters may be introduced by the counters.

A cipher key, or simply "key," may refer to a piece of information that determines outputs of encryption or decryption processes. For example, a cipher key may determine how unencrypted input information can be transformed into encrypted output information, and vice versa. In some embodiments, the cipher key may be a local key. The local key may be associated with a party or a device with authorization to access the encrypted data. In some embodiments, the cipher key may be locally available to the at least one hardware processor (e.g., stored on the same machine, stored in the same memory device, stored in the same memory area, etc.).

Figure 26:
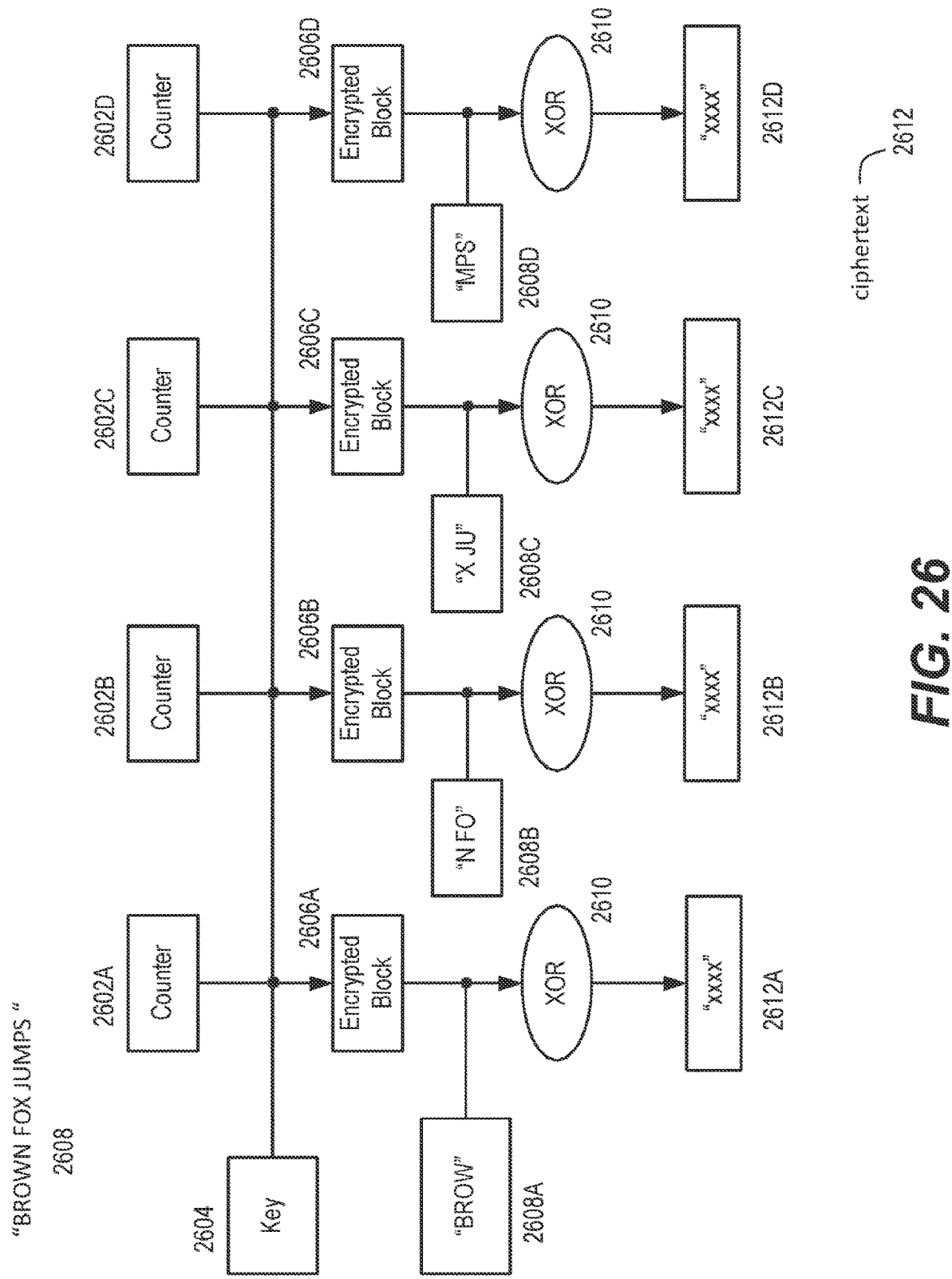
FIG. 26 depicts a schematic diagram of an exemplary encryption process of a counter mode, consistent with disclosed embodiments.

By way of example, FIG. 26 illustrates a counter mode encryption process, consistent with disclosed embodiments. Counters 2602A-D may be examples of counters, key 2604 may be an example of the cipher key, and encrypted counters 2606A-D may be examples of encrypted counters. In the illustrated example, key 2604 and counters 2602A-D together may determine the algorithm(s) of encrypted counters 2606A-D. In some instances, counters 2602A-D may cause variations between each of encrypted counters 2606A-D. Plaintext 2608 may be an example of an unencrypted data stream. In the context of counter mode encryption, unencrypted data may be referred to as "plaintext." In the example of FIG. 26, plaintext 2608 is depicted as "BROWN FOX JUMPS." A person of ordinary skill in the art will appreciate that the example of plain text is simplified for illustrative purposes.

In the example depicted in FIG. 26, encrypted counters 2606A-D are depicted to operate on sections of plaintext 2608, and each encrypted counter operates with a size of four characters. Thus encrypted counter 2606A operates on block 2608A by applying exclusive-or XOR 2610, encrypted counter 2606B operates on block 2608B by applying XOR 2610, encrypted counter 2606C operates on block 2608C by applying XOR 2610, and encrypted counter 2606D operates on block 2608D by applying XOR 2610. These operations produce encrypted blocks 2612A-D, which may together form a data stream referred to as ciphertext 2612. "Ciphertext" may refer to data that has been encrypted. Thus, in the example depicted in FIG. 26, encrypted counters 2606A-D transform, "BROWN FOX JUMPS" into a ciphertext. In some embodiments, ciphertext 2612 may be an example of the encrypted data.

According to some embodiments, the method includes identifying a first encrypted data bit and a last encrypted data bit associated with a portion of encrypted data.

The first encrypted data bit may refer to the first data bit of the portion of the encrypted data selected for decryption. Since a receiving party may be interested in any portion of the encrypted data, any bit may be the first encrypted data bit, and the length of the portion of the encrypted data may be arbitrary. The last encrypted data bit may refer to the last data bit of the portion of the encrypted data selected for decryption.

According to some embodiments, the method further includes identifying a first encrypted counter, including the first encrypted data bit, and a first counter associated with the first encrypted block. The first encrypted block may refer to the encrypted block that contains the first encrypted data bit. The first encrypted block may be aligned to the start of a data stream. In an example embodiment, the first encrypted bit may not be the first bit of one of the encrypted blocks of the data stream. In some embodiments, when the encrypted data is encrypted in a counter mode, different bits in the encrypted data may be encrypted using different encrypted counters and grouped together with other bits encrypted with the same encrypted counter in blocks. Thus, it may be necessary to identify the specific encrypted block in order to decrypt the encrypted bits. The first counter may refer to the counter associated with the first encrypted counter and the first encrypted block. In some embodiments, identifying the first encrypted block includes determining a first bit number associated with the first encrypted data bit. The first bit number may be a location of the first encrypted data bit in the overall encrypted data stream. For example, if the portion of the encrypted data selected for decryption begins on the $5000^{th}$ bit of the encrypted data, the first bit number is 5000.

In some embodiments, the identification of the first encrypted counter includes determining a first block number, based on the first bit number and a block length, wherein the first block number corresponds to the first encrypted block. In some embodiments, a block number may be an integer. In some embodiments, a block length may refer to the number of bits contained in the encrypted blocks. For example, if an encrypted counter operates on a block of data having, for example, 128 bits, the block length of the encrypted block is 128. In another embodiment, another number of bits may be used. In some embodiments, the block length may be related to the length of the cipher key. For example, the length of the cipher key may be the block length.

In some embodiments, the first block number may be determined based on the first bit number and the block length. For example, when the block length of the encrypted blocks are equal, the first block number may be obtained by finding, for example, the ceiling integer (i.e., the same or next greater integer) of a division of the first bit number by the block length depending on the remainder of the division. For instance, if the first bit number is 5000, and the block length is 128, the ceiling integer of 5000 divided by 128 is 40, 5120 divided by 128 is 40, and 5121 divided by 128 is 41. The first block number may correspond to the first encrypted block and the rust counter.

According to some embodiments, techniques further include identifying a last encrypted block, including the last encrypted data bit, and the last counter associated with the last encrypted block. In some embodiments, the techniques include determining a last bit number associated with the last encrypted data bit. The last bit number may be a location of the last encrypted data bit in the overall encrypted data stream. For example, if the portion of the encrypted data selected for decryption ends on the $6000^{th}$ bit of the encrypted data, the last bit number is 6000.

In some embodiments, the last block number may be determined based on the last bit number and the block length. The last block number may refer to the identity associated with the last encrypted block. In some embodiments, the block number may be an integer. When the block lengths of the encrypted blocks are equal to each other, the last block number may be obtained by finding the ceiling integer of a division of the last bit number by the block length. For instance, if the last bit number is 6000, and the block length is 128, the ceiling integer of 6000 divided by 128 is 47. The last block number corresponds to the last encrypted block and the last counter.

According to some embodiments, the techniques further include identifying a set of encrypted blocks. This set of encrypted blocks includes the first and the last encrypted blocks. The set of encrypted blocks may be the encrypted blocks in between the first encrypted block and the last encrypted block. For example, if the first encrypted block is the $40^{th}$ encrypted block, and the last encrypted block is the $47^{th}$ encrypted block, the set of encrypted blocks would be all encrypted blocks from the $40^{th}$ to the $47^{th}$.

According to some embodiments, the techniques further include identifying a set of counters corresponding to the set of encrypted counters, the set of counters, including the first and the last counters. The set of counters may be the counters in between the first counter and the last counter. For example, if the first counter is the $40^{th}$ counter, and the last counter is the $47^{th}$ counter, the set of counters would be all counters from the $40^{th}$ to the $47^{th}$. In some embodiments, the set of counters are encrypted using the cipher key, resulting in a set of encrypted counters. The set of encrypted counters may be used with decryption algorithms for respectively decrypting the set of encrypted blocks, based on the cipher key and the corresponding set of counters.

According to some embodiments, the techniques further include decrypting each of the set of encrypted blocks using a corresponding counter from the set of counters and a cipher key. In some embodiments, the techniques include executing an XOR operation between encrypted data bits located within the set of encrypted blocks and the set of encrypted counters corresponding to the encrypted blocks. The encrypted data bits may be bits of the portion of the encrypted data selected for decryption. An XOR operation may refer to "exclusive OR", which is a Boolean operation. In some embodiments, the encrypted data is encrypted using a counter mode.

In some embodiments, encrypting using each of the set of counters 2602A-D may include selecting data bits between and including the first data bit and the last data bit. Since the data is in units of blocks, some of the bits in the first and last blocks may be outside of the portion of the data selected for encryption. i.e., some bits may be prior to the first data bit or after the last data bit that require encryption. In some embodiments, the bits outside the first data bit and the last data bit may not be selected for encryption. In some embodiments, encrypting each of the set of counters 2602A-D may include selecting counter bits corresponding to the data bits that require encryption. Similarly, only the portion of the set of counters may be necessary to encrypt a portion of the data bits. In some embodiments, encrypting each of the data bits requiring encryption includes executing an XOR operation between the encrypted counter bits and the corresponding data bits.

Figure 27:
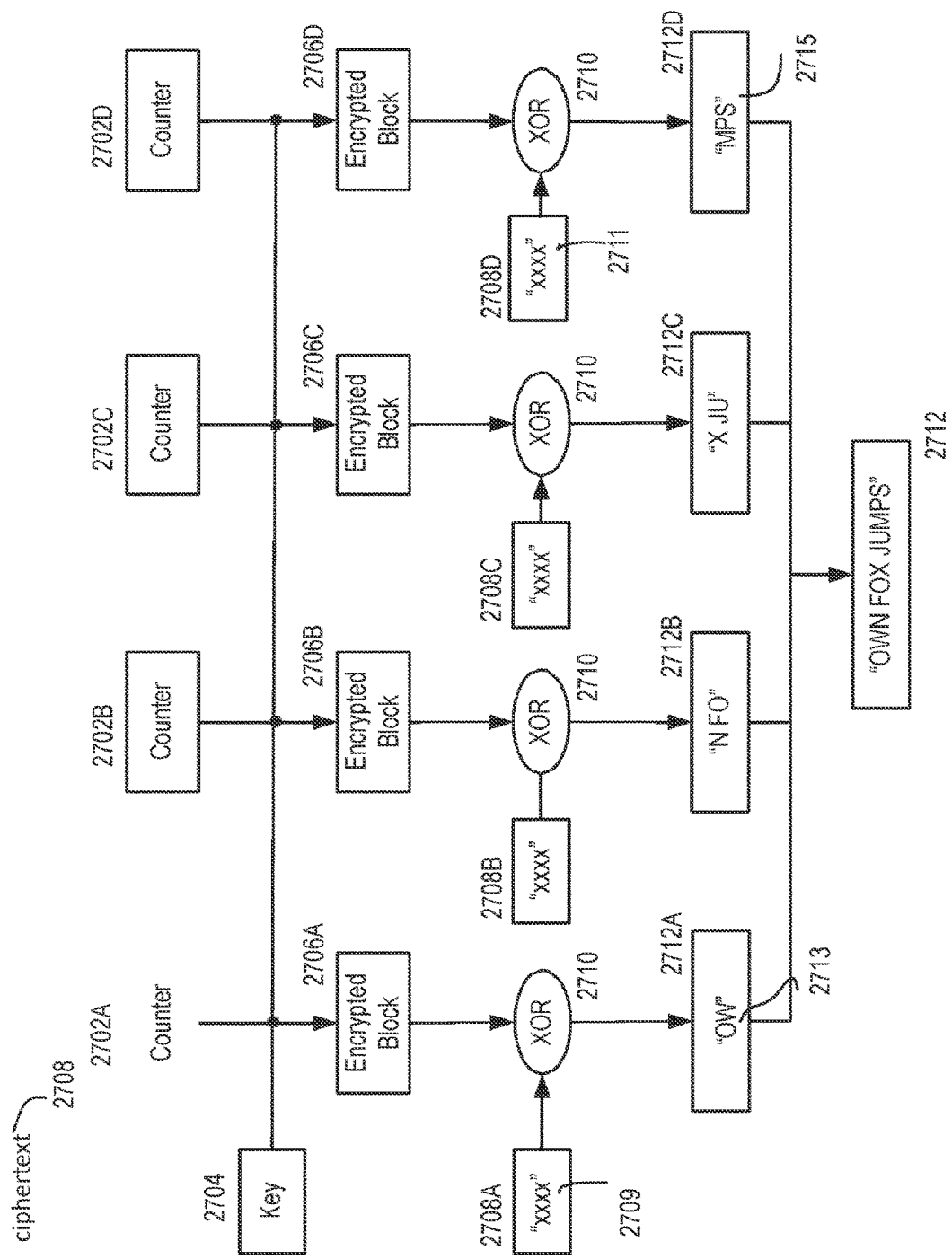
FIG. 27 depicts a schematic diagram of an exemplary decryption process of a counter mode, consistent with disclosed embodiments.

By way of example, FIG. 27 depicts an exemplary decryption process consistent with disclosed embodiments. FIG. 27 depicts the decryption of a select portion of encrypted data. In some embodiments, the encrypted data may have been encrypted using a process exemplified in FIG. 26, or another encryption process. Counters 2702A-D may be examples of the set of counters, key 2704 may be an example of the cipher key, and encrypted counters 2706A-D may be examples of the set of encrypted counters. In an example embodiment, counters 2702A-D may be the same as 2602A-D, as shown in FIG. 26, key 2704 may be the same as key 2604, and encrypted counters 2706A-D may be the same as 2606A-D. Counter 2702A may be an example of the first counter, and counter 2702D may be an example of the last counter. Encrypted counter 2706A may be an example of a first encrypted counter, and encrypted counter 2706D may be an example of a last encrypted counter. 2708A-D may be examples of sets of encrypted blocks, with 2708A being an example of the first encrypted block containing the first encrypted data bit and optionally some stuffing bits, and 2708D being an example of the last encrypted block, containing the last encrypted data bit and optionally some stuffing bits.

In the illustrated example, key 2704 and counters 2702A-D together may determine the decryption algorithm of encrypted counters 2706A-D. In some instances, counters 2702A-D introduce variations between each of the encrypted counters 2706A-D. Ciphertext 2708 may be an example of the encrypted data bits to be decrypted. In the example of FIG. 27, ciphertext 2708 appears as random characters prior to decryption. A person of ordinary skill in the art will appreciate that the example of ciphertext is simplified for illustrative purposes.

In some embodiments, decrypting using each of the set of encrypted counters 2706A-D may include selecting encrypted data bits between and including the first encrypted data bit and the last encrypted data bit. Since the encrypted data are decrypted in units of blocks, some of the bits in the first and last encrypted blocks may be outside of the portion of the encrypted data selected for decryption, i.e., some bits may be prior to the first encrypted data bit or after the last encrypted data bit. In some embodiments, the bits outside the first encrypted data bit and the last encrypted data bit may not be selected for decryption. In some embodiments, decrypting each of the set of encrypted counters 2706A-D may include selecting encrypted counter bits corresponding to the encrypted data bits. Similarly, only the portion of the set of encrypted counters may be necessary to decrypt a portion of the encrypted data bits. In some embodiments, an XOR operation may be executed between the encrypted data blocks 2708A-D and the encrypted counters bits 2706A-D to result in decrypted data blocks 2712A-D forming plaintext data 2712.

In the example of FIG. 27, a receiving party may be interested in a select portion of ciphertext 2708, the select portion being the bits beginning with bit 2709 and ending with bit 2711. Bit 2709 may be an example of the first encrypted data bit, and bit 2711 may be an example of the last encrypted data bit. In the example, bit 2709 is the $3^{rd}$ bit of the portion of ciphertext 2708, hence having a first ciphertext bit number of 3 (i.e., this bit number is local to the portion of ciphertext 2708, and bit 2711 is the $14^{th}$ bit of the portion of ciphertext 2708, hence having a last bit number of 14. In the example, any bits before bit 2709 and after bit 2711 need not be selected for decryption. Bit 2713 represents the first decrypted data bit, and bit 2715 represents the last decrypted data bit.

As depicted in FIG. 27, encrypted counters 2706A-D are depicted to operate on portions of ciphertext 2708, which are grouped in encrypted blocks 2708A-D. Each of the encrypted counters 2706A-D is depicted as having a size of four characters. In some embodiments, since only the last two characters of the first encrypted block require decryption, only two characters of the encrypted counter 2706A are used with encrypted block 2708A by combining the two characters with corresponding characters of encrypted block 2708A using an XOR 2710. Encrypted counter 2706B operates on encrypted block 2708B by applying XOR 2710 (i.e., characters of counter 2706B are combined with characters of encrypted block 2708B using XOR 2710). Encrypted counter 2706C operates on encrypted block 2708C by applying XOR 2710. In some embodiments, since only three characters of the last encrypted block 2706D require decryption, only three characters of encrypted counter 2706D operate on encrypted block 2708D by applying XOR 2710. The portion of decrypted data selected by the receiving party appears as "OWN FOX JUMPS" in plaintext 2712 after decryption.

Figure 28:
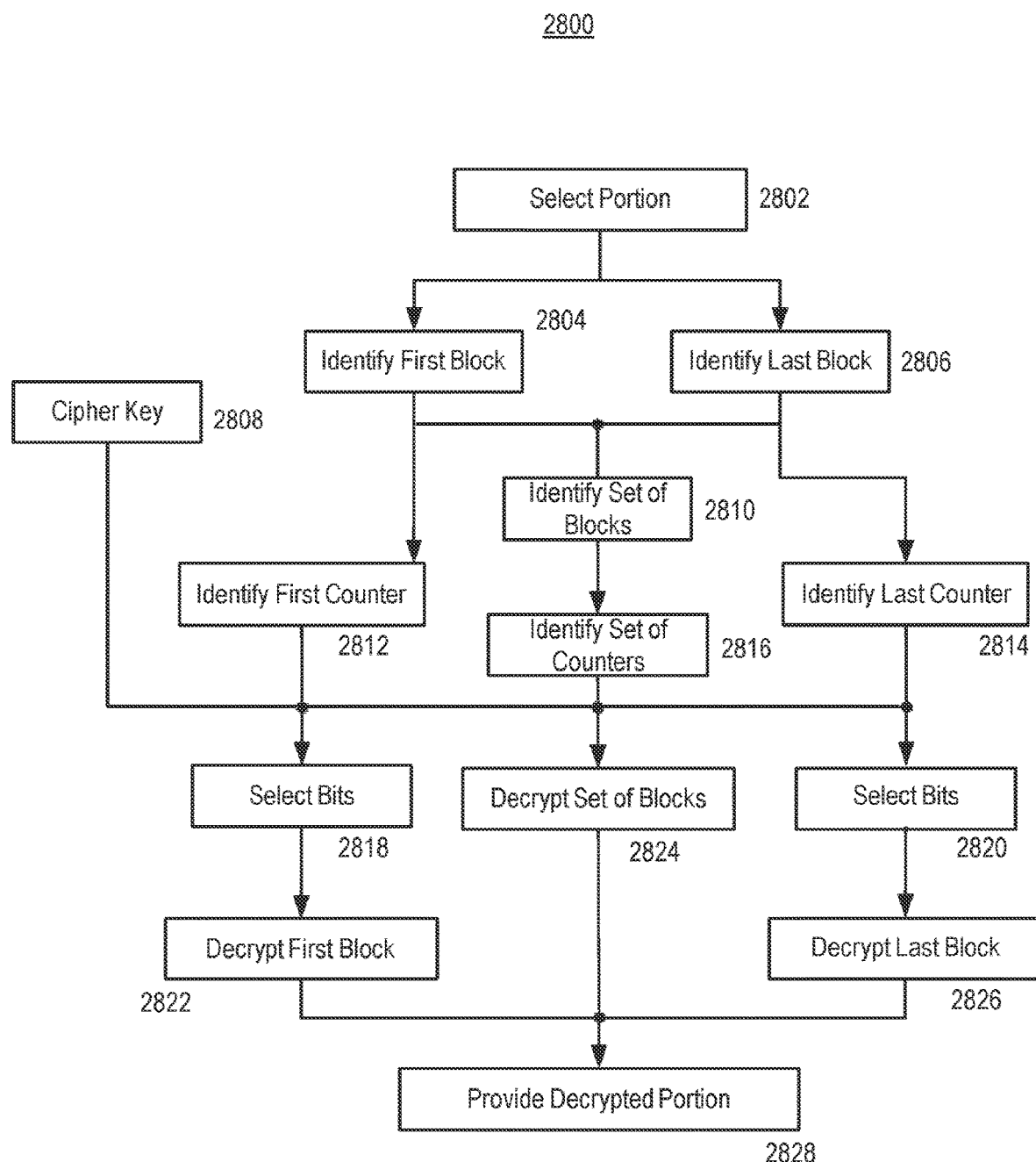
FIG. 28 depicts a flow chart of an exemplary process for selective decrypting of a portion of encrypted data, consistent with disclosed embodiments.

FIG. 28 depicts a flow chart of an exemplary process 2800 for decrypting a select portion of encrypted data, consistent with disclosed embodiments.

In step 2802, process 2800 determines a select portion of encrypted data. The selected portion may be the portion of an encrypted data stream that the receiving party has an interest in decryption. The selected portion may have a first encrypted data bit marking the beginning of the selected portion, and a last encrypted data bit marking the end of the selected portion. The first encrypted data bit and the last encrypted data bit may be associated with a first bit number and a last bit number, respectively. The first bit number may be a location of the first encrypted data bit in the overall encrypted data stream, and the last bit number may be a location of the last encrypted data bit in the overall encrypted data stream.

In step 2804, process 2800 identifies a first encrypted block. The encrypted data may exist in forms of blocks having a block length, as discussed above, and the first encrypted block may be the block containing the first encrypted data bits. In some embodiments, the first encrypted block may be identified by a first block number. The first block number may be a ceiling integer of a division of the first bit number by the block length.

In step 2806, process 2800 identifies a last encrypted block. The last encrypted block may be the encrypted block containing the last encrypted data bits. The last encrypted block may be identified by a last block number. In some embodiments, the last block number may be obtained by adding, to the first block number, an integer representing the number of encrypted blocks between the first encrypted block and the last encrypted block. In some embodiments, the last block number may be a ceiling integer of a division of the last block number by the block length.

In step 2808, process 2800 receives a cipher key. In some embodiments, the cipher key may be a locally available key (e.g., content key 232, as shown in FIG. 2A) stored in a common computing device, common memory unit, common memory space, etc.), and may be retrieved by the hardware processor at any time as needed.

In step 2810, process 2800 identifies sets of encrypted blocks. The sets of encrypted blocks may be the encrypted blocks in between the first encrypted block and the last encrypted block. In some embodiments, the sets of encrypted blocks may include the first encrypted block and the last encrypted block.

In step 2812, process 2800 identifies a first counter. The first counter may be the counter corresponding to the first encrypted block. In step 2814, process 2800 identifies a last counter. The last counter may be the counter corresponding to the last encrypted block. In step 2816, process 2800 identifies a set of counters, the set of counters corresponding to the set of encrypted blocks.

In step 2818, process 2800 identifies bits within the first encrypted blocks for decryption. In some embodiments, the first encrypted block may contain bits that are not selected for decryption. For example, encrypted bits prior to the first encrypted bit are not selected for decryption.

In step 2820, process 2800 identifies bits within the last encrypted blocks for decryption. In some embodiments, the last encrypted block may contain bits that are not selected for decryption. For example, encrypted bits after the last encrypted bit may not be selected for decryption.

In step 2822, process 2800 decrypts the first encrypted block. In some embodiments, a first encrypted counter may be generated based on the cipher key and the first counter. An XOR operation may be applied to the selected bits of the first encrypted block and the first encrypted counter to decrypt the first encrypted block. In step 2824, a set of encrypted counters may be generated based on the cipher key and the set of counters, and XOR operations may be applied to bits of the set of encrypted blocks and the corresponding encrypted counters to decrypt the sets of encrypted blocks. In step 2826, a last encrypted counter may be generated based on the cipher key and the last counter. An XOR operation may be applied to the selected bits of the last encrypted block and the last encrypted counter to decrypt the last encrypted block.

In step 2828, process 2800 presents the decrypted bits in a decrypted data stream.

Aspects of this disclosure may further relate to methods, systems, devices, and computer readable media for selectively encrypting a portion of data. For example, a portion of data may refer to bits in data that are unencrypted. In some instances, a party may be interested in protecting information in only a portion of a data stream, and thus require encryption of only that portion. If the whole of the data stream is encrypted, system resources may be wasted in encrypting unnecessary bits.

According to some embodiments, techniques include identifying a first data bit and a last data bit associated with a portion of the data. The first data bit may refer to the first bit of a portion of the data for encryption. Since a sending party may be interested in protecting any portion of the data, any bit of the data may be the first data bit, and the length of the portion of the data for encryption may be arbitrary. The last data bit may be the last bit of data selected for encryption.

According to some embodiments, the techniques include identifying a first block and a first counter, including the first data bit. The first block may refer to the block that contains the first data bit. In some embodiments, in a counter mode, different bits in a data stream may be encrypted using different encrypted counters, so bits are grouped together with other bits in blocks. The rust counter may refer to the counter associated with the first encrypted counter and first block.

In some embodiments, identifying the first block includes determining a first bit number associated with the first data bit. A first bit number may be a location of the first data bit in the overall data stream. For example, if the selected portion of data begins on the 5000th bit of the data stream, the first bit number is 5000. In some embodiments, identifying the first encrypted counter includes determining a first block number, based on the first bit number and a block length, wherein the first block number corresponds to the first encrypted block. The first block number may be determined based on the first bit number and the block length. For example, when the block length of the encrypted blocks are equal, the first block number may be obtained by finding the ceiling integer of a division of the first bit number by the block length. For instance, if the first bit number is 5000, and the block length is 128, the ceiling integer of 5000 may be divided by 128 to provide a ceiling of 40. The first block number corresponds to the first block and the first counter.

According to some embodiments, the techniques further include identifying a last block and a last counter, including the last data bit. The last block may refer to the block that contains the last data bit. The last counter may refer to the counter associated with the last counter and last block. In some embodiments, identifying the last block includes determining the last bit number associated with the last data bit. The last bit number may be a location of the last encrypted data bit. In some embodiments, identifying the last block includes determining a last block number, the determining being based on the last bit number and a block length, wherein the last block number corresponds to the last encrypted block. The last block number may be determined based on the last bit number and the block length. In some embodiments, the last block number may be an integer. For instance, if the last bit number is 6000, and the block length 128, the ceiling integer of 6000 may be divided by 128 to provide a ceiling of 47. In some embodiments, the last block number may be obtained by adding, to the first block number, an integer representing the number of blocks between the first block and the last block.

According to some embodiments, the techniques further include identifying a set of blocks, including the first and the last blocks. The set of blocks may be the blocks in between the first block and the last block. For example, if the first block is the $40^{th}$ block, and the last block is the $47^{th}$ block, the set of encrypted blocks would be all blocks from the $40^{th}$ to the $47^{th}$.

According to some embodiments, the techniques further include identifying a set of counters corresponding to the set of blocks, the set of counters, including the first and the last counters. The set of counters may be the counters in between the first counter and the last counter. For example, if the first counter is the $40^{th}$ counter, and the last counter is the $47^{th}$ counter, the set of counters would be all counters from the $40^{th}$ to the $47^{th}$. In some embodiments, the set of counters are encrypted using the cipher key, resulting in a set of encrypted counters.

According to some embodiments, the techniques further include encrypting data in each of the set of blocks using a corresponding counter from the set of counters and a cipher key. In some embodiments, encrypting data in each of the set of blocks includes executing an XOR operation between data bits corresponding to the set of blocks and the set of encrypted counters, each one of the sets of encrypted counters corresponding to each one of the sets of blocks. The data bits may be part of the selected portion of the data. The XOR operation may refer to "exclusive OR", which is a Boolean operation. In some embodiments, the cipher key may be a content key 232 local to a client device.

Figure 29:
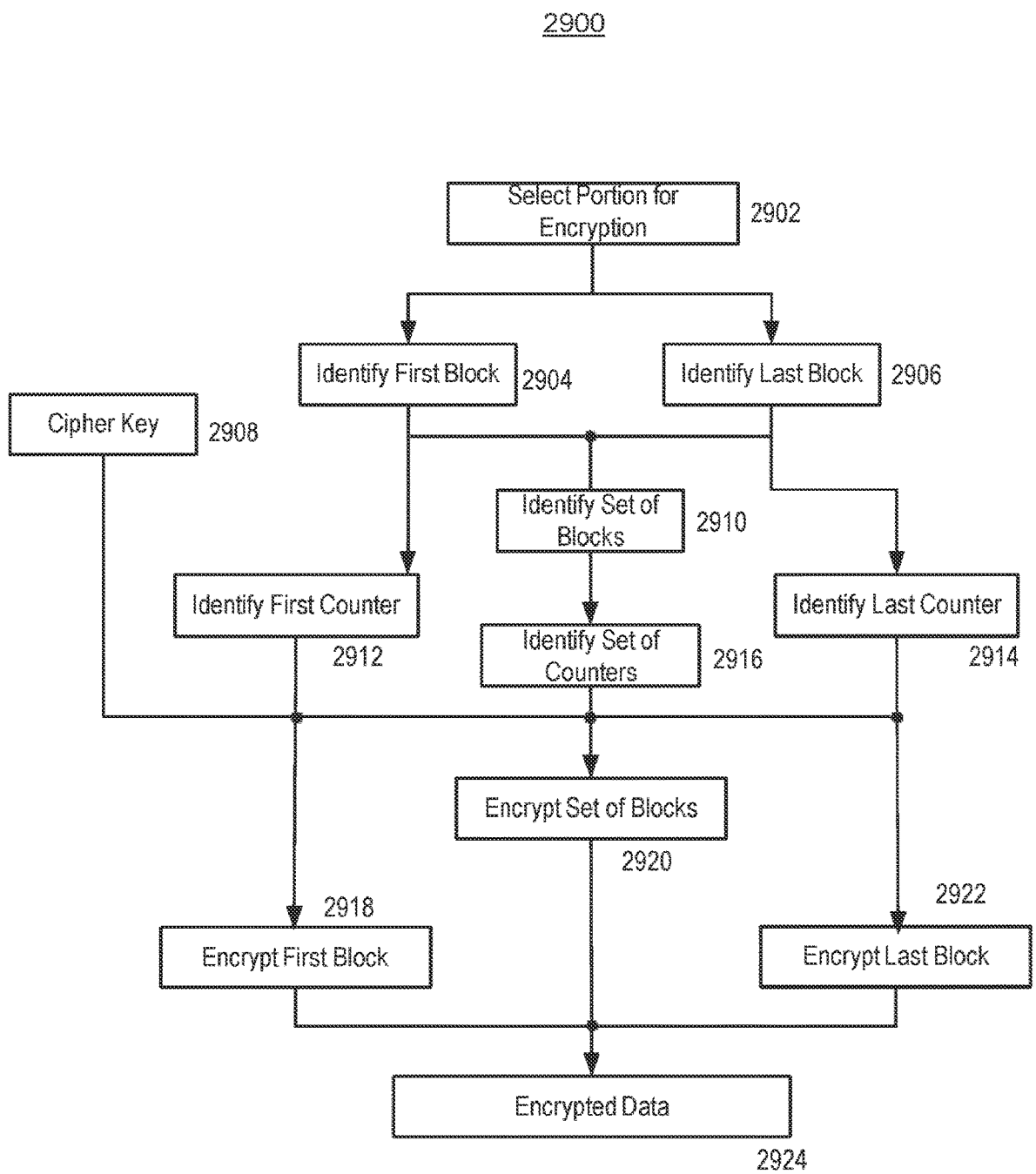
FIG. 29 depicts a flow chart of an exemplary process for selective encrypting of a portion of data, consistent with disclosed embodiments.

By way of example FIG. 29 depicts a flow chart of an exemplary process 2900 for encrypting select portions of unencrypted data, consistent with disclosed embodiments.

In step 2902, process 2900 determines a select portion of data for encryption. The selected portion may be a portion of a data stream that a sending party has an interest in encrypting. The selected portion may have a first data bit marking the beginning of the portion, and a last data bit marking the end of the portion. The first data bit and the last data bit may be associated with a first bit number and a last bit number, respectively. The first bit number may be a location of the first data bit in the overall data stream, and the last bit number may be a location of the last data bit in the overall encrypted data stream.

In step 2904, process 2900 identifies a first block. In counter mode encryption, the data may be segmented into blocks each having a block length, and the first block may be the block containing the first data bits. In some embodiments, the first block may be identified by a first block number. The first block number may be a ceiling integer of a division of the first bit number by the block length.

In step 2906, process 2900 identifies a last block. The last block may be the block containing the last data bits. The last block may be identified by a last block number. In some embodiments, the last block number may be obtained by adding, to the first block number, an integer representing the number of blocks between the first block and the end of the last block (i.e., including the last block). In some embodiments, the last block number may be a ceiling integer of a division of the last block number by the block length.

In step 2908, process 2900 receives a cipher key. In some embodiments, the cipher key may be a locally available key and may be retrieved by the hardware processor at any time as needed.

In step 2910, process 2900 identifies a set of blocks. The sets of blocks may be the blocks in between the first block and the last blocks. In some embodiments, the set of blocks includes the first and the last blocks.

In step 2912, process 2900 identifies a first counter. The first counter may be the counter corresponding to the first block. In Step 2914, process 2900 identifies a last counter. The last counter may be the counter corresponding to the last block. In step 2916, process 2900 identifies a set of counters, the set of counters corresponding to the set of blocks.

In step 2918, process 2900 encrypts at least some bits of a first block starting at a first bit data that needs to be encrypted. Thus, at least a portion of a first block is encrypted. In some embodiments, a first encrypted counter may be generated based on the cipher key and the first counter. An XOR operation may be applied to bits of the first block and the first encrypted counter to encrypt the first block that requires encryption. In step 2920, a set of encrypted counters may be generated based on the cipher key and the set of counters, and XOR operations may be applied to bits of the set of blocks and the corresponding encrypted counters. In step 2922, a last encrypted counter may be generated based on the cipher key and the last counter. An XOR operation may be applied to at least some bits of the last block and the last encrypted counter. The bits of the last block that need to be encrypted may include a first bit of the last block, a last bit of data that needs to be encrypted, and all the bits that require encryption and are located between the first bit of the last block and the last bit. In various embodiments, the last bit of data that needs to be encrypted may not be a last bit of the last block. In step 2924, process 2900 presents the encrypted data for transmission.

Another example of a process of selectively decrypting encrypted data may include identifying a first encrypted data bit and a last encrypted data bit associated with a portion of encrypted data, and identifying a first encrypted block including the first encrypted data bit, and a first counter associated with the first encrypted block. The process may include identifying a last encrypted block including the last encrypted data bit, and a last counter associated with the last encrypted block, as well as identifying a set of encrypted blocks, the set of encrypted blocks including the first encrypted block, the last encrypted block, and a set of all encrypted blocks located between the first and the last encrypted block. In an example embodiment, the process may also include identifying a set of counters corresponding to the set of encrypted blocks, the set of counters including the first counter, the last counter, and a plurality of counters located between the first and the last counter, wherein a bitwise length of each one of the plurality of counters is the same as a bitwise length of each one of the set of encrypted blocks. The process may include selecting a plurality of encrypted data bits between and including the first encrypted data bit and the last encrypted data bit. For each encrypted data bit from the plurality of encrypted data bits, the process may include determining a corresponding encrypted block and a block number that contains the encrypted data bit, and determining a corresponding counter for the determined block number. Further, for each encrypted data bit, the process may include determining a bit position of the encrypted data bit within the determined encrypted block, and selecting and encrypting a counter corresponding the encrypted block. Additionally, for each encrypted data bit, the process may include executing an XOR operation between the encrypted data bit and the corresponding bit of the encrypted counter.

Additional embodiments relate to techniques for selectively encrypting a portion of data. For example, the data may be subdivided into a set of blocks, as discussed above, each block having a corresponding block number. In some cases, to form a counter an initialization vector may be used. For instance, a counter may be formed by combining first data and second data. The first data may correspond to a first part of the counter and the second data may correspond to the second part of the counter. In an example embodiment the first data corresponding to the first part may be an initialization vector (e.g., an arbitrary number, also referred to as nonce, that can be used along with a secret key for data encryption), and the second data corresponding to the second part may be a counter increment (e.g., a number that is incremented by a set increment from one counter to another).

In some cases, instead of using the counters as defined above, a one-to-one mapping for mapping a block number to a unique block identifier, wherein a bitwise length of the unique block identifier is the same as a bitwise length of each one of the set of blocks; may be used. In some cases, the one-to-one mapping may be created using a random number generator with a random seed being a cipher key. In various embodiments, an inverse one-to-one mapping may be used, such that when given a unique block identifier, a corresponding block number is returned.

According to some embodiments, the techniques include identifying a first data bit and a last data bit associated with the portion of the data. The first data bit may refer to the first bit of a portion of the data selected for encryption. The last data bit may be the last bit of data selected for encryption.

According to some embodiments, the techniques include identifying a first block, including the first data bit. The first block may refer to the block that contains the first data bit.

According to some embodiments, the techniques include identifying a last block, including the last data bit. The last block may refer to the block that contains the last data bit.

According to some embodiments, the techniques include identifying a set of blocks, including the first and the last blocks, and one or more blocks located between the first and the last block. The set of blocks may be the blocks in between the first block and the last block.

According to some embodiments, the techniques include identifying a set of unique block identifiers for the set of blocks. The set of unique block identifiers may correspond to the set of blocks. In some embodiments, the set of unique block identifiers are encrypted using the cipher key, resulting in a set of encrypted unique block identifiers. In some embodiments, the set of encrypted unique block identifiers may be the set of encrypted blocks.

According to some embodiments, the techniques include encrypting each of the set of blocks using a corresponding identifier from the set of unique block identifiers and a cipher key. In some embodiments, encrypting each of the set of blocks includes executing an XOR operation between data bits corresponding to the set of blocks and the set of encrypted unique block identifiers, each one of the sets of encrypted unique block identifiers corresponding to each one of the sets of blocks.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application; such examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents which may be resorted to fall within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A method for identifying a data segment, the method being performed by at least one processor and comprising:
    receiving a first data segment associated with a first recording time, the first data segment comprising one or more first data packets, wherein a starting first data packet includes a first time reference value;
    receiving a second data segment associated with a second recording time, the second data segment comprising one or more second data packets, wherein a starting second data packet includes a second time reference value;
    comparing:
        the first recording time with the second recording time;
        the first time reference value with the second time reference value, wherein comparing the first time reference value and the second time reference value comprises determining whether the first time reference value matches identically the second time reference value; and
        a first length enumeration for the first data packets with a second length enumeration for the second data packets, wherein comparing the first length enumeration and the second length enumeration comprises determining that the first length enumeration matches identically the second length enumeration;
    determining, based on the comparing a match between the first data segment and the second data segment; and
    identifying the first data segment as the same as the second data segment based on the determining.

2. The method of claim 1, further comprising evaluating a time metric by computing an absolute value of a difference between the first recording time and the second recording time, wherein the determining further is based on the evaluated time metric, and wherein the identifying further is based on the time metric is within a threshold range.

3. The method of claim 1, wherein the first time reference value comprises a system clock reference of the first data segment, and the second time reference value comprises a system clock reference of the second data segment.

4. The method of claim 1, wherein the first time reference value comprises a program clock reference of the first data segment, and the second time reference value comprises a program clock reference of the second data segment.

5. The method of claim 1, wherein the first time reference value comprises a presentation timestamp of the first data segment, and the second time reference value comprises a presentation timestamp of the second data segment.

6. The method of claim 1, wherein the first length enumeration comprises a number of packets for the first data segment, and the second length enumeration comprises a number of packets for the second data segment.

7. The method of claim 6, wherein the first length enumeration comprises a first many-to-one mapping rule between the number of packets for the first data segment and a first unique integer number, and wherein the second length enumeration comprises a second many-to-one mapping rule between the number of packets for the second data segment and a second unique integer number, and wherein the first many-to-one mapping rule is the same as the second many-to-one mapping rule.

8. A method for identifying a data segment, the method being performed by at least one processor and comprising:
    receiving a first and a second group of data segments, each data segment in the first and the second group being defined by segment parameters, the segment parameters comprising:
        a time at which each data segment in the first or the second group was received,
        a length enumeration for each data segment in the first or the second group, and
        a starting time reference value identified within each data segment in the first or the second group; and
    for each first data segment from the first group, determining that a second data segment from the second group matches by comparing first segment parameters of the first data segment with second segment parameters of the second data segment, resulting in a matching set of pairs of data segments.

9. The method of claim 8, further comprising identifying the matching set of pairs of data segments based on canonical segment parameters.

10. The method of claim 9, wherein the canonicalized segment parameters for a matching pair of the first data segment and the second data segment are determined by:
    selecting a time at which the first data segment was received as a canonical time;
    selecting a length enumeration for the first data segment as a canonical data segment length; and
    selecting a starting time reference value identified within the first data segment as a canonical starting time reference.

11. The method of claim 8, wherein the length enumeration comprises a number of packets for the first data segment.

12. The method of claim 8, further comprising determining a group of pairs from the matching set of pairs.

13. The method of claim 8, wherein comparing the first segment parameters with the second segment parameters comprises:
- comparing a first starting time reference value of the first parameters with a second starting time reference value of the second parameters; and
- determining whether the first starting time reference value matches identically the second starting time reference value.

14. The method of claim 8, wherein comparing the first segment parameters with the second segment parameters comprises:
- comparing a first length enumeration of the first parameters and a second length enumeration of the second parameters; and
- determining whether the first length enumeration matches identically the second length enumeration.

15. The method of claim 8, wherein comparing the first segment parameters with the second segment parameters comprises:
- determining an absolute value of a difference between a first time of the first parameters and a second time of the second parameters; and
- determining whether the absolute value is below a time threshold.

* * * * *